US012527846B2

(12) United States Patent
Sospedra Ramos et al.

(10) Patent No.: US 12,527,846 B2
(45) Date of Patent: Jan. 20, 2026

(54) IMMUNODOMINANT PROTEINS AND FRAGMENTS IN MULTIPLE SCLEROSIS

(71) Applicant: UNIVERSITÄT ZÜRICH, Zürich (CH)

(72) Inventors: Mireia Sospedra Ramos, Zürich (CH); Roland Martin, Zürich (CH)

(73) Assignee: UNIVERSITÄT ZÜRICH, Zurich (CH)

(*) Notice: Subject to any disclaimer, the term of this patent is extended or adjusted under 35 U.S.C. 154(b) by 701 days.

(21) Appl. No.: 17/253,282

(22) PCT Filed: Jun. 28, 2019

(86) PCT No.: PCT/EP2019/067468
§ 371 (c)(1),
(2) Date: Dec. 17, 2020

(87) PCT Pub. No.: WO2020/002674
PCT Pub. Date: Jan. 2, 2020

(65) Prior Publication Data
US 2021/0162019 A1 Jun. 3, 2021

(30) Foreign Application Priority Data
Jun. 28, 2018 (EP) .................................. 18180326

(51) Int. Cl.
C12N 9/04 (2006.01)
A61K 38/44 (2006.01)
A61K 47/69 (2017.01)
G01N 33/50 (2006.01)
G01N 33/573 (2006.01)

(52) U.S. Cl.
CPC ........ A61K 38/443 (2013.01); A61K 47/6901 (2017.08); G01N 33/505 (2013.01); G01N 33/573 (2013.01); G01N 2333/904 (2013.01); G01N 2800/24 (2013.01); G01N 2800/52 (2013.01)

(58) Field of Classification Search
None
See application file for complete search history.

(56) References Cited

U.S. PATENT DOCUMENTS

| 5,645,820 | A |   | 7/1997  | Hafler et al. |
|-----------|---|---|---------|---------------|
| 5,932,443 | A | * | 8/1999  | Lal ..................... C07K 14/4713 435/320.1 |
| 7,198,932 | B1 |  | 4/2007  | Nakayama et al. |
| 2004/0082772 | A1 | | 4/2004  | Gan et al. |
| 2005/0037422 | A1 | | 2/2005  | Ben-Nun et al. |
| 2006/0269917 | A1 | | 11/2006 | Macina et al. |
| 2011/0223145 | A1 | | 9/2011  | Terness et al. |
| 2013/0244897 | A1 | | 9/2013  | Lueking et al. |
| 2014/0018245 | A1 | | 1/2014  | Lueking et al. |
| 2016/0201132 | A1 | | 7/2016  | Hayardeny et al. |

FOREIGN PATENT DOCUMENTS

| CN | 105392883 A | 3/2016 | |
|----|-------------|--------|---|
| EP | 2205273 B1 | 9/2016 | |
| JP | 2005-531497 A | 10/2005 | |
| JP | 2006141297 A | 6/2006 | |
| WO | 03/001212 A2 | 1/2003 | |
| WO | 03/064464 A1 | 8/2003 | |
| WO | 2007/067912 A2 | 6/2007 | |
| WO | 2009/062260 A1 | 5/2009 | |
| WO | 2009/140679 A2 | 11/2009 | |
| WO | WO-2014059052 A1 * | 4/2014 | ......... G01N 33/6896 |

OTHER PUBLICATIONS

Li J.Y., Uniprot Accession A0A140VKC8, Jun. 2016.*
See Ngo et al. in The Protein Folding Problem and Tertiary Structure Prediction, 1994, Merz et al. (ed.), Birkhauser, Boston, MA, pp. 433 and 492-495.*
Bibiana Bielekova et al., "Expansion and Functional Relevance of High-Avidity Myelin-Specific CD4+ T Cells in Multiple Sclerosis", The Journal of Immunology, 2004, vol. 172, pp. 3893-3904 (12 pages total).
Mireia Sospedra et al., "Immunology of Multiple Sclerosis", Annual Review of Immunology, 2005, vol. 23, pp. 683-747 (68 pages total).
Jacqueline A. Quandt et al., "Myelin Basic Protein-Specific TCR/HLA-DRB5*01:01 Transgenic Mice Support the Etiologic Role of DRB5*01:01 in Multiple Sclerosis", J Immunol., Sep. 15, 2012, vol. 189, No. 6, pp. 2897-2908 (28 pages total).
Malte Mohme et al., "HLA-DR15-derived self-peptides are involved in increased autologous T cell proliferation in multiple sclerosis", Brain, 2013, vol. 136, pp. 1783-1798 (16 pages total).
Mary K. Kennedy et al., "Inhibition of Murine Relapsing Experimental Autoimmune Encephalomyelitis by Immune Tolerance to Proteolipid Protein and Its Encephalitogenic Peptides", The Journal of Immunology, Feb. 1, 1990, vol. 144, No. 3, pp. 909-915 (7 pages total).
Stephen D. Miller et al., "Specific Immunoregulation of the Induction and Effector Stages of Relapsing EAE via Neuroantigen-Specific Tolerance Induction", Annals New York Academy of Sciences, 1991, pp. 79-94 (16 pages total).
Arthur A. Vandenbark, "Differential susceptibility of human Th1 versus Th2 cells to induction of anergy and apoptosis by ECDI/antigen-coupled antigen-presenting cells", International Immunology, 2000, vol. 12, No. 1, pp. 57-66 (10 pages total).
Raquel Planas, et al. "Central role of Th2/Tc2 lymphocytes in pattern II multiple sclerosis lesions", Annals of Clinical and Translational Neurology, 2015, vol. 2, No. 9, pp. 875-893 (19 pages total).
P A Muraro et al., "Immunodominance of a low-affinity major histocompatibility complex-binding myelin basic protein epitope (residues 111-129) in HLA-DR4 (B1*0401) subjects is associated with a restricted T cell receptor repertoire.", The Journal of Clinical Investigation, 1997, vol. 100, No. 2, pp. 339-349 (12 pages total).
Alan J Thompson et al., "Diagnosis of multiple sclerosis: 2017 revisions of the McDonald criteria", Lancet Neurol, 2017, vol. 17, No. 2, pp. 162-173 (13 pages total).

(Continued)

Primary Examiner — Richard G Hutson
(74) Attorney, Agent, or Firm — Sughrue Mion, PLLC

(57) ABSTRACT

The disclosure relates to the treatment, diagnosis and/or prevention of multiple sclerosis (MS) by using an immunodominant protein or peptide. More particular the invention relates to the field of antigen specific immunotherapies, such as the induction of tolerance.

4 Claims, 25 Drawing Sheets
Specification includes a Sequence Listing.

(56) References Cited

OTHER PUBLICATIONS

Yingdong Zhao et al., "Combinatorial Peptide Libraries and Biometric Score Matrices Permit the Quantitative Analysis of Specific and Degenerate Interactions Between Clonotypic TCR and MHC Peptide Ligands", The Journal of Immunology, 2001, vol. 167, pp. 2130-2141 (12 pages total).

Mireia Sospedra et al, "Combining positional scanning peptide libraries, HLA-DR transfectants and bioinformatics to dissect the epitope spectrum of HLA class II cross-restricted CD4+ T cell clones", Journal of Immunological Methods, 2010, vol. 353, pp. 93-101 (9 pages total).

Lilian Aly et al., "Central role of JC virus-specific CD4+ lymphocytes in progressive multi-focal leucoencephalopathy-immune reconstitution inflammatory syndrome", Brain, 2011, vol. 134, 2687-2702 (16 pages total).

Sara Yousef et al., "TCR Bias and HLA Cross-Restriction Are Strategies of Human Brain-Infiltrating JC Virus-Specific CD4+ T Cells during Viral Infection", The Journal of Immunology, 2012, vol. 189, pp. 3618-3630 (14 page total).

D.A. Kharkevich, "[Pharmacology]", Textbook for higher education, 2010, 10th edition, pp. 73 (5 pages total).

H.D. Jakubke et al, "[Amino Acids, Peptides, Proteins]", Moscow "MIR", 1985, pp. 1-12 (12 pages total).

A.S. Shpigel, "Prospects for homotoxicology", Evidence-based medicine, 2004, pp. 40-43, 47-49 (17 pages total).

Office Action dated Dec. 27, 2022 from the Russian Intellectual Property Office in RU Application No. 2020142075/04.

Jodi Clyde-Smith et al., "Characterization of RasGRP2, a Plasma Membrane-targeted, Dual Specificity Ras/Rap Exchange Factor", The Journal of Biological Chemistry, 2000, vol. 275, No. 41, Issue of Oct. 13, pp. 32260-32267 (8 pages).

Huan Zhou et al., "The crystal structure of human GDP-L-fucose synthase", Acta Biochim Biophys Sin, 2013, vol. 45, Issue 9, pp. 720-725 (6 pages).

Lutterotti et al., "Antigen-specific tolerization approaches in multiple sclerosis," *Expert Opinion on Investigational Drugs,* 2014, vol. 23 No. 1, pp. 9-20.

Martin et al., "Current multiple sclerosis treatments have improved our understanding of MS autoimmune pathogenesis," *European Journal of Immunology,* 2016, vol. 46, No. 9, pp. 2078-2090.

Planas et al. "GDP-$_L$-fucose synthase is a CD4$^+$ T cell-specific autoantigen in DRB3*02:02 patients with multiple sclerosis," *Science Translational Medicine,* 2018, vol. 10, No. 462, 15 pages.

Jelcic et al, "Memory B Cells Activate Brain-Homing, Autoreactive CD4$^+$ T Cells in Multiple Sclerosis," *Cell,* 2018, vol. 175, No. 1, pp. 85-100.

\* cited by examiner

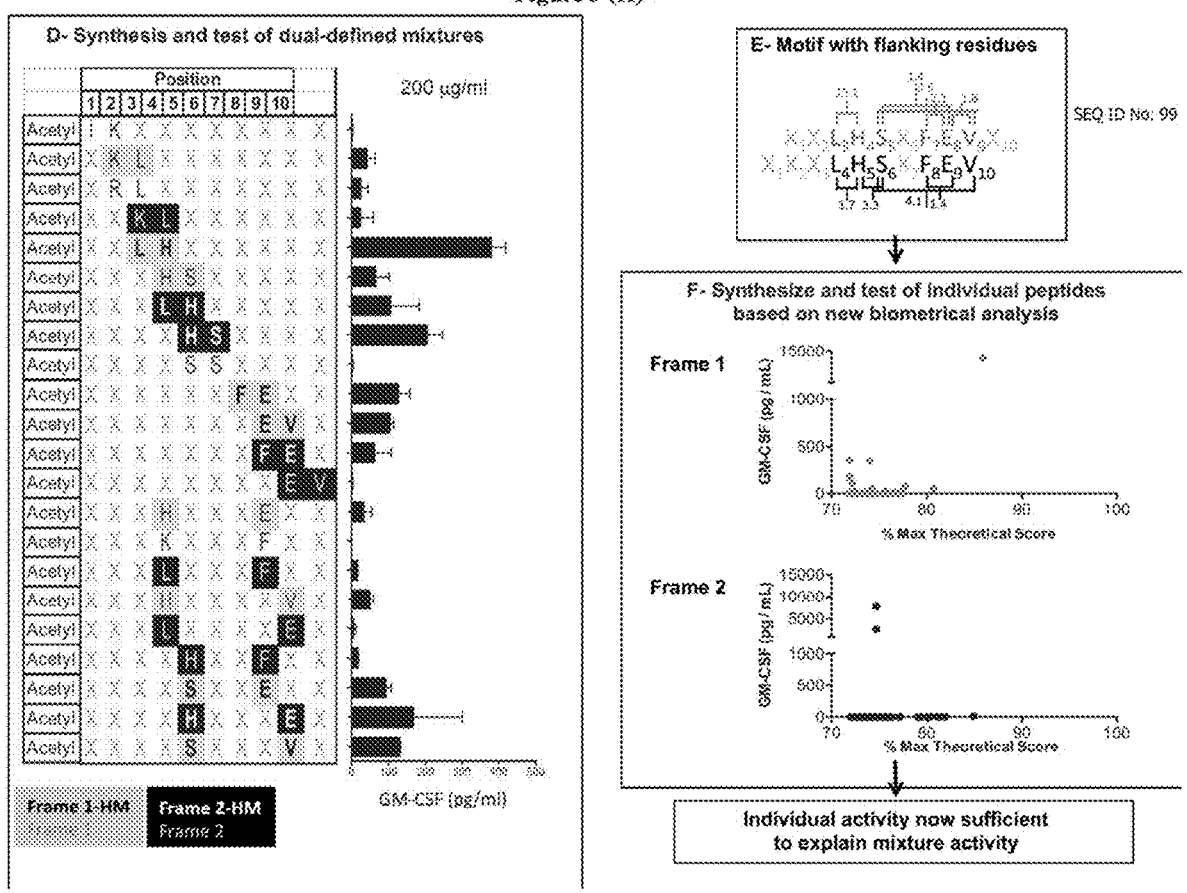

Figure 4 (I)

| PEPTIDES FROM HUMAN PROTEINS | | Peptides tested at 5 mg/ml |
|---|---|---|
| 10mer | Protein | Mean GM-CSF (pg/ml) |
| HM Boost Frame 1 | | |
| NVLHSAFEVG | Q13630\|FCL_HUMAN GDP-L-fucose synthase OS=Homo sapiens GN=TSTA3 PE=1 SV=1 | 12.111 |
| RKLHSFYEVK | Q5VST9\|OBSCN_HUMAN Obscurin OS=Homo sapiens GN=OBSCN PE=1 SV=3 | 56 |
| LKLHSRFYEL | O75838\|CIB2_HUMAN Calcium and integrin-binding family member 2 OS=Homo sapiens GN=CIB2 PE=1 SV=1 | 55 |
| QKKHSGFEDE | P10645\|CMGA_HUMAN Chromogranin-A OS=Homo sapiens GN=CHGA PE=1 SV=7 | 9 |
| LALHSVFEGL | Q9NY26\|S39A1_HUMAN Zinc transporter ZIP1 OS=Homo sapiens GN=SLC39A1 PE=1 SV=1 | 0 |
| RRLHSPPEVE | A8MT33\|SYC1L_HUMAN Synaptonemal complex central element protein 1-like OS=Homo sapiens GN=SYCE1L PE=2 SV=3 | 0 |
| LSLHRMFEVV | Q8WXF8\|DEDD2_HUMAN DNA-binding death effector domain-containing protein 2 OS=Homo sapiens GN=DEDD2 PE=1 SV=1 | 0 |
| QKLHLHFERL | Q9BYH1\|SE6L1_HUMAN Seizure 6-like protein OS=Homo sapiens GN=SEZ6L PE=1 SV=1 | 10 |
| QRLHLHFEKV | Q53EL9\|SEZ6_HUMAN Seizure protein 6 homolog OS=Homo sapiens GN=SEZ6 PE=1 SV=2 | 5 |
| LLLHSIFELN | H7C3K9\|H7C3K9_HUMAN Melanophilin (Fragment) OS=Homo sapiens GN=MLPH PE=2 SV=1 | 0 |
| NGLHSHSEVL | Q9HCH5\|SYTL2_HUMAN Synaptotagmin-like protein 2 OS=Homo sapiens GN=SYTL2 PE=1 SV=3 | 0 |
| RRLHLHFERV | Q6UXD5\|SE6L2_HUMAN Seizure 6-like protein 2 OS=Homo sapiens GN=SEZ6L2 PE=1 SV=2 | 3 |
| LRLHSPPEVT | Q9NZ20\|PA2G3_HUMAN Group 3 secretory phospholipase A2 OS=Homo sapiens GN=PLA2G3 PE=1 SV=2 | 0 |
| SHLHSLFRVL | Q8NGR2\|OR1L6_HUMAN Olfactory receptor 1L6 OS=Homo sapiens GN=OR1L6 PE=2 SV=2 | 0 |
| VELHSHSEVP | Q92551\|IP6K1_HUMAN Inositol hexakisphosphate kinase 1 OS=Homo sapiens GN=IP6K1 PE=1 SV=3 | 0 |
| GHLHSQLEVS | Q6ZTK2\|YP015_HUMAN Putative uncharacterized protein LOC400499 OS=Homo sapiens PE=2 SV=1 | 0 |
| EKKVSSFEVF | Q9UHG0\|DCDC2_HUMAN Doublecortin domain-containing protein 2 OS=Homo sapiens GN=DCDC2 PE=1 SV=2 | 0 |
| DGLHSSNEVL | Q5TDP6\|LGSN_HUMAN Lengsin OS=Homo sapiens GN=LGSN PE=1 SV=1 | 0 |
| LSLHSLFELR | Q6U841\|S4A10_HUMAN Sodium-driven chloride bicarbonate exchanger OS=Homo sapiens GN=SLC4A10 PE=2 SV=1 | 0 |
| FTPHSRFEVL | Q9P2E5\|CHPF2_HUMAN Chondroitin sulfate glucuronyltransferase OS=Homo sapiens GN=CHPF2 PE=2 SV=2 | 0 |
| IKLPSSFEKW | Q0P6D6\|CCD15_HUMAN Coiled-coil domain-containing protein 15 OS=Homo sapiens GN=CCDC15 PE=2 SV=2 | 54 |
| VMLLSLFEEE | Q9P2P5\|HECW2_HUMAN E3 ubiquitin-protein ligase HECW2 OS=Homo sapiens GN=HECW2 PE=1 SV=2 | 0 |
| FALHSLFEAK | Q96PN7\|TREF1_HUMAN Transcriptional-regulating factor 1 OS=Homo sapiens GN=TRERF1 PE=1 SV=1 | 0 |
| RKLKASFEVS | Q8TDX9\|PK1L1_HUMAN Polycystic kidney disease protein 1-like 1 OS=Homo sapiens GN=PKD1L1 PE=1 SV=1 | 338 |
| KALHSDFIVK | P52333\|JAK3_HUMAN Tyrosine-protein kinase JAK3 OS=Homo sapiens GN=JAK3 PE=1 SV=2 | 0 |
| KKLRSSFESS | Q5IJ3\|COA6_HUMAN Cytochrome c oxidase assembly factor 6 homolog OS=Homo sapiens GN=COA6 PE=1 SV=1 | 23 |
| LQLHSPFERG | Q8TDY3\|ACTT2_HUMAN Actin-related protein T2 OS=Homo sapiens GN=ACTRT2 PE=2 SV=2 | 0 |
| RKCHSSGEVQ | Q8N5D0\|WDTC1_HUMAN WD and tetratricopeptide repeats protein 1 OS=Homo sapiens GN=WDTC1 PE=1 SV=2 | 4 |
| RKLLSDFPVV | Q4LDE5\|SVEP1_HUMAN Sushi, von Willebrand factor type A, EGF and pentraxin domain-containing protein 1 OS=Homo sapiens GN=SVEP1 PE=1 SV=3 | 7 |

Figure 4 (II)

| | | |
|---|---|---|
| KKRHSYFEKP | Q13123|RED_HUMAN Protein Red OS=Homo sapiens GN=IK PE=1 SV=3 | 11 |
| VHLHSFFAVG | Q86VW1|S22AG_HUMAN Solute carrier family 22 member 16 OS=Homo sapiens GN=SLC22A16 PE=1 SV=1 | 0 |
| EALLSGFEVI | O60503|ADCY9_HUMAN Adenylate cyclase type 9 OS=Homo sapiens GN=ADCY9 PE=1 SV=4 | 0 |
| EKLFSQFEVD | Q9NXB0|MKS1_HUMAN Meckel syndrome type 1 protein OS=Homo sapiens GN=MKS1 PE=1 SV=2 | 0 |
| GDLKSGFEEV | Q1XH10|SKDA1_HUMAN SKI/DACH domain-containing protein 1 OS=Homo sapiens GN=SKIDA1 PE=2 SV=1 | 0 |
| KGLHSKKEVP | Q7KZF4|SND1_HUMAN Staphylococcal nuclease domain-containing protein 1 OS=Homo sapiens GN=SND1 PE=1 SV=1 | 0 |
| EFLASSFEVS | Q15269|PWP2_HUMAN Periodic tryptophan protein 2 homolog OS=Homo sapiens GN=PWP2 PE=1 SV=2 | 0 |
| GVLHSKFWVV | Q96BZ4|PLD4_HUMAN Phospholipase D4 OS=Homo sapiens GN=PLD4 PE=2 SV=2 | 0 |
| KQLVHHFEVD | F8WAS2|F8WAS2_HUMAN Inter-alpha-trypsin inhibitor heavy chain H1 OS=Homo sapiens GN=ITIH1 PE=2 SV=1 | 0 |
| RHLHSVLEEL | A1L168|CT202_HUMAN Uncharacterized protein C20orf202 OS=Homo sapiens GN=C20orf202 PE=2 SV=2 | 0 |
| RLLSSGFEEV | O60518|RNBP6_HUMAN Ran-binding protein 6 OS=Homo sapiens GN=RANBP6 PE=1 SV=2 | 24 |
| QMLHPIFEEA | Q9BS26|ERP44_HUMAN Endoplasmic reticulum resident protein 44 OS=Homo sapiens GN=ERP44 PE=1 SV=1 | 0 |
| RRLHSTHEEL | Q03001|DYST_HUMAN Dystonin OS=Homo sapiens GN=DST PE=1 SV=4 | 7 |
| RKLHWLFELL | Q14997|PSME4_HUMAN Proteasome activator complex subunit 4 OS=Homo sapiens GN=PSME4 PE=1 SV=2 | 116 |
| VELHSDMEVT | P04275|VWF_HUMAN von Willebrand factor OS=Homo sapiens GN=VWF PE=1 SV=4 | 0 |
| RKLLHRFETE | O15327|INP4B_HUMAN Type II inositol 3,4-bisphosphate 4-phosphatase OS=Homo sapiens GN=INPP4B PE=2 SV=4 | 14 |
| NKLISEFEEE | Q8NE09|RGS22_HUMAN Regulator of G-protein signaling 22 OS=Homo sapiens GN=RGS22 PE=1 SV=3 | 357 |
| SKLVSNKEVV | Q15751|HERC1_HUMAN Probable E3 ubiquitin-protein ligase HERC1 OS=Homo sapiens GN=HERC1 PE=1 SV=2 | 171 |
| LLLHSLFPVP | Q9U68|MSRA_HUMAN Mitochondrial peptide methionine sulfoxide reductase OS=Homo sapiens GN=MSRA PE=1 SV=1 | 0 |
| RKLDSVFEER | P14780|MMP9_HUMAN Matrix metalloproteinase-9 OS=Homo sapiens GN=MMP9 PE=1 SV=3 | 0 |
| RFKHSSTEVL | A7KAX9|RHG32_HUMAN Rho GTPase-activating protein 32 OS=Homo sapiens GN=ARHGAP32 PE=1 SV=1 EXP=0.271770 | 0 |

Figure 4 (III)

| PEPTIDES FROM HUMAN PROTEINS | | Peptides tested at 5 mg/ml |
|---|---|---|
| 10mer | Protein | Mean GM-CSF (pg/ml) |
| HM Boost Frame 2 | | |
| RRKLHSFYEV | Q5VST9\|OBSCN_HUMAN Obscurin OS=Homo sapiens GN=OBSCN PE=1 SV=3 | 13 |
| RKLLSSGFEI | Q8N8A2\|ANR44_HUMAN Serine/threonine-protein phosphatase 6 regulatory ankyrin repeat subunit B OS=Homo sapiens GN=ANKRD44 PE=1 SV=1 | 5 |
| RRLLSSGFEE | O60518\|RNBP6_HUMAN Ran-binding protein 6 OS=Homo sapiens GN=RANBP6 PE=1 SV=2 | 3 |
| RKKLHKFEET | Q96PE3\|INP4A_HUMAN Type I inositol 3,4-bisphosphate 4-phosphatase OS=Homo sapiens GN=INPP4A PE=1 SV=1 | 3 |
| LKKLHDFEEQ | Q9BX84\|TRPM6_HUMAN Transient receptor potential cation channel subfamily M member 6 OS=Homo sapiens GN=TRPM6 PE=1 SV=2 | 9 |
| GLLLHSIFEL | H7C3K9\|H7C3K9_HUMAN Melanophilin (Fragment) OS=Homo sapiens GN=MLPH PE=2 SV=1 | 0 |
| QKKLHDFEEQ | Q96QT4\|TRPM7_HUMAN Transient receptor potential cation channel subfamily M member 7 OS=Homo sapiens GN=TRPM7 PE=1 SV=1 | 9 |
| QKKLSSGEEK | Q15858\|SCN9A_HUMAN Sodium channel protein type 9 subunit alpha OS=Homo sapiens GN=SCN9A PE=1 SV=3 | 4 |
| RKHLHSGQEA | Q5JTD0\|TJAP1_HUMAN Tight junction-associated protein 1 OS=Homo sapiens GN=TJAP1 PE=1 SV=1 | 0 |
| QKLVHSLFES | O15067\|PUR4_HUMAN Phosphoribosylformylglycinamidine synthase OS=Homo sapiens GN=PFAS PE=1 SV=4 | 0 |
| CYLLHSFEEF | Q4LDE5\|SVEP1_HUMAN Sushi, von Willebrand factor type A, EGF and pentraxin domain-containing protein 1 OS=Homo sapiens GN=SVEP1 PE=1 SV=3 | 0 |
| SKTLHSVEEK | Q8TBZ0\|CC110_HUMAN Coiled-coil domain-containing protein 110 OS=Homo sapiens GN=CCDC110 PE=2 SV=1 | 0 |
| LKRLHEFEEQ | Q7Z4N2\|TRPM1_HUMAN Transient receptor potential cation channel subfamily M member 1 OS=Homo sapiens GN=TRPM1 PE=1 SV=2 | 6 |
| VKELHSAEEG | O60941\|DTNB_HUMAN Dystrobrevin beta OS=Homo sapiens GN=DTNB PE=1 SV=1 | 0 |
| SLLLHSQEEK | Q8IWZ3\|ANKH1_HUMAN Ankyrin repeat and KH domain-containing protein 1 OS=Homo sapiens GN=ANKHD1 PE=1 SV=1 | 0 |
| AVHLHSGEEL | Q92519\|TRIB2_HUMAN Tribbles homolog 2 OS=Homo sapiens GN=TRIB2 PE=2 SV=1 | 0 |
| HTRLHSGEEP | Q6IV72\|ZN425_HUMAN Zinc finger protein 425 OS=Homo sapiens GN=ZNF425 PE=2 SV=1 | 0 |
| MPLLHAIFEV | O43592\|XPOT_HUMAN Exportin-T OS=Homo sapiens GN=XPOT PE=1 SV=2 | 1 |
| EKKRHSYFEK | Q13123\|RED_HUMAN Protein Red OS=Homo sapiens GN=IK PE=1 SV=3 | 0 |
| QAKLHSQEED | Q4V328\|GRAP1_HUMAN GRIP1-associated protein 1 OS=Homo sapiens GN=GRIPAP1 PE=1 SV=1 | 0 |
| QQKKHSGFED | P10645\|CMGA_HUMAN Chromogranin-A OS=Homo sapiens GN=CHGA PE=1 SV=7 | 2 |
| LKKLHQQFEM | Q9UQ26-8\|RIMS2_HUMAN Isoform 8 of Regulating synaptic membrane exocytosis protein 2 OS=Homo sapiens GN=RIMS2 PE=2 SV=2 | 0 |
| KLLLHSGVEN | Q8N1W0\|YF005_HUMAN Transmembrane protein FLJ37396 OS=Homo sapiens | 2.779 |

Figure 4 (IV)

| | | |
|---|---|---|
| DNVLHSAFEV | Q13630\|FCL_HUMAN GDP-L-fucose synthase OS=Homo sapiens GN=TSTA3 PE=1 SV=1 | 7.817 |
| FSKLHTFEEV | Q96JB1\|DYH8_HUMAN Dynein heavy chain 8, axonemal OS=Homo sapiens GN=DNAH8 PE=1 SV=2 | 0 |
| QAKLSSFEET | Q5TB80\|CE162_HUMAN Centrosomal protein of 162 kDa OS=Homo sapiens GN=KIAA1009 PE=1 SV=2 | 0 |
| SLALHSVFEG | Q9NY26\|S39A1_HUMAN Zinc transporter ZIP1 OS=Homo sapiens GN=SLC39A1 PE=1 SV=1 | 0 |
| EFALHSLFEA | Q96PN7\|TREF1_HUMAN Transcriptional-regulating factor 1 OS=Homo sapiens GN=TRERF1 PE=1 SV=1 | 0 |
| MRHLKSFFEA | Q7Z7H5\|TMED4_HUMAN Transmembrane emp24 domain-containing protein 4 OS=Homo sapiens GN=TMED4 PE=1 SV=1 | 0 |
| QKKRHSFLES | Q49MG5\|MAP9_HUMAN Microtubule-associated protein 9 OS=Homo sapiens GN=MAP9 PE=1 SV=3 | 0 |
| QKKLHHFFIG | Q8IWB1\|IPRI_HUMAN Inositol 1,4,5-trisphosphate receptor-interacting protein OS=Homo sapiens GN=ITPRIP PE=1 SV=1 | 0 |
| TLSLHSLFEL | Q6U841\|S4A10_HUMAN Sodium-driven chloride bicarbonate exchanger OS=Homo sapiens GN=SLC4A10 PE=2 SV=1 | 0 |
| LRLFHSFEEL | Q9UIY3\|RWD2A_HUMAN RWD domain-containing protein 2A OS=Homo sapiens GN=RWDD2A PE=1 SV=1 | 0 |
| QKFLHSSFVA | Q9UIV8\|SPB13_HUMAN Serpin B13 OS=Homo sapiens GN=SERPINB13 PE=1 SV=2 | 0 |
| AWLLHSGPEG | O43299\|AP5Z1_HUMAN AP-5 complex subunit zeta-1 OS=Homo sapiens GN=AP5Z1 PE=1 SV=2 | 0 |
| TKLHRTEEL | Q68CJ6\|SLIP_HUMAN Nuclear GTPase SLIP-GC OS=Homo sapiens GN=NUGGC PE=2 SV=3 | 0 |
| FKTLSSKFEL | Q8WWM7\|ATX2L_HUMAN Ataxin-2-like protein OS=Homo sapiens GN=ATXN2L PE=1 SV=2 | 0 |
| KRRLHLVFEY | Q00532\|CDKL1_HUMAN Cyclin-dependent kinase-like 1 OS=Homo sapiens GN=CDKL1 PE=1 SV=5 | 0 |
| EHLLNSGFEV | A7KAX9\|RHG32_HUMAN Rho GTPase-activating protein 32 OS=Homo sapiens GN=ARHGAP32 PE=1 SV=1 | 0 |
| VMKLLSIFES | Q3B7T1\|EDRF1_HUMAN Erythroid differentiation-related factor 1 OS=Homo sapiens GN=EDRF1 PE=1 SV=1 | 0 |
| KLELHSSEEA | Q6TFL3\|CC171_HUMAN Coiled-coil domain-containing protein 171 OS=Homo sapiens GN=CCDC171 PE=2 SV=1 | 0 |
| KLPLHSSEEA | P57721\|PCBP3_HUMAN Poly(rC)-binding protein 3 OS=Homo sapiens GN=PCBP3 PE=2 SV=2 | 0 |
| LKRLSNEEE | O14976\|GAK_HUMAN Cyclin-G-associated kinase OS=Homo sapiens GN=GAK PE=1 SV=2 | 0 |
| TTRLHSLEEK | Q7Z3Z0\|K1C25_HUMAN Keratin, type I cytoskeletal 25 OS=Homo sapiens GN=KRT25 PE=1 SV=1 | 0 |
| HARLHSLEET | Q5T160\|SYRM_HUMAN Probable arginine--tRNA ligase, mitochondrial OS=Homo sapiens GN=RARS2 PE=1 SV=1 | 0 |
| LPRLHGHFEQ | Q9UPU7\|TBD2B_HUMAN TBC1 domain family member 2B OS=Homo sapiens GN=TBC1D2B PE=1 SV=2 | 0 |
| VKTLHHKEEV | Q6ZMW2\|ZN782_HUMAN Zinc finger protein 782 OS=Homo sapiens GN=ZNF782 PE=2 SV=1 | 0 |
| SPSLHSREEA | B7Z7H5\|B7Z7H5_HUMAN Coiled-coil domain-containing protein 116 OS=Homo sapiens GN=CCDC116 PE=2 SV=1 | 0 |
| PRKLHWLFEL | Q14997\|PSME4_HUMAN Proteasome activator complex subunit 4 OS=Homo sapiens GN=PSME4 PE=1 SV=2 | 0 |
| LKKLLSFAEN | Q5W041\|ARMC3_HUMAN Armadillo repeat-containing protein 3 OS=Homo sapiens GN=ARMC3 PE=2 SV=2 | 0 |

Figure 5

GDP-L-fucose synthase transcripts and peptides identified in brain tissue.

| Protein | Transcriptome | | | | UniProt ID | Peptide sequence | SEQ ID | Residues | Proteome (PSM[c]) | | | | | Distinct peptides # | Protein coverage % |
|---|---|---|---|---|---|---|---|---|---|---|---|---|---|---|---|
| | Gene ID | RPKM[a] | | | | | | | MS | | Non-MS | | | | |
| | | LF | LB | LM | | | | | WM | GM | WM | GM | Total | | |
| GDP-L-fucose synthase | TSTA3 | 2.17 | 3.82 | 2.67 | Q13630 | ILVTGGSGLVGK | 199 | 10-21 | 12 | 12 | 12 | 12 | 48 | 17 | 56.0 |
| | | | | | | VVAVDAGLRGEDWVFVSSK | 200 | 26-44 | 12 | 12 | 12 | 12 | 48 | | |
| | | | | | | DADLTDTAGTR | 201 | 45-55 | 12 | 12 | 12 | 12 | 48 | | |
| | | | | | | VQPTRVIHLAAMVGGLFR | 202 | 61-78 | - | 9 | 9 | 9 | 27 | | |
| | | | | | | YNLEFYR | 203 | 82-88 | 12 | 12 | 12 | 12 | 48 | | |
| | | | | | | YNLDFWR | 204 | 82-88 | - | - | - | 1 | 1 | | |
| | | | | | | NVHNCHVLRSLPYGAR | 205 | 90-107 | - | 13 | 13 | 13 | 39 | | |
| | | | | | | NVHNRHVLRSAPYGARK | 206 | 90-108 | - | - | - | 3 | 3 | | |
| | | | | | | VVSCLSTCIFPDR | 207 | 109-121 | - | - | - | 3 | 3 | | |
| | | | | | | HIDVQNK | 208 | 148-155 | - | 2 | - | 2 | 4 | | |
| | | | | | | HRIDVQNR | 209 | 148-155 | - | - | 2 | 2 | 4 | | |
| | | | | | | HSGSALTVWGTGNPR | 210 | 200-214 | 3 | - | - | - | 3 | | |
| | | | | | | HSGSALTVWGTGWPR | 211 | 200-213 | - | - | 1 | - | 1 | | |
| | | | | | 212 | TYPYDETMINHGPERNSFGYSYAK | | 222-247 | - | - | - | 3 | 3 | | |
| | | | | | | EINEVEPTILSVGSERKVSIK | 213 | 260-263 | - | 3 | - | - | 3 | | |
| | | | | | | TYLPDFR | 214 | 291-297 | 12 | 12 | 12 | 12 | 48 | | |
| | | | | | | LKTYLPDFR | 215 | 289-297 | - | - | - | 2 | 2 | | |
| | | | | | | | | | 63 | 87 | 88 | 95 | 333 | | |
| Myelin basic protein | MBP | 37.20 | 28.97 | 69.21 | P02686 | | | | 993 | 871 | 985 | 865 | 3714 | 80 | 79.6 |
| Myelin proteolipid protein | PLP1 | 468.31 | 341.83 | 431.81 | P60201 | | | | 138 | 153 | 139 | 157 | 587 | 13 | 30.5 |
| Myelin-oligodendrocyte glycoprotein | MOG | - | - | - | Q16653 | | | | 216 | 199 | 222 | 216 | 853 | 28 | 49.8 |
| Myelin-associated glycoprotein | MAG | 16.28 | 10.83 | 28.84 | P20916 | | | | 243 | 232 | 221 | 243 | 939 | 34 | 36.9 |
| Myelin-associated oligodendrocyte basic protein | MOBP | 14.48 | 11.16 | 19.82 | Q13875 | | | | 20 | 12 | 27 | 14 | 73 | 8 | 26.2 |
| Oligodendrocyte myelin glycoprotein | OMG | 5.21 | 5.07 | 3.28 | P23515 | | | | 144 | 155 | 136 | 155 | 590 | 13 | 26.6 |
| 2',3'-cyclic-nucleotide 3'-phosphodiesterase | CNP | - | - | - | P09543 | | | | 1186 | 965 | 1197 | 1026 | 4376 | 112 | 96.4 |

[a] RPKM, reads per kilobase of exon model per million mapped reads. [b] LF and LB, active lesions in which TCC21.1 was clonally expanded. LM, inactive lesion in which TCC21.1 was not identified. [c] PSM, peptide spectrum matches. Proteome data correspond to white matter (WM) and grey matter (GM) from multiple sclerosis patients (MS, n=15) and non-MS controls (Non-MS, n=5). In bold are GDP-L-fucose synthase values.

Figure 6 (I)

GDP-L-fucose synthase, Myelin and CEF Peptides

| GDP-L-fucose synthase | | SEQ ID No: |
|---|---|---|
| GDP-L-fucose synthase 1-15 | MGEPQGSMRILVTGG | 10 |
| GDP-L-fucose synthase 6-20 | GSMRILVTGGSGLVG | 216 |
| GDP-L-fucose synthase 11-25 | LVTGGSGLVGKAIQK | 217 |
| GDP-L-fucose synthase 16-30 | SGLVGKAIQKVVADG | 218 |
| GDP-L-fucose synthase 21-35 | KAIQKVVADGAGLPG | 219 |
| GDP-L-fucose synthase 26-40 | VVADGAGLPGEDWVF | 11 |
| GDP-L-fucose synthase 31-45 | AGLPGEDWVFVSSKD | 220 |
| GDP-L-fucose synthase 36-50 | EDWVFVSSKDADLTD | 221 |
| GDP-L-fucose synthase 41-55 | VSSKDADLTDTAQTR | 222 |
| GDP-L-fucose synthase 46-60 | ADLTDTAQTRALFEK | 223 |
| GDP-L-fucose synthase 51-65 | TAQTRALFEKVQPTH | 12 |
| GDP-L-fucose synthase 56-70 | ALFEKVQPTHVIHLA | 224 |
| GDP-L-fucose synthase 61-75 | VQPTHVIHLAAMVGG | 225 |
| GDP-L-fucose synthase 66-80 | VIHLAAMVGGLFRNI | 226 |
| GDP-L-fucose synthase 71-85 | AMVGGLFRNIKYNLD | 227 |
| GDP-L-fucose synthase 76-90 | LFRNIKYNLDFWRKN | 13 |
| GDP-L-fucose synthase 81-95 | KYNLDFWRKNVHMND | 228 |
| GDP-L-fucose synthase 86-100 | FWRKNVHMNDNVLHS | 229 |
| GDP-L-fucose synthase 91-105 | VHMNDNVLHSAFEVG | 14 |
| GDP-L-fucose synthase 96-110 | NVLHSAFEVGARKVV | 17 |
| GDP-L-fucose synthase 101-115 | AFEVGARKVVSCLST | 231 |
| GDP-L-fucose synthase 106-120 | ARKVVSCLSTCIFPD | 232 |
| GDP-L-fucose synthase 111-125 | SCLSTCIFPDKTTYP | 233 |
| GDP-L-fucose synthase 116-130 | CIFPDKTTYPIDETM | 234 |
| GDP-L-fucose synthase 121-135 | KTTYPIDETMIHNGP | 18 |
| GDP-L-fucose synthase 126-140 | IDETMIHNGPPHNSN | 235 |
| GDP-L-fucose synthase 131-145 | IHNGPPHNSNFGYSY | 20 |
| GDP-L-fucose synthase 136-150 | PHNSNFGYSYAKRMI | 21 |
| GDP-L-fucose synthase 141-155 | FGYSYAKRMIDVQNR | 237 |
| GDP-L-fucose synthase 146-160 | AKRMIDVQNRAYFQQ | 238 |
| GDP-L-fucose synthase 151-165 | DVQNRAYFQQYGCTF | 239 |
| GDP-L-fucose synthase 156-170 | AYFQQYGCTFTAVIP | 22 |
| GDP-L-fucose synthase 161-175 | YGCTFTAVIPTNVFG | 23 |
| GDP-L-fucose synthase 166-180 | TAVIPTNVFGPHDNF | 240 |
| GDP-L-fucose synthase 171-185 | TNVFGPHDNFNIEDG | 241 |
| GDP-L-fucose synthase 176-190 | PHDNFNIEDGHVLPG | 242 |
| GDP-L-fucose synthase 181-195 | NIEDGHVLPGLIHKV | 243 |
| GDP-L-fucose synthase 186-200 | HVLPGLIHKVHLAKS | 244 |
| GDP-L-fucose synthase 191-205 | LIHKVHLAKSSGSAL | 245 |
| GDP-L-fucose synthase 196-210 | HLAKSSGSALTVWGT | 246 |
| GDP-L-fucose synthase 201-215 | SGSALTVWGTGNPRR | 247 |
| GDP-L-fucose synthase 206-220 | TVWGTGNPRRQFIYS | 248 |
| GDP-L-fucose synthase 211-225 | GNPRRQFIYSLDLAQ | 249 |
| GDP-L-fucose synthase 216-230 | QFIYSLDLAQLFIWV | 250 |
| GDP-L-fucose synthase 221-235 | LDLAQLFIWVLREYN | 251 |
| GDP-L-fucose synthase 226-240 | LFIWVLREYNEVEPI | 24 |
| GDP-L-fucose synthase 231-245 | LREYNEVEPIILSVG | 25 |
| GDP-L-fucose synthase 236-250 | EVEPIILSVGEEDEV | 26 |
| GDP-L-fucose synthase 241-255 | ILSVGEEDEVSIKEA | 27 |
| GDP-L-fucose synthase 246-260 | EEDEVSIKEAAEAVV | 28 |
| GDP-L-fucose synthase 251-265 | SIKEAAEAVVEAMDF | 29 |
| GDP-L-fucose synthase 256-270 | AEAVVEAMDFHGEVT | 30 |
| GDP-L-fucose synthase 261-275 | EAMDFHGEVTFDTTK | 253 |

Figure 6 (II)

| | | |
|---|---|---|
| GDP-L-fucose synthase 266-280 | HGEVTFDTTKSDGQF | 254 |
| GDP-L-fucose synthase 271-285 | FDTTKSDGQFKKTAS | 31 |
| GDP-L-fucose synthase 276-290 | SDGQFKKTASNSKLR | 255 |
| GDP-L-fucose synthase 281-295 | KKTASNSKLRTYLPD | 256 |
| GDP-L-fucose synthase 286-300 | NSKLRTYLPDFRFTP | 257 |
| GDP-L-fucose synthase 291-305 | TYLPDFRFTPFKQAV | 258 |
| GDP-L-fucose synthase 296-310 | FRFTPFKQAVKETCA | 32 |
| GDP-L-fucose synthase 301-315 | FKQAVKETCAWFTDN | 259 |
| GDP-L-fucose synthase 306-321 | KETCAWFTDNYEQARK | 260 |
| Myelin | | |
| MOG 1-20 | GQFRVIGPRHPIRALVGDEV | 261 |
| MOG 35-55 | MEVGWYRPPFSRVVHLYRNGK | 262 |
| MBP 13-32 | KYLATASTMDHARHGPLPRH | 263 |
| MBP 83-99 | ENPVVHFFKNIVTPRTP | 264 |
| MBP 111-129 | LSRFSWGAEGQRPGFGYGG | 265 |
| MBP 146-170 | AQGTLSKIFKLGGRDSRSGSPMARR | 266 |
| PLP 139-154 | HCLGKWLGHPDKFVGI | 267 |
| CEFT2 Mix (CEF) | | |
| Influenza A | FVFTLTVPSER | 268 |
| Influenza A | SGPLKAEIAQRLEDV | 269 |
| Influenza A | YDVPDYASLRSLVASS | 270 |
| Influenza B | PYYTGEHAKAIGN | 271 |
| Tetanus | GQIGNDPNRDIL | 272 |
| Influenza A | PKYVKQNTLKLA | 273 |
| Influenza A | PKYVKQNTLKLAT | 274 |
| Influenza A | DRLRRDQKS | 275 |
| EBV | AGLTLSLLVICSYLFISRG | 276 |
| Tetanus | QYIKANSKFIGITEL | 277 |
| Tetanus | QYIKANSKFIGITE | 278 |
| Tetanus | FNNFTVSFWLRVPKVSASHLE | 279 |
| EBV | TSLYNLRRGTALA | 280 |
| Tetanus | KFIIKRYTPNNEIDSF | 281 |
| Tetanus | VSIDKFRIFCKALNPK | 282 |
| EBV | VPGLYSPCRAFFNKEELL | 283 |
| HCMV | DKREMWMACIKELH | 284 |
| EBV | TGHGARTSTEPTTDY | 285 |
| EBV | KELKRQYEKKLRQ | 286 |
| Influenza A | RGYFKMRTGKSSIMRS | 287 |
| EBV | TVFYNIPPMPL | 288 |
| EBV | AEGLRALLARSHVER | 289 |
| EBV | PGPLRESIVCYFMVFLQTHI | 290 |

Figure 8
A
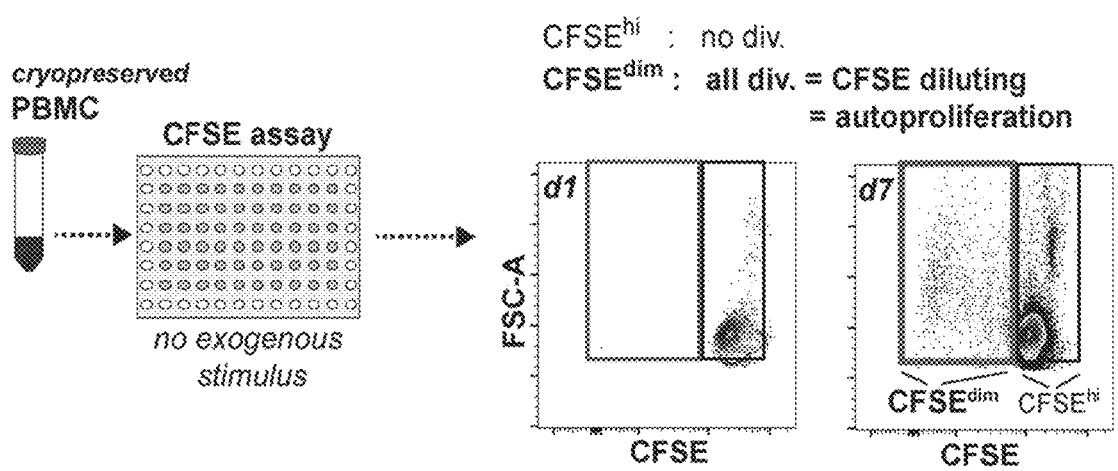
B
Shared unique sequences
overlap brain lesion LIII - high active
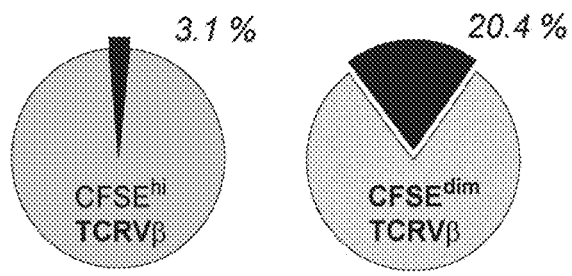

Figure 9 (II)
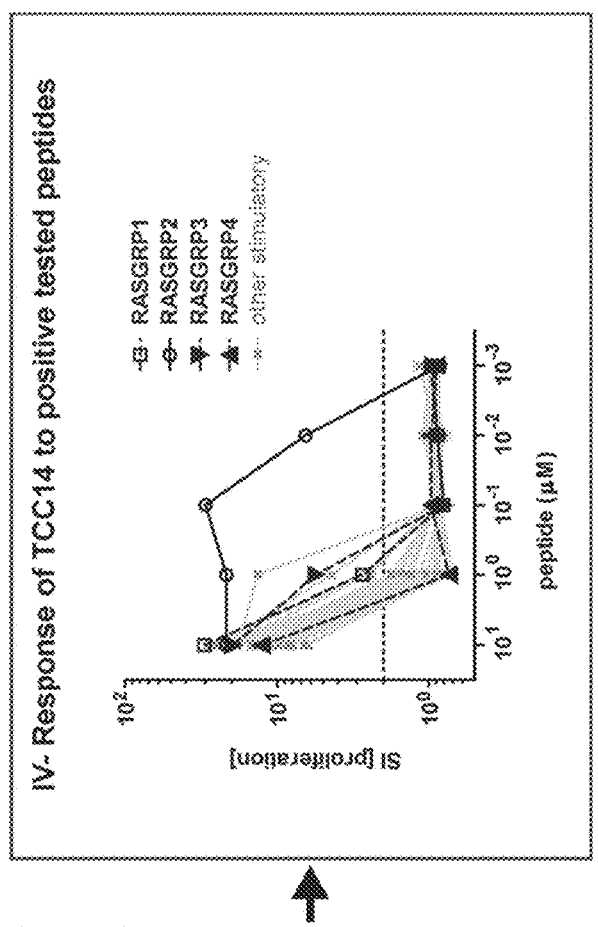
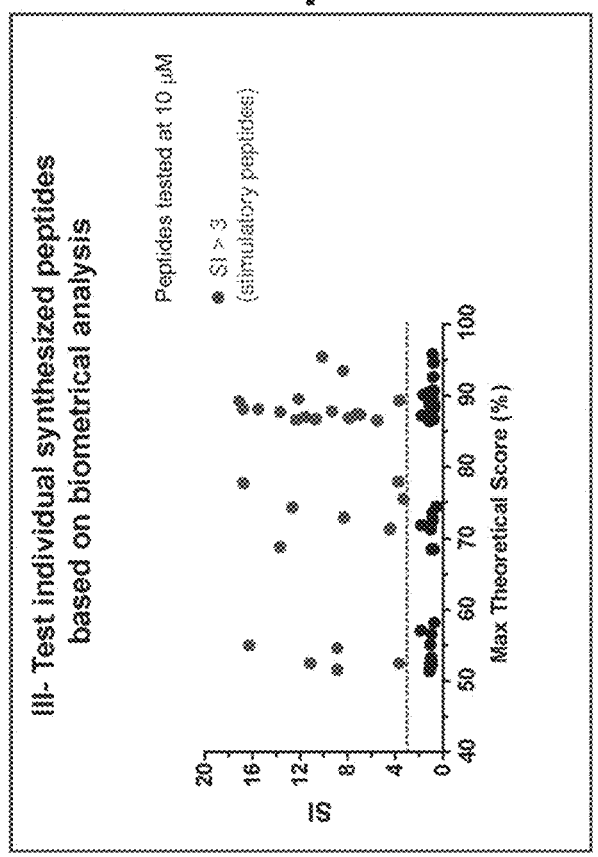

Figure 12

| Antigen | Sequence | Position | SEQ ID No: |
|---|---|---|---|
| RASGRP1 | DLLHAPEEGPFTFPNGEAVEHGEESK | 621-646 | 291 |
| | IVISSAELLQK | 95-105 | 292 |
| | VSLLFDHLEPEELSEHLTYLEFK | 197-219 | 293 |
| RASGRP2 | AFSFSLPRPGR | 627-637 | 294 |
| | ALILGIYK | 570-577 | 295 |
| | ALLDQEGNRR | 158-167 | 296 |
| | ALVITHFVHVAEK | 274-286 | 297 |
| | DLVALQLALPDWLDPAR | 363-379 | 298 |
| | DNSNSLQVK | 119-127 | 299 |
| | HSSLIDIDSVPTYK | 168-181 | 300 |
| | KDNSNSLQVK | 118-127 | 301 |
| | LDQALVVEHIEK | 471-482 | 302 |
| | LLHIYQQSR | 109-117 | 303 |
| | LLQLQNFNTLMAVVGGLSHSSISR | 287-310 | 304 |
| | LWEGLTELVTATGNYGNYR | 325-343 | 305 |
| | MFLMMHPWYIPSSQLAAK | 91-108 | 306 |
| | VRDPQLVR | 83-90 | 307 |
| | YWISAFPAEFDLNPELAEQIK | 134-154 | 308 |
| RASGRP3 | LSLVLEPR | 376-383 | 309 |

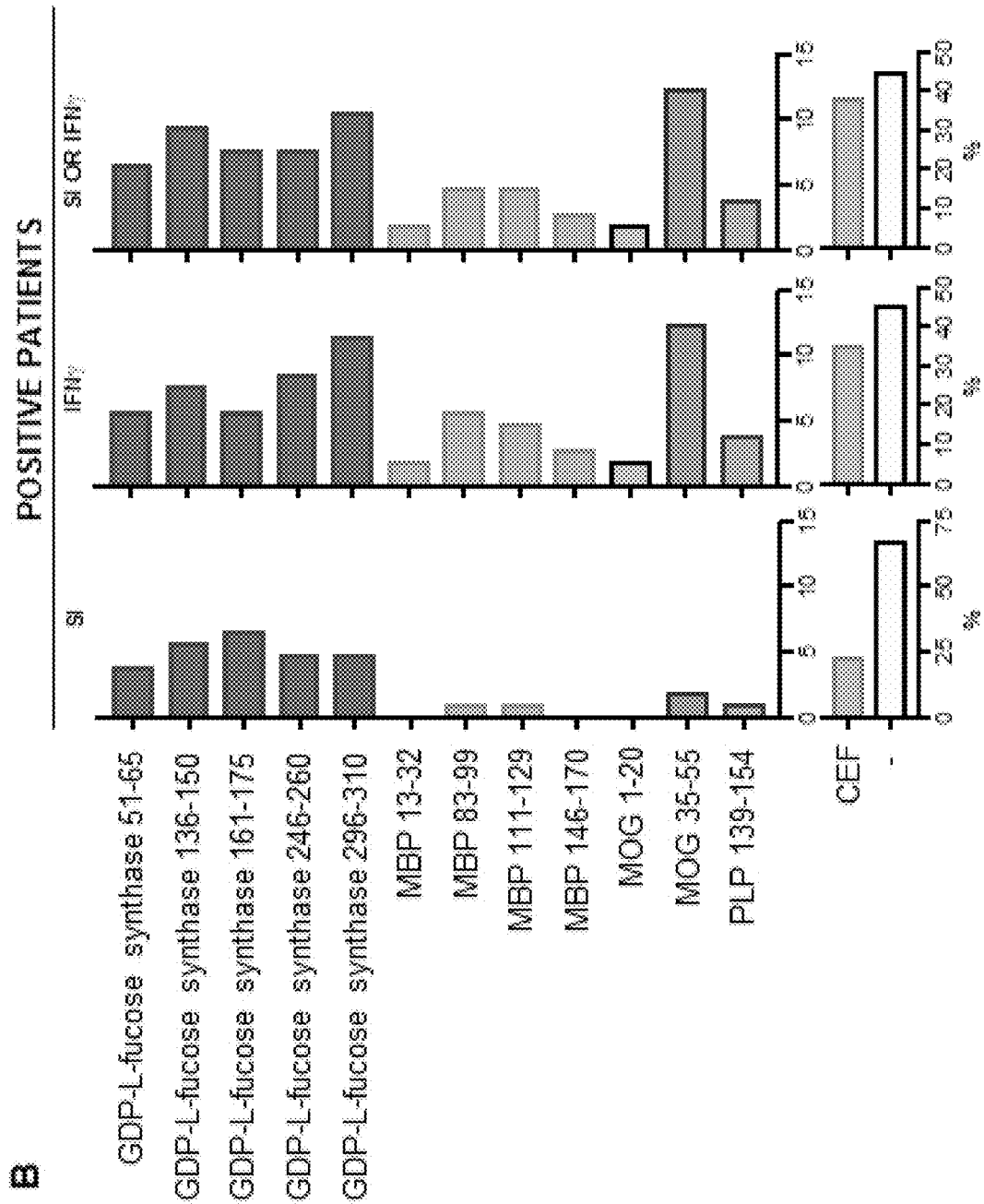
Figure 14 (II)

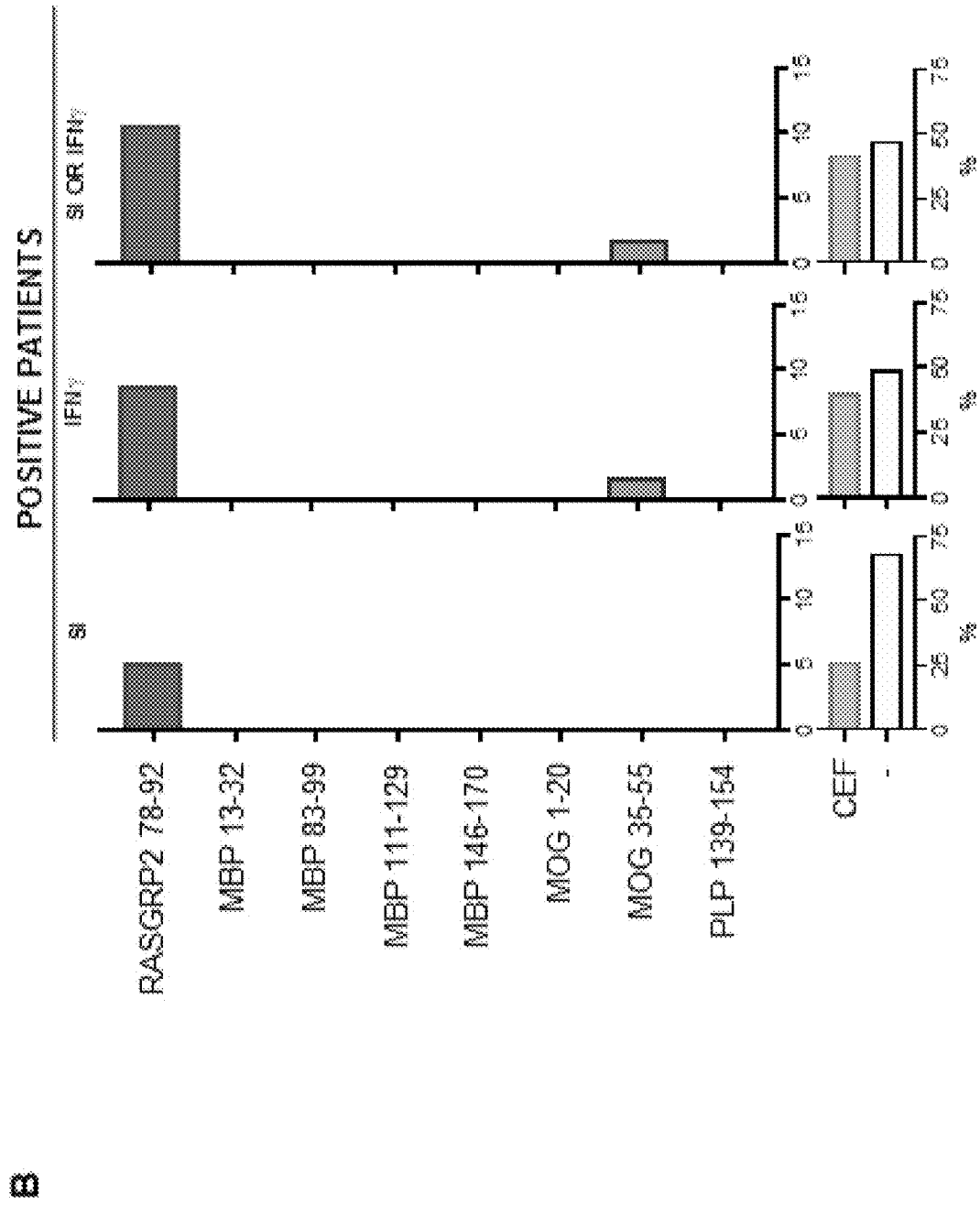
Figure 15 (II)

Figure 16 (I)
A
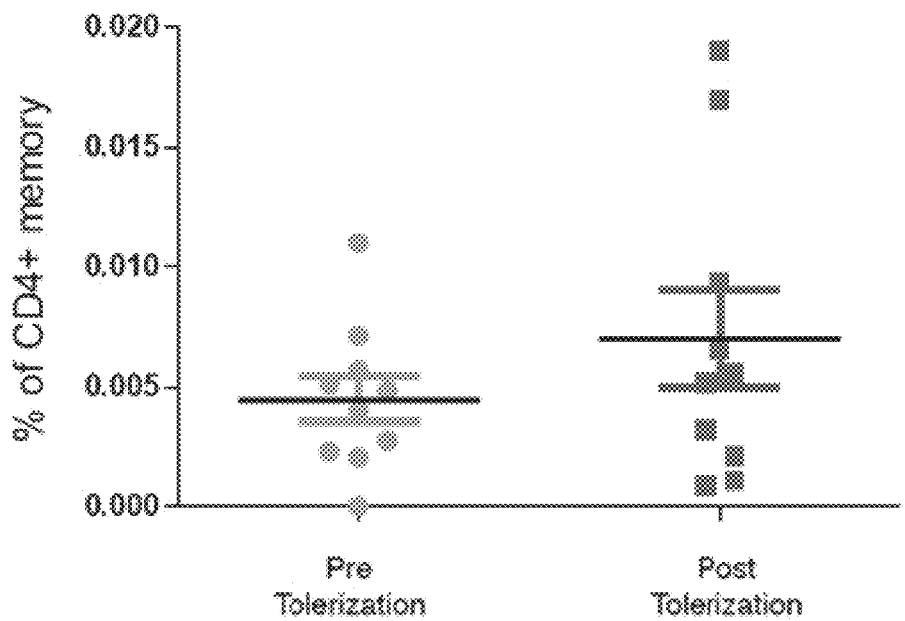
B
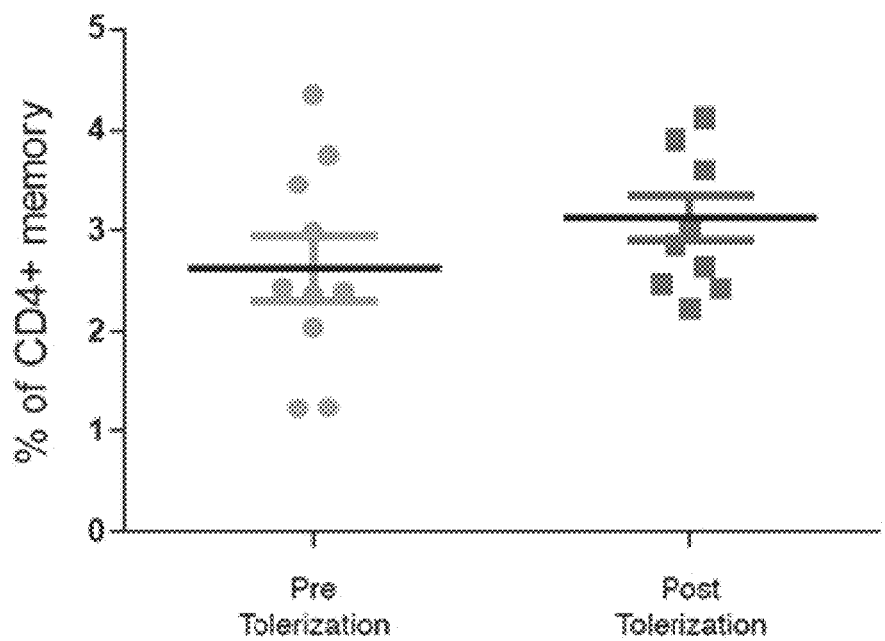

Figure 16 (II)
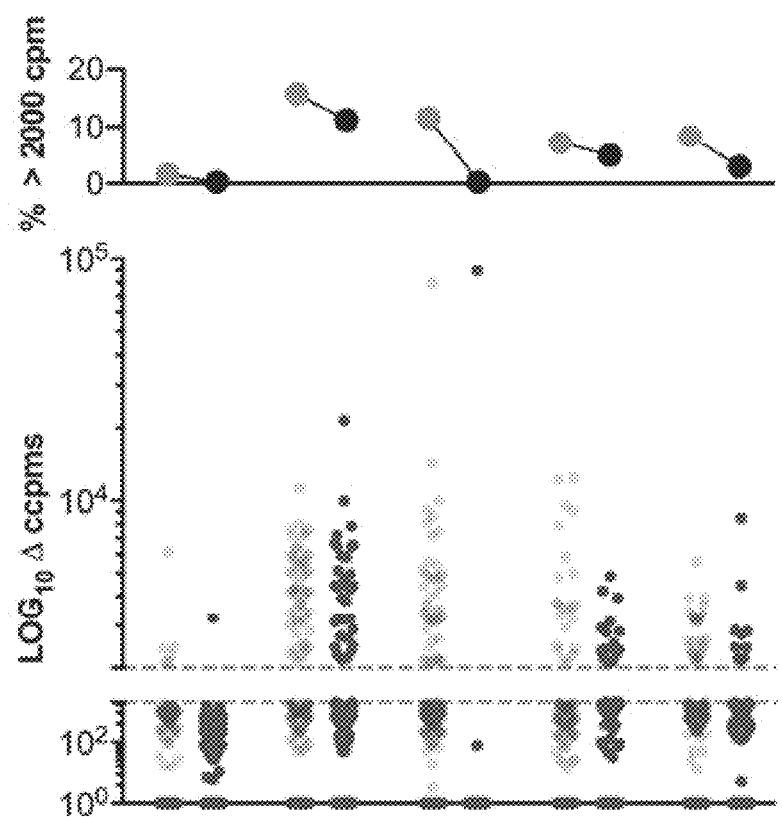

IMMUNODOMINANT PROTEINS AND FRAGMENTS IN MULTIPLE SCLEROSIS

CROSS REFERENCE TO RELATED APPLICATIONS

This application is a National Stage of International Application No. PCT/EP2019/067468, filed Jun. 28, 2019, claiming priority based on European Patent Application No. 18180326.3, filed Jun. 28, 2018.

FIELD OF INVENTION

The disclosure relates to the treatment, diagnosis and/or prevention of multiple sclerosis by using an immunodominant protein or peptide. More particular the invention relates to the field of antigen specific immunotherapies, such as the induction of tolerance.

BACKGROUND OF THE INVENTION

Multiple sclerosis (MS) is a devastating autoimmune inflammatory disease mainly affecting young adults. MS is a prototypic example of an organ-specific autoimmune disease (AID), as the autoimmune response only targets the central nervous system (CNS) consisting of brain and spinal cord. Organ-specific AID means that the immune system of the patient damages a specific tissue or cell type by autoreactive T cells and/or antibodies.

MS preferentially affects young adults between 20 and 40 years, but children and older individuals can also develop MS. The disease is about 2-3 times more frequent in women than in men. MS usually becomes clinically manifest by temporary problems with vision (acute optic neuritis), sensation, or motor and autonomous function, but can lead to a broad range of neurological symptoms.

At the time of first manifestation, when differential diagnoses have been excluded, the disease is referred to as clinically isolated syndrome (CIS) provided that the cerebrospinal fluid (CSF) and magnetic resonance imaging (MRI) findings are consistent with the diagnosis. MRI discloses lesions in locations typical for MS, i.e. juxtacortical, periventricular, in the brain stem or spinal cord. If certain criteria are fulfilled that can be summarized as dissemination in space (more than one lesion or clinical symptom/sign) and time (more than one event) then the diagnosis of relapsing-remitting multiple sclerosis (RRMS) can be made. A special scenario is the accidental discovery of MRI lesions compatible with MS without clinical symptoms. This is referred to as radiologically isolated syndrome (RIS) and can be considered a pre-stage of CIS and RRMS. More than 80% of patients suffer from one of these, and the majority of patients develops later what is called secondary progressive MS (SPMS). At this time, relapses/exacerbations become less frequent or stop altogether and neurological disability increases steadily either between relapses or without these.

A special form of MS is primary progressive MS (PPMS), which never shows relapses, but rather begins with steady worsening of neurological symptoms, e.g. of the ability to walk. PPMS affects approximately 10% of MS patients and males and females with equal frequency. Its onset is usually later than CIS or RRMS. With respect to causes and disease mechanisms PPMS is considered similar to the above RIS-CIS-RRMS-SPMS.

Typically, MS is diagnosed according to the revised McDonald or recently Lublin criteria. These criteria also allow distinguishing between the different forms and disease activity of MS (Thompson et al., 2017, Lancet Neurol, 17 (2): 162-173).

MS is a disease with a complex genetic background. More than 200 MS risk alleles or quantitative traits (common variants of genes detected as single nucleotide polymorphisms, SNPs) have been identified in the last decade, however, by far the most important is the human leukocyte antigen (HLA)-DR15 haplotype. In addition, several environmental/lifestyle risk factors have been found. These include infection with Epstein Barr virus (EBV), smoking, low vitamin D3 levels and obesity as the most important ones.

All the genetic and environmental risk factors are common and shared by many individuals in the healthy population. The exact reasons, why the disease starts in individuals with certain genetic and environmental risk factors, are not clear, but one assumes that viral and bacterial infections, for instance by changes in the gut microbiota, can be triggers. The concordance rate of monozygotic twins of 10-30% and the risk of first-degree relatives of an MS patient of approximately 2-4%, compared to a risk of 1/1000 in the general population, provide an estimate of the genetic versus the environmental risk, although the interplay between the two is also complex.

In order to identify the components of the CNS, against which the autoimmune response in MS is directed, researchers oriented their efforts towards the cells and structures that are affected in MS, particularly myelin and axons/neurons and the proteins that are specific for these cells/structures. During the last thirty years, several myelin proteins such as myelin basic protein (MBP), proteolipid protein (PLP) and myelin oligodendroglia glycoprotein (MOG) have been identified as encephalitogenic in animal models (experimental autoimmune encephalomyelitis; EAE), i.e. their injection into susceptible rodent strains leads to a disease with similarities with MS, but also by examining immune cells from MS patients (Sospedra and Martin, 2005, Annu Rev Immunol, 23:683-747). The above autoantigens are CNS-specific and exclusively (PLP and MOG) or almost exclusively (MBP) expressed in the brain. In MS, a few autoantigens that are not CNS-specific such as alpha-B crystallin and transaldolase-H have also been described as potential targets.

Current evidence suggests CD4+ autoreactive T cells as a central factor for the autoimmune pathogenesis of MS probably relevant not only for the induction and maintenance of the autoimmune response, but also during tissue damage (Sospedra and Martin, 2005). The frequency of high avidity CD4+ T cells reactive to main constituents of the myelin sheath, such as MBP, PLP and MOG is increased in MS patients (Bielekova et al., 2004, J Immunol, 172:3893-3904). Due to their involvement in disease pathogenesis CD4+ T cells are a target for therapeutic interventions.

Detailed investigation of the immune response against the CNS-specific proteins showed that certain peptides thereof are recognized by a large fraction of patients and in the context of the disease-associated HLA-DR molecules. Such peptides are referred to as immunomodominant (Bielekova et al., 2004).

The following characteristics indicate that a certain peptide of a protein is immunodominant in the context of MS:
a) frequent recognition of this peptide by T cells, i.e. by approximately 10% or more of MS patients, often in the context of a disease-associated HLA allele or haplotype (Sospedra and Martin, 2005), and b) recognition of this peptide by disease-relevant T cells such as those that respond to peptides at low concentrations (high avidity T cells) (Bielekova et al., 2004) and are therefore considered particularly dangerous, and/or have a proinflammatory phenotype, and/or are isolated from the target organ or compartment (CNS), in the case of MS, brain-, spinal cord- or CSF-infiltrating T cells.

However, high avidity recognition is not a prerequisite, since low-avidity myelin-specific T cells have also been shown to be pathogenic in humanized transgenic mouse models (Quandt et al. 2012, J Immunol, 189(6): 2897-2908).

It has recently been demonstrated that T cells of MS patients show increased in vitro proliferation in the absence of an exogenous antigen (Mohme et al., 2013, Brain, 136: 1783-1798). These "autoproliferating" T cells are enriched for cells that home to the CNS compartment of MS patients and can thus be considered as a peripheral blood source of brain-/CSF-infiltrating T cells (Jelcic et al., 2018, Cell, 175(1):85-100.e23).

In the case that data from testing T cells in vitro is not available or in addition to such testings, immune recognition of peptides can also be predicted/inferred from those peptides that will bind well to the HLA-class I or -class II alleles of the individual and for CD8+ and CD4+ T cells respectively. Peptide binding predictions are well known to the skilled person. They can be performed by well-established prediction algorithms (NetMHCII—www.cbs.dtu.dk/services/NetMHCII/; IEDB—www.iedb.org/) and analysis of the HLA-binding motifs (SYFPEITHI—www.syfpeithi.de/).

Immunodominant peptides can be used in antigen-specific immunotherapies such as tolerance induction. One example is EP 2 205 273 B1, which discloses immunodominant peptides of MBP, PLP and MOG and their application for MS treatment. In the approach disclosed therein, the peptides are coupled to white or red blood cells.

Tolerance induction is antigen-specific and renders autoreactive T cells non-functional or anergic or induces regulatory T (Treg) cells that specifically suppress untoward autoimmunity to said target antigens. The induction of tolerance to target autoantigens is a highly important therapeutic goal in autoimmune diseases. It offers the opportunity to attenuate specifically the pathogenic autoimmune response in an effective way with few side effects. Tolerance induction can also be achieved by applying a whole protein instead of or in addition to an immunodominant peptide being a fragment of the protein (Kennedy MK et al., 1990, J Immunol, 144(3):909-15).

Some pathological characteristics of MS are reflected in the EAE model, a paradigmatic animal model of Th1/Th17 cell-driven autoimmune disease. Studies in relapsing EAE (R-EAE) in the SJL mouse have clearly shown that chronic demyelination involves the activation of T cell responses to an immunodominant myelin peptide, i.e. PLP 139-154, to which the first disease exacerbation is directed. Subsequently, the immune response broadens to other myelin peptides of PLP, MBP and MOG, a process, which is referred to as epitope spreading. Unresponsiveness of T cells, i.e. tolerance, can for example be induced when antigen presenting cells (APC) pulsed with antigenic peptide are for example treated with the cross linker 1-ethyl-3-(3-dimethylaminopropyl)-carbodiimide (ECDI; also abbreviated EDC).

Preclinical experiments have proven that a single i.v. injection of naïve murine splenocytes pulsed with a mixture of encephalitogenic myelin peptides and fixed with the cross-linker EDC is highly efficient in inducing peptide-specific tolerance in vivo. In EAE, this protocol not only prevented animals from disease, but even effectively reduced the onset and severity of all subsequent relapses when given after disease induction, indicating that specific tolerance can downregulate an ongoing autoimmune response (Miller et al., 1991, Acad Sci, 636:79-94). More relevant to the treatment of MS, studies in EAE have shown that tolerance can be simultaneously induced to multiple epitopes using a cocktail of encephalitogenic myelin peptides, thus providing the capacity to target autoreactive T cells with multiple specificities.

Tolerization of human T cells by autologous antigen-coupled cells, e. g. APCs (Vandenbark et al., 2000, Int Immunol, 12:57-66) or non-nucleated cells, i.e. red blood cells (RBCs), treated with EDC is effective in vitro as shown by failure of tolerized T cells to proliferate or to produce Th1 cytokines and a decreased expression of costimulatory molecules on these cells.

There is evidence that at least two distinct mechanisms are involved in the induction of antigen-specific tolerance by this regime:
1) Direct tolerance where Th1 clones encountering nominal antigen/MHC complexes on antigen-coupled APCs were anergized as a result of failure to receive adequate CD28-mediated costimulation, and
2) indirect mechanisms such as cross tolerance, where tolerance is induced by reprocessing and re-presentation of antigens by tolerogenic host APCs and/or expansion of Treg cells.

The latter cross tolerance likely involves the induction and/or expansion of antigen-specific Treg cells which assumption is also supported by data obtained in a phase Ib trial as dislosed herein. Further, treatment of cells with EDC induces apoptosis in a substantial percentage of treated cells. Thus, an indirect mechanism that involves fixed APC undergoing apoptosis, which are then processed and represented by host APC, is likely. This is further supported by effective induction of tolerance in MHC-deficient and allogeneic mice. In-vitro bone marrow-derived dendritic cells effectively phagocytose and process antigen-pulsed, fixed APC.

Currently approved therapies for MS involve various antigen-nonspecific immunomodulating or immunosuppressive strategies, which are only partially effective. All current therapeutics need to be taken orally daily or injected/infused at various time intervals and for long periods of time. Further, they are associated with numerous and sometimes severe side effects.

A therapy that addresses the pathogenesis of MS at its roots should aim to specifically delete or functionally inhibit pathogenic autoreactive cells without altering the "normal" immune system. This is of importance because global immunomodulation and/or immunosuppression come at the cost of inhibiting beneficial regulatory cells and immune cells that serve protective functions against pathogens. Ideally, peptide-specific immune tolerance, that is the specific correction of the misdirected autoimmune response against brain/spinal cord tissue, should be achieved early in the inflammatory phase of the disease, when blockade of the autoreactive immune response can inhibit dissemination and propagation of the disease and irreversible disability can be prevented. Therefore, the preferred targeted patient group are relapsing-remitting MS patients early in the disease course or even patients presenting with a first clinical event suggestive of MS, i.e. CIS, or patients, in whom the disease is discovered even earlier at the stage of RIS. At this time point, MS patients generally have a low grade of neurologic disability, which allows them to participate in all activities of daily life and work without significant compromise.

SUMMARY OF THE INVENTION

It is an object of the present invention to identify MS-relevant antigens suitable for use in the treatment, diagnosis and/or prevention of MS, in particular in a tolerization approach. A further aspect of the present invention is the identification of a human subject, who is suitable for tolerization.

The present invention is based on a novel approach for identifying MS-relevant antigens: T cells clonally expanded in the brain of an MS patient (homozygous for the HLA DR15 haplotype, which is known to be the major genetic risk factor in MS), who died of a very aggressive form of MS were examined. Thereby, for the first time T cells originating from and clonally expanded in the target organ were analyzed for the purpose of antigen identification. In all previous approaches, peripheral blood lymphocytes were analyzed to identify immunodominant antigens.

The clonal expansion of a T cell clone (TCC) in MS brain lesions suggests that the cells are MS-relevant. Herein, the target antigens of a specific TCC that has previously been described in Planas et al. (Planas et al., 2015, Ann Clin Transl Neurol, 2(9):875-893), TCC21.1, have been identified. Furthermore, the target antigens of another TCC (TCC14) of the same patient have been identified. In the case of TCC14, the clone was isolated from a peripheral blood T cell population that was identified as disease-relevant by demonstrating increased spontaneous proliferation (autoproliferation) and enrichment for brain-homing autoreactive T cells. Specifically, TCC14 was also found to be clonally expanded in MS brain lesions, even though it had been isolated from the peripheral blood. The isolation and identification of disease-relevant T cells like TCC21.1 and TCC14 is schematically depicted in FIG. 1.

Target epitopes that are recognized by biologically relevant (e. g. tissue-infiltrating) T cells can then be identified (FIG. 2).

This novel approach revealed the proteins GDP-L-fucose synthase (gene abbreviation: TSTA3; also known as: GDP-L-fucose:NADP+ 4-oxidoreductase (3,5-epimerizing) or GDP-4-keto-6-deoxy-D-mannose-3,5-epimerase-4-reductase) and proteins of the RASGRP (RAS guanyl releasing protein) family, including RASGRP1, RASGRP2, RASGRP3 and RASGRP4 as well as splice variants and isoforms thereof as particularly relevant in MS. RASGRP2 is especially preferred. Thus, these proteins have been found to be immunodominant in MS and are autoantigens.

The relevance has also been tested in CSF-infiltrating CD4+ T cells from CIS/MS patients for GDP-L-fucose synthase and in peripheral blood-derived mononuclear cells for RASGRP2. In a further analysis, both GDP-L-fucose synthase and RASGRP2 have been tested in CSF-infiltrating CD4+ T cells from CIS/MS patients.

Thus, the antigens as described herein in the examples are the first immunodominant antigens in MS, which have been discovered by examining the specificity of T cells that are clonally expanded in MS brain lesions and therefore can be assumed to be involved in the damaging autoimmune reaction in the brain. The methodology that led to their identification, combinatorial peptide libraries, does not involve the above-mentioned focus on myelin/brain proteins, but is completely bias-free. The antigens have not been described as implicated in MS before. Further, RNA sequencing and proteomics have shown that both autoantigens, GDP-L-fucose synthase and RASGRP2 and the related proteins RASGRP1 and -3, are expressed in MS brain tissue.

The identified antigens can be used in the treatment, diagnosis and/or prevention of MS, in particular in a tolerization approach, and for identifying a human subject, who is suitable for tolerization. By identifying a human subject, who is suitable for tolerization, the human subject can be in vitro diagnosed with MS. In other words, the identified autoantigens can be used in the in vitro diagnosis of MS. This in vitro testing can be complemented with clinical and imaging findings, i.e. the MS diagnosis according to the state of the art, in particular according to the revised McDonald criteria. Thus, the identified autoantigens may serve diagnosing MS in a human subject either with or without additional diagnostic tests.

BRIEF DESCRIPTION OF THE FIGURES

FIG. 4 Summary of human decapeptides predicted with the biometrical approach, synthesized and tested for stimulatory capacity FIG. 5 GDP-L-fucose synthase transcripts and peptides identified in brain tissue FIG. 6 GDP-L-fucose synthase, myelin and CEF Peptides (control peptides from cytomegalovirus, Epstein Barr virus and influenza virus)

DETAILED DESCRIPTION OF THE INVENTION

Figure 1:
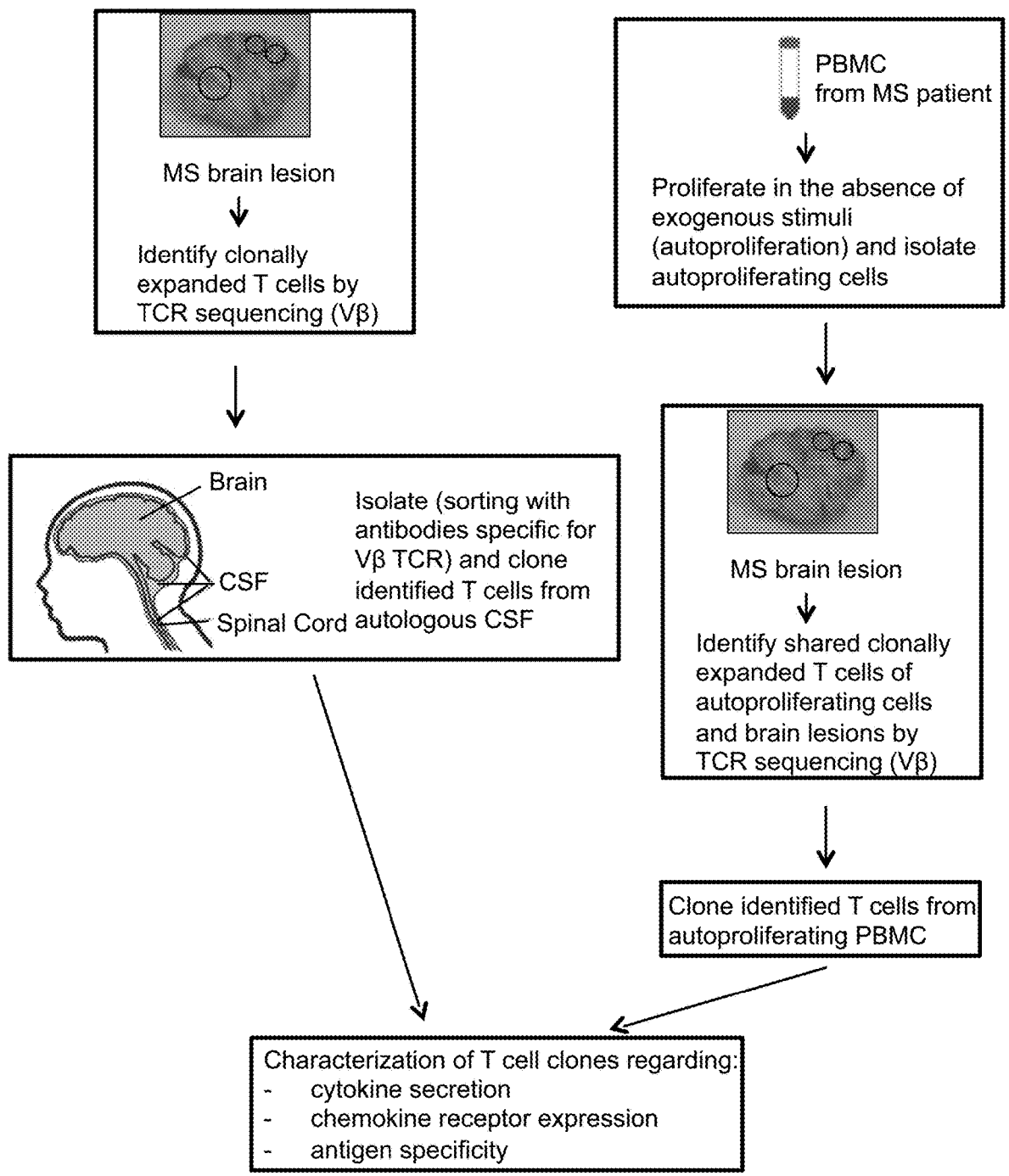
FIG. 1 Isolation of disease-relevant T cells

T cells used for identifying immunodominant peptides and the corresponding protein are ideally those T cells that are pathogenetically relevant for the disease. Regarding the latter characteristic, those T cells that are clonally expanded in the target tissue of MS, the brain, spinal cord and CSF, are of greatest interest for identification of disease-relevant target antigens. According to a method as described by Planes et al. (2015) next-generation sequencing of T cell receptor (TCR) beta chain complementary- or genomic-DNA sequences has been used to identify clonally expanded T cells in brain autopsy lesions of MS patients and to isolate these T cells as TCC from autologous CSF and/or tissue (comprising living cells and obtained by, e.g. biopsy or early autopsy) and characterize them with respect to functional phenotype and antigen specificity. Thereby disease-relevant TCC have been isolated. Specifically, TCC21.1 has been identified and characterized: TCC21.1 displayed a Th2 phenotype releasing mainly Th2 cytokines and was able to provide B cell help for antibody production. This strategy has led to the identification of the relevance of the GDP-L-fucose synthase protein.

The above strategy, i.e. deep TCR sequencing of brain/spinal cord/CSF-infiltrating T cells, has also been used to isolate disease-relevant T cells from peripheral blood and clone identified T cells from autoproliferating peripheral blood mononuclear cells (PBMC). This strategy has led to the identification of the relevance of the RASGRP protein family.

The present studies with CSF-infiltrating T cells (for GDP-L-fucose synthase and in a further analysis for both GDP-L-fucose synthase and RASGRP2) and with peripheral blood T cells (for RASGRP2) thus demonstrate that these are immunodominant targets of the autoimmune response in MS, and both GDP-L-fucose synthase and RASGRP2 (and other members of the RASGRP family) are recognized by brain-infiltrating T cells in MS, including CIS, RRMS and SPMS. The NetMHCII and the IEDB in silico peptide binding prediction algorithms have also been used to identify immunodominant regions within the respective protein (as described in "Examples").

The cytosolic enzyme GDP-L-fucose synthase converts GDP-4-keto-6-deoxy-D-mannose into GDP-L-fucose, which is then used by fucosyltransferases to fucosylate all oligosaccharides. In mammals, fucosylated glycans play important roles in many biological processes including blood transfusion reactions, host-microbe interactions, cancer pathogenesis and maintenance of a non-inflammatory environment in the brain.

The RASGR proteins exist in at least the four variants RASGRP1, RASGRP2, RASGRP3 and RASGRP4. RASGRP1, RASGRP2, RASGRP3 in particular have been implicated in the present invention. The protein family is characterized by the presence of a Ras superfamily guanine nucleotide exchange factor (GEF) domain which functions as a diacylglycerol (DAG)-regulated nucleotide exchange factor specifically activating Ras through the exchange of bound GDP for GTP. The proteins of the protein family activate the Erk/MAP kinase cascade. They are involved in reduced apoptosis and tumorigenesis of EBV-infected B cells, B and T cell signaling, -adhesion, -motility and are crucial for maintaining B-T cell homeostasis. At least four isoforms, i.e. splice variants, of RASGRP2 exist.

The identified antigens GDP-L-fucose synthase and RASGRP2 (as well as RASGRP1, RASGRP3 and RASGRP4) have not been implicated in MS etiology or pathogenesis or its animal model, EAE, before. The present finding that both proteins or fragments, derivatives or splice variants thereof are an immunodominant target of the autoimmune response in MS allows using them in the treatment, diagnosis and/or prevention of MS.

A protein is intended to mean oligopeptides, polypeptides as well as proteins as such. A protein sequence may be defined by a GenBank entry. A protein sequence may also be defined by a UniProtKB/Swiss-Prot entry and/or by a GenPept entry. An entry may be defined by a number, e. g. an accession number. Where applicable, the database entries include the respective accession number (i.e. an entry number) and version number. A protein may also be defined by any other database known to the skilled person. Different isoforms, derivatives and/or splice variants may exist which are also encompassed by the present invention. Thereby, the sequence may vary from the known sequence from, for example, the GenBank or UniProtKB/Swiss-Prot entry.

"A" protein or "the" protein according to the present invention refers to either a GDP-L-fucose synthase protein or a protein of the RASGRP protein family, preferably RASGRP2, or refers to both a GDP-L-fucose synthase protein or a protein of the RASGRP protein family, preferably RASGRP2, unless otherwise explicitly mentioned.

A splice variant arises from alternative splicing during gene expression. The splice variant according to the invention is preferably immunodominant.

A fragment is preferably any part of the protein, which is shorter, i.e. has less amino acids, than the parent protein. A fragment may be a peptide. In one embodiment, the fragment comprises 5 to 50, preferably 5 to 20, more preferably 10 to 15 amino acids, even more preferably 15 amino acids. The fragment according to the invention is preferably immunodominant.

It is also possible to use more than one fragment according to the invention. Preferably, more than three, more than five, more than 10, more than 15, or even more than 20 different fragments are used. In a preferred embodiment, between five and 20, preferably between five and 15 different fragments are used. A fragment is different from another fragment if it does not consist of the same amino acid sequence.

In another embodiment, at least one fragment of each protein according to the present invention (a GDP-L-fucose synthase protein or a protein of the RASGRP protein family, preferably RASGRP2) are used in combination. It is particularly advantageous to combine at least one fragment of each protein according to the present invention with at least one known peptide of the state of the art, in particular with at least one myelin peptide, in particular with at least one or all of the myelin peptides as defined by SEQ ID NOs: 261 to 267.

A derivative of a sequence is preferably defined as an amino acid sequence which shares a homology or identity over its entire length with a corresponding part of the reference amino acid sequence of at least 75%, more preferably at least 80%, at least 85%, at least 90%, at least 93%, at least 95%, at least 97%, at least 98% or at least 99%. The "corresponding part" in the sense of the present invention preferably refers to the same stretch of amino acids of the same parent sequence. For example, if a derivative with a length of 100 amino acids differs from a stretch of amino acids of SEQ ID NO: 1 (amino acids 1 to 100 of SEQ ID NO: 1) by 20 amino acids, this particular derivative shares an identity of 80% over its entire length with the corresponding part, i.e. amino acids 1 to 100, of the reference amino acid sequence, i.e. SEQ ID NO: 1. The derivative according to the invention is preferably immunodominant.

A "homology" or "identity" of an amino acid sequence is preferably determined according to the invention over the entire length of the reference amino acid sequence or over the entire length of the corresponding part of the reference amino acid sequence which corresponds to the sequence which homology or identity is defined.

An "identity" is defined as identical amino acids, a "homology" comprises identical amino acids as well as conservative substitutions. The person skilled in the art is aware of conservative substitutions, such as
aromatic and aromatic F and W/Y
positively charged and positively charged R and K/H negatively charged E and D or aliphatic V and L/M/I, or A and S/T.

The nucleotide sequence encoding any of the proteins of the present invention or fragment, derivative or splice variant thereof refers to any coding nucleotide sequence, for example RNA or DNA, in particular mRNA or cDNA. In one embodiment, the nucleotide sequence is a plasmid or any type of vector known to the person skilled in the art. In a preferred embodiment, the nucleotide sequences do not comprise introns and the gene sequences comprise exons and introns.

In one aspect of the invention, the protein for use in the treatment, diagnosis and/or prevention of multiple sclerosis (MS) is GDP-L-fucose synthase or a fragment, derivative or splice variant thereof. In another aspect of the invention, the protein is a member of the RASGRP family or a fragment, derivative or splice variant thereof. The invention also refers to a nucleotide sequence encoding any of the proteins or fragment, derivative or splice variant thereof, for use in the treatment, diagnosis and/or prevention of multiple sclerosis (MS).

In a preferred embodiment, the proteins are human proteins and/or the nucleotide sequences and/or gene sequences are human sequences.

In one embodiment, the GDP-L-fucose synthase shows enzyme activity converting GDP-4-keto-6-deoxy-D-mannose into GDP-L-fucose.

In another embodiment, the member of the RASGRP family activates Ras through the exchange of bound GDP for GTP. Additionally or alternatively, the protein activates the Erk/MAP kinase cascade.

In a preferred embodiment, the GDP-L-fucose synthase protein a) has the amino acid sequence as set forth in SEQ ID NO: 1 or
b) has an amino acid sequence which is at least 85%, preferably at least 90%, more preferably at least 95% identical to the amino acid sequence as set forth in SEQ ID NO: 1 or
c) has an amino acid sequence which is at least 70%, preferably at least 80%, more preferably at least 90% homologous to the amino acid sequence as set forth in SEQ ID NO: 1 or
d) has an amino acid sequence which is at least 60%, preferably at least 70%, more preferably at least 80%, even more preferably at least 90% homologous to the amino acid sequence as set forth in SEQ ID NO: 1 and the protein or fragment or splice variant thereof binds to an autologous HLA allele, is recognized by a T cell and/or is recognized by an antibody which binds to or recognizes the amino acid sequence as set forth in SEQ ID NO: 1 or a fragment thereof or
e) is encoded by a TSTA3 gene, in particular by a gene sequence of nucleotides 143612618 to 143618048 of NC_000008.11, or is encoded by a gene which is at least 80%, preferably at least 90%, even more preferably at least 95% identical to the gene sequence of nucleotides 143612618 to 143618048 of NC_000008.11.

In another preferred embodiment, the member of the RASGRP protein family f) has the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
g) has an amino acid sequence which is at least 85%, preferably at least 90%, more preferably at least 95% identical to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
h) has an amino acid sequence which is at least 70%, preferably at least 80%, more preferably at least 90% homologous to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
i) has an amino acid sequence which is at least 60%, preferably at least 70%, more preferably at least 80%, even more preferably at least 90% homologous to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 and the protein or fragment or splice variant thereof binds to an autologous HLA allele, is recognized by a T cell and/or is recognized by an antibody which binds to or recognizes the respective amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or a fragment thereof or
j) is encoded by a RASGRP gene, in particular by a gene sequence of nucleotides
38488101 to 38565575 of NC_000015.10,
64726911 to 64745456 of NC_000011.10,
33436324 to 33564750 of NC_000002.12, or
38409051 to 38426305 of NC_000019.10,
or is encoded by a gene which is at least 80%, preferably at least 90%, even more preferably at least 95% identical to the gene sequence of nucleotides
38488101 to 38565575 of NC_000015.10,
64726911 to 64745456 of NC_000011.10,
33436324 to 33564750 of NC_000002.12, or
38409051 to 38426305 of NC_000019.10.

The binding to an autologous HLA allele, recognition by a T cell and/o recognition by an antibody may indicate immunodominance of the protein or fragment or splice variant thereof. Immunodominance can also be tested as disclosed below.

In a particularly preferred embodiment, a GDP-L-fucose synthase or RASGRP2 protein or splice variant thereof, preferably the GDP-L-fucose synthase or RASGRP2 protein, is used in the present invention. The GDP-L-fucose synthase protein has, for example, the sequence as set forth in SEQ ID NO: 1, the RASGRP2 protein has, for example, the sequence as set forth in SEQ ID NO: 2, SEQ ID NO: 6, SEQ ID NO: 7, SEQ ID NO: 8 or SEQ ID NO: 9.

In one embodiment, the fragment comprises 5 to 50, preferably 5 to 20, more preferably 10 to 15, even more preferably 15 amino acids.

In another embodiment, the fragment is a) at least 85%, preferably at least 90%, more preferably at least 95% identical to a respective corresponding amino acid sequence or
b) at least 70%, preferably at least 80%, more preferably at least 90% homologous to a respective corresponding amino acid sequence or
c) at least 60%, preferably at least 70%, more preferably at least 80%, even more preferably at least 90% homologous to a respective corresponding amino acid sequence and binds to an autologous HLA allele, is recognized by a T cell and/or is recognized by an antibody which binds to or recognizes the respective amino acid sequence.

The "respective corresponding amino acid sequence" refers to the respective fragment of the corresponding amino acid sequence (i.e. SEQ ID NO: 1) with the same length as the homologous fragment (see also definition of "corresponding part" supra). A fragment with these identities and/or homologies may comprise 5 to 50, preferably 5 to 20, more preferably 10 to 15, even more preferably 15 amino acids. The identity and/or homology is determined over the entire length of the respective fragment. In other words, the "corresponding amino acid sequence" refers to the unaltered sequence, i.e. when a fragment of a sequence as set forth in SEQ ID NO: 1 is 85% identical to a respective corresponding amino acid, the fragment is 85% identical (over the entire length of the fragment) to the unaltered fragment as "excised", i.e. directly taken or copied from SEQ ID NO: 1.

Therefore, in one embodiment, the protein (GDP-L-fucose synthase or a member of the RASGRP protein family) has an amino acid sequence with a certain homology (at least 60%, preferably at least 70%, more preferably at least 80%, even more preferably at least 90%) to the respective depicted sequence as set forth in the SEQ ID NOs with the additional requirement that the protein or fragment or splice variant thereof binds to an autologous HLA allele, is recognized by a T cell and/or is recognized by an antibody which binds to or recognizes the amino acid sequence as set forth in the respective SEQ ID NO or a fragment thereof. In another embodiment, the protein or fragment or splice variant thereof binds to an autologous HLA allele and is recognized by a T cell which binds to or recognizes the amino acid sequence as set forth in the respective SEQ ID NO or a fragment thereof.

Assays for measuring and/or predicting binding to an autologous HLA allele, recognition by a T cell or recognition by an antibody are well known to the person skilled in the art. Binding of a peptide to an HLA allele can for example be predicted by the using the well-accepted NetMHCII (http://www.cbs.dtu.dk/services/NetMHCII/) or IEDB (http://www.iedb.org/) in silico peptide binding prediction algorithms. T cell recognition can for example be measured by a T cell proliferation assay, for example by measuring incorporated radioactivity. Binding of a peptide and/or a protein to an antibody can be measured by standard assays known to the person skilled in the art, for example by ELISA. The binding to an autologous HLA allele, recognition by a T cell or recognition by an antibody may indicate immunodominance of a peptide or protein. Immunodominance can also be tested as disclosed below.

In one embodiment, the fragment represents a stretch of consecutive amino acids (for example, 20 to 30 amino acids) which are at least 90% identical or homologous between proteins of the RASGRP family.

In a preferred embodiment the peptides used for the treatment according to the invention are fragments of GDP-L-fucose synthase or of a protein of the RASGRP protein family and comprise a sequence selected from the group consisting of SEQ ID NOs: 10 to 98. In especially preferred embodiments the peptides consist of amino acid sequences as depicted in one of the SEQ ID NOs: 10 to 98. The sequences of SEQ ID NOs: 10 to 35 are preferred.

The sequences according to SEQ ID NOs: 10 to 35 have been identified as immunodominant peptides due to being recognized by disease-relevant T cells, and subsequent validation of recognition by CSF-infiltrating bulk T cells for GDP-L-fucose synthase and PBMC for RASGRP2, (cf. "Examples"). The amino acid sequences according to SEQ ID NOs: 36 and 37 represent a stretch of identical sequences between RASGRP2 and RASGRP3 (alignment of UniProtKB/Swiss-Prot Q7LDG7-1 and UniProtKB/Swiss-Prot Q8IV61). The amino acids according to SEQ ID NOs 38 to 98 are comprised in peptide pools which gave rise to reactions of memory T cells from MS patients (cf. 9. of Examples and FIG. 10). Sequences with SEQ ID NOs: 12, 21, 23, 28 and 32 (GDP-L-fucose synthase) and with SEQ ID NO: 46 (RASGRP2) have been validated in a further analysis with CSF-infiltrating CD4+ T cells (cf. 13. of "Examples" and FIGS. 14 and 15).

The sequences of SEQ ID NOs: 1-98 are also listed in the following Table 1:

TABLE 1

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| 1 | MGEPQGSMRILVTGGSGLVGKAIQKVVADGAGL PGEDWVFVSSKDADLTDTAQTRALFEKVQPTHVI HLAAMVGGLFRNIKYNLDFWRKNVHMNDNVLHS AFEVGARKVVSCLSTCIFPDKTTYPIDETMIHNGP PHNSNFGYSYAKRMIDVQNRAYFQQYGCTFTAVI PTNVFGPHDNFNIEDGHVLPGLIHKVHLAKSSGS ALTVWGTGNPRRQFIYSLDLAQLFIWVLREYNEV EPIILSVGEEDEVSIKEAAEAVVEAMDFHGEVTFD TTKSDGQFKKTASNSKLRTYLPDFRFTPFKQAVK ETCAWFTDNYEQARK | 1-321 (whole protein) | GenBank AAH93061.1 or UniProtKB/Swiss-Prot: Q13630 (GDP L-fucose synthase) |
| 2 | AAAAARPAGGSARRWGRPGRCGLLAAGPKRVR SEPGGRLPERSLGPAHPAPAAMAGTLDLDKGCT VEELLRGCIEAFDDSGKVRDPQLVRMFLMMHPW YIPSSQLAAKLLHIYQQSRKDNSNSLQVKTCHLVR YWISAFPAEFDLNPELAEQIKELKALLDQEGNRR HSSLIDIDSVPTYKWKRQVTQRNPVGQKKRKMSL LFDHLEPMELAEHLTYLEYRSFCKILFQDYHSFVT HGCTVDNPVLERFISLFNSVSQWVQLMILSKPTA PQRALVITHFVHVAEKLLQLQNFNTLMAVVGGLS HSSISRLKETHSHVSPETIKLWEGLTELVTATGNY | 1-662 (whole protein) | GenBank AAI10307.1 (RASGRP2) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| | GNYRRRLAACVGFRFPILGVHLKDLVALQLALPD WLDPARTRLNGAKMKQLFSILEELAMVTSLRPPV QANPDLLSLLTVSLDQYQTEDELYQLSLQREPRS KSSPTSPTSCTPPPRPPVLEEWTSAAKPKLDQAL VVEHIEKMVESVFRNFDVDGDGHISQEEFQIIRGN FPYLSAFGDLDQNQDGCISREEMVSYFLRSSSVL GGRMGFVHNFQESNSLRPVACRHCKALILGIYKQ GLKCRACGVNCHKQCKDRLSVECRRRAQSVSLE GSAPSPSPMHSHHHRAFSFSLPRPGRRGSRPPE IREEEVQTVEDGVFDIHL | | |
| 3 | MGTLGKAREAPRKPSHGCRAASKARLEAKPANS PFPSHPSLAHITQFRMMVSLGHLAKGASLDDLID SCIQSFDADGNLCRSNQLLQVMLTMHRIVISSAEL LQKVITLYKDALAKNSPGLCLKICYFVRYWITEFW VMFKMDASLTDTMEEFQELVKAKGEELHCRLIDT TQINARDWSRKLTQRIKSNTSKKRKVSLLFDHLE PEELSEHLTYLEFKSFRRISFSDYQNYLVNSCVKE NPTMERSIALCNGISQWVQLMVLSRPTPQLRAEV FIKFIQVAQKLHQLQNFNTLMAVIGGLCHSSISRLK ETSSHVPHEINKVLGEMTELLSSSRNYDNYRRAY GECTDFKIPILGVHLKDLISLYEAMPDYLEDGKVN VHKLLALYNHISELVQLQEVAPPLEANKDLVHLLT LSLDLYYTEDEIYELSYAREPRNHRAPPLTPSKPP VVVDWASGVSPKPDPKTISKHVQRMVDSVFKNY DHDQDGYISQEEFEKIAASFPFSFCVMDKDREGL ISRDEITAYFMRASSIYSKLGLGFPHNFQETTYLK PTFCDNCAGFLWGVIKQGYRCKDCGMNCHKQC KDLVVFECKKRAKNPVAPTENNTSVGPVSNLCSL GAKDLLHAPEEGPFTFPNGEAVEHGEESKDRTIM LMGVSSQKISLRLKRAVAHKATQTESQPWIGSEG PSGPPFVLSSPRKTAQDTLYVLPSPTSPCPSPVLV RKRAFVKWENKDSLIKSKEELRHLRLPTYQELEQ EINTLKADNDALKIQLKYAQKKIESLQLEKSNHVLA QMEQGDCS | 1-797 (whole protein) | Gen Bank AAC97349.1 or UniProtKB/Swiss-Prot: O95267 (RASGRP1) |
| 4 | MGSSGLGKAATLDELLCTCIEMFDDNGELDNSYL PRIVLLMHRWYLSSTELAEKLLCMYRNATGESCN EFRLKICYFMRYWILKFPAEFNLDLGLIRMTEEFR EVASQLGYEKHVSLIDISSIPSYDWMRRVTQRKK VSKKGKACLLFDHLEPIELAEHLTFLEHKSFRRISF TDYQSYVIHGCLENNPTLERSIALFNGISKWVQLM VLSKPTPQQRAEVITKFINVAKKLLQLKNFNTLMA VVGGLSHSSISRLKETHSHLSSEVTKNWNEMTEL VSSNGNYCNYRKAFADCDGFKIPILGVHLKDLIAV HVIFPDWTEENKVNIVKMHQLSVTLSELVSLQNA SHHLEPNMDLINLLTLSLDLYHTEDDIYKLSLVLEP RNSKSQPTSPTTPNKPVVPLEWALGVMPKPDPT VINKHIRKLVESVFRNYDHDHDGYISQEDFESIAA NFPFLDSFCVLDKDQDGLISKDEMMAYFLRAKSQ LHCKMGPGFIHNFQEMTYLKPTFCEHCAGFLWGI IKQGYKCKDCGANCHKQCKDLLVLACRRFARAP SLSSGHGSLPGSPSLPPAQDEVFEFPGVTAGHR DLDSRAITLVTGSSRKISVRLQRATTSQATQTEPV WSEAGWGDSGSHTFPKMKSKFPHDKAAKDKGFA KWENEKPRVHAGVDVVDRGTEFELDQDEGEET RQDGEDG | 1-690 (whole protein) | GenBank AAY15037.1 or UniProtKB/Swiss-Prot Q8IV61 (RASGRP3) |
| 5 | MNRKDSKRKSHQECTGKIGGRGRPRQVRRHKT CPSPREISKVMASMNLGLLSEGGCSEDELLEKCI QSFDSAGSLCHEDHMLNMVLAMHSWVLPSADLA ARLLTSYQKATGDTQELRRLQICHLVRYWLMRHP EVMHQDPQLEEVIGRFWATVAREGNSAQRRLGD SSDLLSPGGPGPPLPMSSPGLGKKRKVSLLFDHL ETGELAQHLTYLEFRSFQAITPQDLRSYVLQGSV RGCPALEGSVGLSNSVSRWVQVMVLSRPGPLQ RAQVLDKFIHVAQRLHQLQNFNTLMAVTGGLCHS AISRLKDSHAHLSPDSTKALLELTELLASHNNYAR YRRTWAGCAGFRLPVLGVHLKDLVSLHEAQPDR LPDGRLHLPKLNNLYLRLQELVALQGQHPPCSAN EDLLHLLTLSLDLFYTEDEIYELSYAREPRCPKSLP | 1-673 (whole protein) | UniProtKB/Swiss-Prot Q8TDF6 or Gen Pept NP_733749.1 (RASGRP4) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| | PSPFNAPLVVEWAPGVTPKPDRVTLGRHVEQLV ESVFKNYDPEGRGTISQEDFERLSGNFPFACHGL HPPPRQGRGSFSREELTGYLLRASAICSKLGLAF LHTFHEVTFRKPTFCDSCSGFLWGVTKQGYRCR ECGLCCHKHCRDQVKVECKKRPGAKGDAGPPG APVPSTPAPHASCGSEENHSYTLSLEPETGCQLR HAWTQTESPHPSWETDTVPCPVMDPPSTASSKL DS | | |
| 6 | MAGTLDLDKGCTVEELLRGCIEAFDDSGKVRDP QLVRMFLMMHPWYIPSSQLAAKLLHIYQQSRKDN SNSLQVKTCHLVRYWISAFPAEFDLNPELAEQIKE LKALLDQEGNRRHSSLIDIDSVPTYKWKRQVTQR NPVGQKKRKMSLLFDHLEPMELAEHLTYLEYRSF CKILFQDYHSFVTHGCTVDNPVLERFISLFNSVSQ WVQLMILSKPTAPQRALVITHFVHVAEKLLQLQNF NTLMAVVGGLSHSSISRLKETHSHVSPETIKLWE GLTELVTATGNYGNYRRRLAACVGFRFPILGVHL KDLVALQLALPDWLDPARTRLNGAKMKQLFSILE ELAMVTSLRPPVQANPDLLSLLTVSLDQYQTEDE LYQLSLQREPRSKSSPTSPTSCTPPPRPPVLEEW TSAAKPKLDQALVVEHIEKMVESVFRNFDVDGDG HISQEEFQIIRGNFPYLSAFGDLDQNQDGCISREE MVSYFLRSSSVLGGRMGFVHNFQESNSLRPVAC RHCKALILGIYKQGLKCRACGVNCHKQCKDRLSV ECRRRAQSVSLEGSAPSPSPMHSHHHRAFSFSL PRPGRRGSRPPEIREEEVQTVEDGVFDIHL | 1-609 (whole protein) | UniProtKB/Swiss-Prot Q7LDG7-1 or Gen Pept NP_722541.1 (RASGRRP2 Isoform 1) |
| 7 | MGTQRLCGRGTQGWPGSSEQHVQEATSSAGLH SGVDELGVRSEPGGRLPERSLGPAHPAPAAMAG TLDLDKGCTVEELLRGCIEAFDDSGKVRDPQLVR MFLMMHPWYIPSSQLAAKLLHIYQQSRKDNSNSL QVKTCHLVRYWISAFPAEFDLNPELAEQIKELKAL LDQEGNRRHSSLIDIDSVPTYKWKRQVTQRNPV GQKKRKMSLLFDHLEPMELAEHLTYLEYRSFCKI LFQDYHSFVTHGCTVDNPVLERFISLFNSVSQWV QLMILSKPTAPQRALVITHFVHVAEKLLQLQNFNT LMAVVGGLSHSSISRLKETHSHVSPETIKLWEGLT ELVTATGNYGNYRRRLAACVGFRFPILGVHLKDL VALQLALPDWLDPARTRLNGAKMKQLFSILEELA MVTSLRPPVQANPDLLSLLTVSLDQYQTEDELYQ LSLQREPRSKSSPTSPTSCTPPPRPPVLEEWTSA AKPKLDQALVVEHIEKMVESVFRNFDVDGDGHIS QEEFQIIRGNFPYLSAFGDLDQNQDGCISREEMV SYFLRSSSVLGGRMGFVHNFQESNSLRPVACRH CKALILGIYKQGLKCRACGVNCHKQCKDRLSVEC RRRAQSVSLEGSAPSPSPMHSHHHRAFSFSLPR PGRRGSRPPEIREEEVQTVEDGVFDIHL | 1-671 (whole protein) | UniProtKB/Swiss-Prot Q7LDG7-2 or Gen Pept AAF07219.1 (RASGRRP2 Isoform 2) |
| 8 | MAGTLDLDKGCTVEELLRGCIEAFDDSGKVRDP QLVRMFLMMHPWYIPSSQLAAKLLHIYQQSRKDN SNSLQVKTCHLVRYWISAFPAEFDLNPELAEQIKE LKALLDQEGNRRHSSLIDIDSVCVGAEHRGLGGH SVSYTICA | 1-144 (whole protein) | UniProtKB/Swiss-Prot Q7LDG7-3 (RASGRRP2 Isoform 3) |
| 9 | MAGTLDLDKGCTVEELLRGCIEAFDDSGKVRDP QLVRMFLMMHPWYIPSSQLAAKLLHIYQQSRKDN SNSLQVKTCHLVRYWISAFPAEFDLNPELAEQIKE LKALLDQEGNRRHSSLIDIDSVPTYKWKRQVTQR NPVGQKKRKMSLLFDHLEPMELAEHLTYLEYRSF CKILFQDYHSFVTHGCTVDNPVLERFISLFNSVSQ WVQLMILSKPTAPQRALVITHFVHVAEKLLQLQNF NTLMAVVGGLSHSSISRLKETHSHVSPETIKLWE GLTELVTATGNYGNYRRRLAACVGFRFPILGVHL KDLVALQLALPDWLDPARTRLNGAKMKQLFSILE ELAMVTSLRPPVQANPDLLSLLTVSLDQYQTEDE LYQLSLQREPRSKSSPTSPTSCTPPPRPPVLEEW TSAAKPKLDQALVVEHIEKMVESVFRNFDVDGDG HISQEEFQIIRGNFPYLSAFGDLDQNQDGCISREE MVSYFLRSSSVLGGRMGFVHNFQESNSLRPVAC RHCKALILGIYKQGLKCRACGVNCHKQCKDRLSV | 1-610 (whole protein) | UniProtKB/Swiss-Prot Q7LDG7-4 or Gen Pept XP_011543022.1 (RASGRRP2 Isoform 4) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
|  | ECRRRAQSVSLEGSAPSPSPMHSHHHRAFSFSL PRPGRRGSRPPAEIREEEVQTVEDGVFDIHL |  |  |
| 10 | MGEPQGSMRILVTGG | 1-15 | GenBank AAH93061.1 (GDP L-fucose synthase) |
| 11 | VVADGAGLPGEDWVF | 26-40 | GenBank AAH93061.1 (GDP L-fucose synthase) |
| 12 | TAQTRALFEKVQPTH | 51-65 | GenBank AAH93061.1 (GDP L-fucose synthase) |
| 13 | LFRNIKYNLDFWRKN | 76-90 | GenBank AAH93061.1 (GDP L-fucose synthase) |
| 14 | VHMNDNVLHSAFEVG | 91-105 | GenBank AAH93061.1 (GDP L-fucose synthase) |
| 15 | DNVLHSAFEV | 95-104 | GenBank AAH93061.1 (GDP L-fucose synthase) |
| 16 | NVLHSAFEVG | 96-105 | GenBank AAH93061.1 (GDP L-fucose synthase) |
| 17 | NVLHSAFEVGARKVV | 96-110 | GenBank AAH93061.1 (GDP L-fucose synthase) |
| 18 | VLHSAFEVGA | 97-106 | GenBank AAH93061.1 (GDP L-fucose synthase) |
| 19 | KTTYPIDETMIHNGP | 121-135 | GenBank AAH93061.1 (GDP L-fucose synthase) |
| 20 | IHNGPPHNSNFGYSY | 131-145 | GenBank AAH93061.1 (GDP L-fucose synthase) |
| 21 | PHNSNFGYSYAKRMI | 136-150 | GenBank AAH93061.1 (GDP L-fucose synthase) |
| 22 | AYFQQYGCTFTAVIP | 156-170 | GenBank AAH93061.1 (GDP L-fucose synthase) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| 23 | YGCTFTAVIPTNVFG | 161-175 | GenBank AAH93061.1 (GDP L-fucose synthase) |
| 24 | LFIWVLREYNEVEPI | 226-240 | GenBank AAH93061.1 (GDP L-fucose synthase) |
| 25 | LREYNEVEPIILSVG | 231-245 | GenBank AAH93061.1 (GDP L-fucose synthase) |
| 26 | EVEPIILSVGEEDEV | 236-250 | GenBank AAH93061.1 (GDP L-fucose synthase) |
| 27 | ILSVGEEDEVSIKEA | 241-255 | GenBank AAH93061.1 (GDP L-fucose synthase) |
| 28 | EEDEVSIKEAAEAVV | 246-260 | GenBank AAH93061.1 (GDP L-fucose synthase) |
| 29 | SIKEAAEAVVEAMDF | 251-265 | GenBank AAH93061.1 (GDP L-fucose synthase) |
| 30 | AEAVVEAMDFHGEVT | 256-270 | GenBank AAH93061.1 (GDP L-fucose synthase) |
| 31 | FDTTKSDGQFKKTAS | 271-285 | GenBank AAH93061.1 (GDP L-fucose synthase) |
| 32 | FRFTPFKQAVKETCA | 296-310 | GenBank AAH93061.1 (GDP L-fucose synthase) |
| 33 | LVRYWISAFP | 131-140 or 78-87 | GenBank AAI10307.1 (RASGRP2) or UniProtKB/Swiss-Prot Q7LDG7-1 (RASGRP2 Isoform 1) |
| 34 | FVRYWITEFW | 128-137 | GenBank AAC97349.1 (RASGRP1) |
| 35 | FMRYWILKFP | 77-86 | GenBank BAA74869.3 (RASGRP3) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| 36 | LLFDHLEPMELAEHLTYLEYRSF | 148-170 | UniProtKB/Swiss-Prot Q7LDG7-1 (RASGRP2 Isoform 1) |
| 37 | NFNTLMAVVGGLSHSSISRLKETHSHVS | 239-266 | UniProtKB/Swiss-Prot Q7LDG7-1 (RASGRP2 Isoform 1) |
| 38 | PAAMAGTLDLDKGCT | 1-12 and the additional amino acids PAA at the N-terminal end | UniProtKB/Swiss-Prot Q7LDG7-1 or GenPept NP_722541.1 (RASGRRP2 Isoform 1) |
| 39 | DKGCTVEELLRGCIE | 8-22 | UniProtKB/Swiss-Prot Q7LDG7-1 or GenPept NP_722541.1 (RASGRRP2 Isoform 1) |
| 40 | RGCIEAFDDSGKVRD | 18-32 | UniProtKB/Swiss-Prot Q7LDG7-1 or GenPept NP_722541.1 (RASGRRP2 Isoform 1) |
| 41 | GKVRDPQLVRMFLMM | 28-42 | UniProtKB/Swiss-Prot Q7LDG7-1 or GenPept NP_722541.1 (RASGRRP2 Isoform 1) |
| 42 | MFLMMHPWYIPSSQL | 38-52 | UniProtKB/Swiss-Prot Q7LDG7-1 or Gen Pept NP_722541.1 (RASGRRP2 Isoform 1) |
| 43 | PSSQLAAKLLHIYQQ | 48-62 | UniProtKB/Swiss-Prot Q7LDG7-1 or Gen Pept NP_722541.1 (RASGRRP2 Isoform 1) |
| 44 | HIYQQSRKDNSNSLQ | 58-72 | UniProtKB/Swiss-Prot Q7LDG7-1 or Gen Pept NP_722541.1 (RASGRRP2 Isoform 1) |
| 45 | SNSLQVKTCHLVRYW | 68-82 | UniProtKB/Swiss-Prot Q7LDG7-1 or Gen Pept |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: Sequence (amino acids) | Position | Database |
|---|---|---|
| | | NP_722541.1 (RASGRRP2 Isoform 1) |
| 46 LVRYWISAFPAEFDL | 78-92 | UniProtKB/Swiss-Prot Q7LDG7-1 or Gen Pept NP_722541.1 (RASGRRP2 Isoform 1) |
| 47 AEFDLNPELAEQIKE | 88-102 | UniProtKB/Swiss-Prot Q7LDG7-1 or Gen Pept NP_722541.1 (RASGRRP2 Isoform 1) |
| 48 EQIKELKALLDQEGN | 98-112 | UniProtKB/Swiss-Prot Q7LDG7-1 or Gen Pept NP_722541.1 (RASGRRP2 Isoform 1) |
| 49 DQEGNRRHSSLIDID | 108-122 | UniProtKB/Swiss-Prot Q7LDG7-1 or Gen Pept NP_722541.1 (RASGRRP2 Isoform 1) |
| 50 LIDIDSVPTYKWKRQ | 118-132 | UniProtKB/Swiss-Prot Q7LDG7-1 or Gen Pept NP_722541.1 (RASGRRP2 Isoform 1) |
| 51 KWKRQVTQRNPVGQK | 128-142 | UniProtKB/Swiss-Prot Q7LDG7-1 or Gen Pept NP_722541.1 (RASGRRP2 Isoform 1) |
| 52 PVGQKKRKMSLLFDH | 138-152 | UniProtKB/Swiss-Prot Q7LDG7-1 or Gen Pept NP_722541.1 (RASGRRP2 Isoform 1) |
| 53 LLFDHLEPMELAEHL | 148-162 | UniProtKB/Swiss-Prot Q7LDG7-1 or Gen Pept NP_722541.1 (RASGRRP2 Isoform 1) |
| 54 LAEHLTYLEYRSFCK | 158-172 | UniProtKB/Swiss-Prot Q7LDG7-1 or |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| | | | Gen Pept NP_722541.1 (RASGRRP2 Isoform 1) |
| 55 | RSFCKILFQDYHSFV | 168-182 | UniProtKB/Swiss-Prot Q7LDG7-1 or Gen Pept NP_722541.1 (RASGRRP2 Isoform 1) |
| 56 | YHSFVTHGCTVDNPV | 178-192 | UniProtKB/Swiss-Prot Q7LDG7-1 or Gen Pept NP_722541.1 (RASGRRP2 Isoform 1) |
| 57 | VDNPVLERFISLFNS | 188-202 | UniProtKB/Swiss-Prot Q7LDG7-1 or Gen Pept NP_722541.1 (RASGRRP2 Isoform 1) |
| 58 | SLFNSVSQWVQLMIL | 198-212 | UniProtKB/Swiss-Prot Q7LDG7-1 or Gen Pept NP_722541.1 (RASGRRP2 Isoform 1) |
| 59 | QLMILSKPTAPQRAL | 208-222 | UniProtKB/Swiss-Prot Q7LDG7-1 or Gen Pept NP_722541.1 (RASGRRP2 Isoform 1) |
| 60 | PQRALVITHFVHVAE | 218-232 | UniProtKB/Swiss-Prot Q7LDG7-1 or Gen Pept NP_722541.1 (RASGRRP2 Isoform 1) |
| 61 | VHVAEKLLQLQNFNT | 228-242 | UniProtKB/Swiss-Prot Q7LDG7-1 or Gen Pept NP_722541.1 (RASGRRP2 Isoform 1) |
| 62 | QNFNTLMAVVGGLSH | 238-252 | UniProtKB/Swiss-Prot Q7LDG7-1 or Gen Pept NP_722541.1 (RASGRRP2 Isoform 1) |
| 63 | GGLSHSSISRLKETH | 248-262 | UniProtKB/Swiss-Prot Q7LDG7-1 |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| | | | or Gen Pept NP_722541.1 (RASGRRP2 Isoform 1) |
| 64 | LKETHSHVSPETIKL | 258-272 | UniProtKB/Swiss-Prot Q7LDG7-1 or Gen Pept NP_722541.1 (RASGRRP2 Isoform 1) |
| 65 | ETI KLWEGLTELVTA | 268-282 | UniProtKB/Swiss-Prot Q7LDG7-1 or Gen Pept NP_722541.1 (RASGRRP2 Isoform 1) |
| 66 | ELVTATGNYGNYRRR | 278-292 | UniProtKB/Swiss-Prot Q7LDG7-1 or Gen Pept NP_722541.1 (RASGRRP2 Isoform 1) |
| 67 | NYRRRLAACVGFRFP | 288-302 | UniProtKB/Swiss-Prot Q7LDG7-1 or Gen Pept NP_722541.1 (RASGRRP2 Isoform 1) |
| 68 | GFRFPILGVHLKDLV | 298-312 | UniProtKB/Swiss-Prot Q7LDG7-1 or Gen Pept NP_722541.1 (RASGRRP2 Isoform 1) |
| 69 | LKDLVALQLALPDWL | 308-322 | UniProtKB/Swiss-Prot Q7LDG7-1 or Gen Pept NP_722541.1 (RASGRRP2 Isoform 1) |
| 70 | LPDWLDPARTRLNGA | 318-332 | UniProtKB/Swiss-Prot Q7LDG7-1 or Gen Pept NP_722541.1 (RASGRRP2 Isoform 1) |
| 71 | RLNGAKMKQLFSILE | 328-342 | UniProtKB/Swiss-Prot Q7LDG7-1 or Gen Pept NP_722541.1 (RASGRRP2 Isoform 1) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: Sequence (amino acids) | Position | Database |
|---|---|---|
| 72 FSILEELAMVTSLRP | 338-352 | UniProtKB/Swiss-Prot Q7LDG7-1 or Gen Pept NP_722541.1 (RASGRRP2 Isoform 1) |
| 73 TSLRPPVQANPDLLS | 348-362 | UniProtKB/Swiss-Prot Q7LDG7-1 or Gen Pept NP_722541.1 (RASGRRP2 Isoform 1) |
| 74 PDLLSLLTVSLDQYQ | 358-372 | UniProtKB/Swiss-Prot Q7LDG7-1 or Gen Pept NP_722541.1 (RASGRRP2 Isoform 1) |
| 75 LDQYQTEDELYQLSL | 368-382 | UniProtKB/Swiss-Prot Q7LDG7-1 or Gen Pept NP_722541.1 (RASGRRP2 Isoform 1) |
| 76 YQLSLQREPRSKSSP | 378-392 | UniProtKB/Swiss-Prot Q7LDG7-1 or Gen Pept NP_722541.1 (RASGRRP2 Isoform 1) |
| 77 SKSSPTSPTSCTPPP | 388-402 | UniProtKB/Swiss-Prot Q7LDG7-1 or Gen Pept NP_722541.1 (RASGRRP2 Isoform 1) |
| 78 CTPPPRPPVLEEWTS | 398-412 | UniProtKB/Swiss-Prot Q7LDG7-1 or Gen Pept NP_722541.1 (RASGRRP2 Isoform 1) |
| 79 EEWTSAAKPKLDQAL | 408-422 | UniProtKB/Swiss-Prot Q7LDG7-1 or Gen Pept NP_722541.1 (RASGRRP2 Isoform 1) |
| 80 LDQALVVEHIEKMVE | 418-432 | UniProtKB/Swiss-Prot Q7LDG7-1 |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: Sequence (amino acids) | Position | Database |
|---|---|---|
| | | or Gen Pept NP_722541.1 (RASGRRP2 Isoform 1) |
| 81 EKMVESVFRNFDVDG | 428-442 | UniProtKB/Swiss-Prot Q7LDG7-1 or Gen Pept NP_722541.1 (RASGRRP2 Isoform 1) |
| 82 FDVDGDGHISQEEFQ | 438-452 | UniProtKB/Swiss-Prot Q7LDG7-1 or Gen Pept NP_722541.1 (RASGRRP2 Isoform 1) |
| 83 QEEFQI I RGN FPYLS | 448-462 | UniProtKB/Swiss-Prot Q7LDG7-1 or Gen Pept NP_722541.1 (RASGRRP2 Isoform 1) |
| 84 FPYLSAFGDLDQNQD | 458-472 | UniProtKB/Swiss-Prot Q7LDG7-1 or Gen Pept NP_722541.1 (RASGRRP2 Isoform 1) |
| 85 DQNQDGCISREEMVS | 468-482 | UniProtKB/Swiss-Prot Q7LDG7-1 or Gen Pept NP_722541.1 (RASGRRP2 Isoform 1) |
| 86 EEMVSYFLRSSSVLG | 478-492 | UniProtKB/Swiss-Prot Q7LDG7-1 or Gen Pept NP_722541.1 (RASGRRP2 Isoform 1) |
| 87 SSVLGGRMGFVHNFQ | 488-502 | UniProtKB/Swiss-Prot Q7LDG7-1 or Gen Pept NP_722541.1 (RASGRRP2 Isoform 1) |
| 88 VHNFQESNSLRPVAC | 498-512 | UniProtKB/Swiss-Prot Q7LDG7-1 or Gen Pept NP_722541.1 (RASGRRP2 Isoform 1) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| 89 | RPVACRHCKALILGI | 508-522 | UniProtKB/Swiss-Prot Q7LDG7-1 or Gen Pept NP_722541.1 (RASGRRP2 Isoform 1) |
| 90 | LILGIYKQGLKCRAC | 518-532 | UniProtKB/Swiss-Prot Q7LDG7-1 or Gen Pept NP_722541.1 (RASGRRP2 Isoform 1) |
| 91 | KCRACGVNCHKQCKD | 528-542 | UniProtKB/Swiss-Prot Q7LDG7-1 or Gen Pept NP_722541.1 (RASGRRP2 Isoform 1) |
| 92 | KQCKDRLSVECRRRA | 538-552 | UniProtKB/Swiss-Prot Q7LDG7-1 or Gen Pept NP_722541.1 (RASGRRP2 Isoform 1) |
| 93 | CRRRAQSVSLEGSAP | 548-562 | UniProtKB/Swiss-Prot Q7LDG7-1 or Gen Pept NP_722541.1 (RASGRRP2 Isoform 1) |
| 94 | EGSAPSPSPMHSHHH | 558-572 | UniProtKB/Swiss-Prot Q7LDG7-1 or Gen Pept NP_722541.1 (RASGRRP2 Isoform 1) |
| 95 | HSHHHRAFSFSLPRP | 568-582 | UniProtKB/Swiss-Prot Q7LDG7-1 or Gen Pept NP_722541.1 (RASGRRP2 Isoform 1) |
| 96 | SLPRPGRRGSRPPEI | 578-592 | UniProtKB/Swiss-Prot Q7LDG7-1 or Gen Pept NP_722541.1 (RASGRRP2 Isoform 1) |

TABLE 1-continued

Protein sequences, position and database entry. The sequence Q7LDG7-1 is the canonical sequence of the RASGRP2 protein and also refers to RASGRP2 Isoform 1. Proteins and peptides depicted hereunder are particularly preferred embodiments of the invention.

| SEQ ID NO: | Sequence (amino acids) | Position | Database |
|---|---|---|---|
| 97 | RPPEIREEEVQTVED | 588-602 | UniProtKB/Swiss-Prot Q7LDG7-1 or Gen Pept NP_722541.1 (RASGRRP2 Isoform 1) |
| 98 | EEVQTVEDGVFDIHL | 595-609 | UniProtKB/Swiss-Prot Q7LDG7-1 or Gen Pept NP_722541.1 (RASGRRP2 Isoform 1) |

The following gene sequences (Table 2) represent the gene sequences of the proteins GDP-L fucose synthase (gene: TSTA3), RASGRP1, RASGRP2, RASGRP3 and RASGRP4 (Table 2). The proteins or derivatives or splice variants thereof are preferably encoded by the respective gene.

TABLE 2

Gene sequences and database entry

| Gene name | Database entry |
|---|---|
| TSTA3 | NCBI Reference Sequence: NC_000008.11 REGION: 143612618 . . . 143618048 |
| RASGRP1 | NCBI Reference Sequence: NC_000015.10 REGION: 38488101 . . . 38565575 |
| RASGRP2 | NCBI Reference Sequence: NC_000011.10 REGION: 64726911 . . . 64745456 |
| RASGRP3 | NCBI Reference Sequence: NC_000002.12 REGION: 33436324 . . . 33564750 |
| RASGRP4 | NCBI Reference Sequence: NC_000019.10 REGION: 38409051 . . . 38426305 |

The following nucleotide sequences (Table 3) represent preferred nucleotide sequences encoding any of the proteins or fragment, derivative or splice variant thereof of the present invention. The table also comprises coding sequences (CDS), i.e. proteins or peptides, which can also be used in the treatment, diagnosis and/or prevention of multiple sclerosis (MS).

TABLE 3

Nucleotide sequences and protein sequences and the respective database entries (Genbank Accession Nos)

| Gene name | Database entry |
|---|---|
| TSTA3 | RNA: XM_011517269.1 |
| RASGRP1 | NM_003313.3 NM_001317783.1 XM_005251051.3 protein: XP_011515571.1 NP_003304.1 NP_001304712.1 XP_005251108.2 RNA: NM_001306086.1 NM_001128602.1 NM_005739.3 XM_017021860 XM_005254114.3 XM_011521151.3 XR_001751485.2 XR_001751486.2 protein: NP_001293015.1 NP_001122074.1 NP_005730.2 XP_016877349.1 XP_005254171.1 XP_011519453.1 |
| RASGRP2 | RNA: XM_011544722.2 NM_153819 XM_011544723.3 XM_011544721.1 NM_001098670.1 XM_017017084.2 XM_011544720.2 XM_011544718.2 XM_017017082.2 XM_005273707.4 XM_017017083.2 NM_001318398.1 NM_001098671.1 XM_011544725.2 XM_017017085.2 XM_017017086.1 XR_001747720.2 XR_001747719.2 |

TABLE 3-continued

Nucleotide sequences and protein sequences
and the respective database entries
(Genbank Accession Nos)

| Gene name | Database entry |
|---|---|
| | protein: |
| | XP_011543024.1 |
| | NP_722541.1 |
| | XP_011543025.1 |
| | XP_011543023.1 |
| | NP_001092140.1 |
| | XP_016872573.1 |
| | XP_011543022.1 |
| | XP_011543020.1 |
| | XP_016872571.1 |
| | XP_005273764.3 |
| | XP_016872572.1 |
| | NP_001305327.1 |
| | NP_001092141.1 |
| | XP_011543027.1 |
| | XP_016872574.1 |
| | XP_016872575.1 |
| RASGRP3 | RNA: |
| | NM_001349975.1 |
| | NM_170672.2 |
| | NM_001349978.1 |
| | XM_017003759.2 |
| | XM_011532746.3 |
| | XM_011532748.3 |
| | NM_001349979.1 |
| | NM_001349977.1 |
| | NM_001349980.1 |
| | NM_001139488.1 |
| | NM_001349981.1 |
| | NM_001349976.1 |
| | XM_017003761.2 |
| | NM_015376.2 |
| | XR_001738693.2 |
| | XR_001738692.2 |
| | XR_001738691.2 |
| | NR_146505.1 |
| | protein: |
| | NP_001336904.1 |
| | NP_733772.1 |
| | NP_001336907.1 |
| | XP_016859248.1 |
| | XP_011531048.1 |
| | XP_011531050.2 |
| | NP_001336908.1 |
| | NP_001336906.1 |
| | NP_001336909.1 |
| | NP_001132960 |
| | NP_001336910.1 |
| | NP_001336905.1 |
| | XP_016859250.1 |
| | NP_056191.1 |
| RASGRP4 | RNA: |
| | NM_001146202.1 |
| | NM_001146206.1 |
| | NM_001146207.1 |
| | NM_001146205.1 |
| | NM_001146203.1 |
| | NM_001146204.1 |
| | NM_170604.2 |
| | XR_935732.2 |
| | protein: |
| | NP_001139674.1 |
| | NP_001139678.1 |
| | NP_001139679.1 |
| | NP_001139677.1 |
| | NP_001139675.1 |
| | NP_001139676.1 |
| | NP_733749.1 |

All sequences were retrieved from the respective online databases on Jun. 22, 2018.

In one embodiment, the protein, fragment, derivative or splice variant according to the present invention may be used for identifying a human subject who is suitable for tolerization to autoantigens in MS, preferably early MS. Identifying a human subject, who is suitable for tolerization to autoantigens in MS, preferably early MS, preferably comprises measuring positive reactivity of the T cells and/or antibodies to the autoantigens in the human subject. Thereby, the human subject can also be in vitro diagnosed with MS. In other words, the identified autoantigens can also be used in the in vitro diagnosis of MS.

In vitro diagnosis of MS preferably comprises the following steps: isolating T cells, preferably CD4+ T cells, and/or antibodies from blood, CSF or other body fluid of the subject and measuring reactivity of the T cells and/or antibodies against a protein or fragment, derivative or splice variant thereof according to the present invention. The person skilled in the art is aware of methods for isolating T cells and/or antibodies from blood, CSF or other body fluid of the subject and measuring reactivity of the T cells and/or antibodies against the protein, fragment, derivative or splice variant. A reactivity of the T cells, preferably CD4+ T cells, and/or antibodies to the tested protein or fragment, derivative or splice variant thereof, may indicate that the subject suffers from MS. The diagnosis can also be combined with clinical and imaging findings, i.e. the MS diagnosis according to the state of the art, in particular according to the revised McDonald criteria.

In another embodiment, a protein, fragment, derivative or splice variant according to the present invention may be used for distinguishing between MS subgroups. In particular, the protein, fragment, derivative or splice variant according to the present invention may be used for diagnosing pattern II MS in a human subject.

The following characteristics indicate that a certain peptide of a protein is immundominant in the context of MS:
a) frequent recognition of this peptide by T cells, i.e. by approximately 10% or more of MS patients, often in the context of a disease-associated HLA allele or haplotype (Sospedra and Martin, 2005), and
b) recognition of this peptide by disease-relevant T cells such as those that respond to peptides at low concentrations (high avidity T cells) (Bielekova et al., 2004) and are therefore considered particularly dangerous, and/or have a proinflammatory phenotype, and/or are isolated from the target organ or compartment (CNS), in the case of MS, brain-, spinal cord- or CSF-infiltrating T cells.

However, high avidity recognition is not a prerequisite, since low-avidity myelin-specific T cells have also been shown to be pathogenic in humanized transgenic mouse models (Quandt et al. 2012).

Thus, it can be tested whether a protein or fragment, derivative or splice variant thereof is immunodominant in the context of MS. Such a test is preferably an in vitro test. Particularly suitable is an in vitro test that allows measuring the reactivity of T cells and/or antibodies obtained from the blood, CSF or other body fluid of a human subject that had been diagnosed with MS, preferably CSF-infiltrating CD4+ T cells, to the tested protein or fragment, derivative or splice variant. The person skilled in the art is aware of methods testing the reactivity of T cells, preferably CD4+ T cells, and/or antibodies. For example, the proliferation of CD4+ T cells and/or their secretion of IFN-γ or reactivity in a ELISPOT/FLUOROSPOT assay or reactivity against HLA-peptide tetramers can be tested. If the tested protein or fragment, derivative or splice variant thereof induces reactivity in a human subject that had been diagnosed with MS, in case of T cell reactivity in particular a stimulatory index (SI) above 2 and/or an IFN-γ secretion above 20 pg/ml, the tested protein or fragment, derivative or splice variant may be termed immunodominant. It is also possible to select 10 patients who had been diagnosed with MS for such a test. If reactivity is induced in at least 2 patients, the tested protein or fragment, derivative or splice variant may be termed immunodominant. Preferably, the 10 patients have been diagnosed with RRMS according to the established revised McDonald criteria.

It has recently been demonstrated that T cells of MS patients show increased in vitro proliferation in the absence of an exogenous antigen (Mohme et al., 2013; Jelcic et al., 2018). These "autoproliferating" T cells are enriched for cells that home to the CNS compartment of MS patients and can thus be considered as a peripheral blood source of brain-/CSF-infiltrating T cells.

In the case that data from testing T cells in vitro is not available or in addition to such testings, immune recognition of peptides can also be predicted/inferred from those peptides that will bind well to the HLA-class I or -class II alleles of the individual and for CD8+ and CD4+ T cells respectively. Peptide binding predictions are well known to the skilled person. They can be performed by well-established prediction algorithms (NetMHCII—www.cbs.dtu.dk/services/NetMHCII/; IEDB—www.iedb.org/) and analysis of the HLA-binding motifs (SYFPEITHI—www.syfpeithi.de/), cf. "Examples", under 11.

According to the present invention the proteins GDP-L-fucose synthase and a member of the RASGRP protein family, in particular RASGRP2, have been identified as immunodominant in MS, thus they have been identified as autoantigens.

It is not necessary that the binding to the HLA allele is particularly strong. In fact, immunodominance can also occur for peptides that bind poorly to the HLA allele (Muraro et al., 1997, J Clin Invest; 100(2):339-349).

Tolerance induction is antigen-specific and renders autoreactive T cells non-functional or anergic or induces Treg cells that specifically suppress untoward autoimmunity to said target antigens. The induction of tolerance to target autoantigens is a highly important therapeutic goal in autoimmune diseases. It offers the opportunity to attenuate specifically the pathogenic autoimmune response in an effective way with few side effects. Tolerance induction can also be achieved by applying a whole protein instead of or in addition to an immunodominant peptide being a fragment of the protein (Kennedy M K et al., 1990). It has herein been shown that immunologic changes consistent with tolerance can be induced in human patients upon i.v. injection of immunodominant peptides coupled to red blood cells (14. of Examples). Hence, immundominant peptides can be used for tolerance induction.

The immunodominance of the proteins and/or fragments thus allows using the protein and/or a fragment, derivative or splice variant thereof for antigen-specific immunotherapies such as tolerance induction.

According to the present invention, antigen-specific tolerization can be used in all forms of MS: At the time of first manifestation, when differential diagnoses have been excluded, the disease is referred to as CIS provided that the CSF and MRI findings are consistent with the diagnosis. MRI discloses lesions in locations typical for MS, i.e. juxtacortical, periventricular, in the brain stem or spinal cord. If certain criteria are fulfilled that can be summarized as dissemination in space (more than one lesion or clinical symptom/sign) and time (more than one event) then the diagnosis of RRMS can be made. A special scenario is the accidental discovery of MRI lesions compatible with MS without clinical symptoms. This is referred to as RIS and can be considered a pre-stage of CIS and RRMS. More than 80% of patients suffer from one of these, and the majority of patients develops later what is called SPMS. At this time, relapses/exacerbations become less frequent or stop altogether and neurological disability increases steadily either between relapses or without these.

A special form of MS is PPMS, which never shows relapses, but rather begins with steady worsening of neurological symptoms, e.g. of the ability to walk. PPMS affects approximately 10% of MS patients and males and females with equal frequency. Its onset is usually later than CIS or RRMS. With respect to causes and disease mechanisms PPMS is considered similar to the above RIS-CIS-RRMS-SPMS.

Typically, MS is diagnosed according to the revised McDonald criteria. These criteria also allow distinguishing between the different forms and disease activity of MS (Thompson et al., 2017, Lancet Neurol, 17 (2): 162-173).

Preferably, the tolerization approach is applied at an early stage, i.e. RIS, CIS and early RRMS, since it is assumed that the immune processes at this stage are primarily mediated by autoreactive T lymphocytes, while tissue damage, so-called degenerative changes, become gradually more important when the disease advances. However, tolerization is meaningful as long as there is an autoreactive T cell response against the antigens used for tolerization, which could also be during SPMS and PPMS.

In a particularly preferred embodiment, a GDP-L-fucose synthase or RASGRP2 protein or splice variant thereof, preferably the GDP-L-fucose synthase or RASGRP2 protein, is used in a tolerization approach at an early stage, i.e. RIS, CIS and early RRMS. The GDP-L-fucose synthase protein has, for example, the sequence as set forth in SEQ ID NO: 1, the RASGRP2 protein has, for example the sequence as set forth in SEQ ID NO: 2, SEQ ID NO: 6, SEQ ID NO: 7, SEQ ID NO: 8 or SEQ ID NO: 9.

In one aspect of the invention, a method for inducing antigen-specific tolerance to autoantigens in a human subject suffering from or at risk of developing MS is provided. The method comprises the step of applying to a patient in the need thereof, i.e. to the human subject, at least one protein selected from the group consisting of GDP-L-fucose synthase and members of the RASGRP protein family, fragment (peptide), derivative and/or splice variant thereof, a nucleotide sequence encoding any of the proteins or fragment, derivative or splice variant thereof and/or a gene sequence as described herein or applying at least one carrier comprising at least one protein, fragment, derivative, splice variant, nucleotide sequence and/or gene sequence as described herein.

In one embodiment, the nucleotide sequence or gene sequence is applied to the patient via a carrier, e.g. a cell. The antigen may then be expressed by a carrier, e.g. a cell. Transfer of autoantigen-encoding RNA/DNA into a carrier, e.g. a cell, and thus encoding the above autoantigens is also conceivable similar to tumor vaccination approaches that employ antigen-encoding RNAs.

It is particularly preferred to use the whole protein of GDP-L-fucose synthase (SEQ ID NO: 1) or the whole protein of RASGRP2 (SEQ ID NO: 2 or SEQ ID NO: 6, 7, 8 or 9) for inducing antigen-specific tolerance. In another preferred embodiment, a fragment of any of these proteins is used. It is particularly preferred to use a fragment as set forth in any of SEQ ID NOs: 10 to 98. Even more preferred is a peptide as set forth in any of SEQ ID NOs: 10 to 35.

The at least one protein, fragment, derivative, splice variant, nucleotide sequence and/or gene sequence may be applied by nasal, inhaled, oral, subcutaneous (s.c.), intracoelomic (i.c), intramuscular (i.m.), intradermal (i.d.), transdermal (t.d.) or intravenous (i.v.) administration, preferably by routes of administration that are considered tolerogenic, for example by i.v., s.c., i.d., t.d., oral, inhaled, nasal or coupled to a tolerogenic carrier, preferably an RBC.

In particular, the method may be used for inducing antigen-specific tolerance to autoantigens in early MS or even pre-clinical stages of the disease.

The antigen-specific tolerance protocol provided herein may selectively target both activated and naïve autoreactive T cells specific for multiple potential encephalitogenic epitopes that perpetuate the disease.

The tolerization approach can also be used to prevent MS. This approach may include identifying those individuals (e.g. in a family with a MS patient), who are at a high risk of developing MS. For example, it is possible to tolerize e.g. the children of a mother with MS or the identical twin of a patient with MS, in whom the risk of developing MS would be particularly high.

Diagnosis of MS or one of its forms is made by demonstrating neurological deficits and/or MRI lesions compatible with MS that are disseminated in space and time. Positive laboratory testing for an autoimmune response against the novel target proteins GDP-L-fucose synthase and the RASGRP family and/or fragments, derivatives and/or splice variants thereof can be used to identify patients particularly likely to profit from antigen-specific tolerance induction, i.e. allow personalizing antigen-specific tolerance approaches. By identifying patients who particularly likely profit from antigen-specific tolerance induction, a patient can be in vitro diagnosed with MS. In other words, the identified autoantigens GDP-L-fucose synthase and the RASGRP family (in particular RASGRP2) and/or fragments, and/or derivatives and/or splice variants thereof can be used in the in vitro diagnosis of MS. Thus, this in vitro testing can be complemented with clinical and imaging findings, i.e. the MS diagnosis according to the state of the art, in particular according to the revised McDonald criteria.

In another aspect of the invention, a method for identifying a human subject suitable for tolerization to autoantigens in MS, preferably early MS, is provided. Thereby, an individual patient, who would profit from or is eligible for the treatment, is identified. This method can also be used for in vitro diagnosing MS. Patients with CIS, probably also RIS, and RRMS are best suited for tolerization, although tolerization appears meaningful in any form of MS including SPMS and PPMS as long as the patient responds at least to one of the antigenic peptides that are included in the tolerization treatment. The steps of this method comprise isolating T cells, preferably CD4+ T cells, and/or antibodies from blood, CSF or other body fluid of the subject and measuring reactivity of the T cells and/or antibodies against the protein or fragment, derivative or splice variant thereof according to the present invention. The person skilled in the art is aware of methods for isolating T cells and/or antibodies from blood, CSF or other body fluid of the subject and measuring reactivity of the T cells and/or antibodies against the protein, fragment, derivative or splice variant.

If an individual has a response against one of the protein/s or fragment/s he/she could thereby be in vitro diagnosed with MS and would be eligible and a good candidate for treatment. A further selection step could be HLA-class II typing and presence of the MS-associated HLA-DR alleles.

Proteins, in particular the GDP-L-fucoase synthase protein or a protein of the RASGRP family, in particular RASGRP2, or fragments, derivatives or splice variants thereof derived from disease-relevant antigens can thus be used to identify those patients or patient subgroups with an existing and/or particularly strong proinflammatory (potentially harmful) T cell or antibody response against the respective autoantigen. By identifying those patients or patient subgroups with an existing and/or particularly strong proinflammatory (potentially harmful) T cell or antibody response against the respective autoantigen, the patient can thus be in vitro diagnosed with MS. In this situation, pretesting the patient with a suitable test to assess reactivity against the autoantigen would also allow tailoring the tolerizing treatment (e.g. composition of the peptides/proteins used for tolerization) to the individual patient or patient subgroup with the aim to render the tolerization as specific as possible and also to avoid potential adverse effects. Antigen-specific tolerization, however, can also be performed in patients in whom a T cell response to the tolerizing antigen has not been shown. Thus, in one embodiment, the protein, fragment, derivative and/or splice variant according to the invention can be used in the in vitro pre-testing of a human subject diagnosed with MS or a human subject at risk to develop MS.

In one aspect of the invention, a carrier is provided, which comprises at least one protein, fragment, derivative, splice variant, nucleotide sequence and/or gene sequence as described herein. The carrier may be coupled to the at least one protein, fragment, derivative and/or splice variant and/or the carrier may contain the at least one protein, fragment, derivative, splice variant, nucleotide sequence and/or gene sequence. In one embodiment, the term "contains" means that the protein, fragment, derivative, splice variant, nucleotide sequence and/or gene sequence is inside the carrier and not on its surface. A protein, fragment, derivative and/or splice variant may also be coupled to and contained within the carrier, which means that one part of the protein, fragment, derivative and/or splice variant is coupled to the carrier and another part of the protein, fragment, derivative and/or splice variant is contained within the carrier.

The person skilled in the art is familiar with possible carriers. For example, the carrier may be any cell, protein, lipid, glycolipid, bead, nanoparticle, virus-like-particle (VLP), or molecule, such as a sugar molecule, or any combination thereof that is suitable for application in humans and to which protein/s and/or fragment/s can be coupled by a coupling process, e. g. by a chemical coupling process, preferably by EDC. The carrier can be derived from one existing in nature or be synthetic. Preferably, the cell, molecule, bead, nanoparticle, or VLP is biodegradable in vivo or is at least applicable to living persons and broken down in vivo or is eliminated from the body to which the carrier is applied. The term cell also includes cell precursors, e.g. RBC precursors. Preferably, the carrier is a blood cell, even more preferably a red or white blood cell. The white blood cell may be a splenocyte or a PBMC or generally an APC.

In one embodiment, the protein, fragment, derivative and/or splice variant is expressed by the cell, preferably the blood cell. Thereby, the genetic information encoding the protein, fragment, derivative and/or splice variant is introduced into the cell before the protein, fragment, derivative and/or splice variant is expressed by the cell.

Any coupling agent or method for coupling a protein and/or a fragment thereof to a carrier may be used. For example, a synthetic or natural linker may be employed for coupling. One example of such a linker is glycophorin A, present on the surface of RBC. In one embodiment, chemical crosslinking is performed. In a preferred embodiment, the chemical crosslinker EDC catalyzing the formation of peptide bonds between free amino and carboxyl groups is used. Particularly in the presence of EDC, multiple peptides can be coupled to the surface of the carrier thereby allowing for the simultaneous targeting of multiple T cell specificities. Preferably, more than three, more than five, more than 10, more than 15, or even more than 20 different peptides are coupled to the surface of the carrier. In a preferred embodiment, between five and 20, preferably between five and 15 different peptides are used. A peptide is different from another peptide if it does not consist of the same amino acid sequence. The carrier is preferably, but not necessarily a cell. EDC can be used for coupling to any carrier as long as a free amino group is present.

In another embodiment, at least one peptide of each protein according to the present invention (a GDP-L-fucose synthase protein or a protein of the RASGRP protein family, preferably RASGRP2) are used in combination and coupled to a carrier. It is particularly advantageous to combine at least one peptide of each protein according to the present invention with at least one known peptide of the state of the art, in particular with at least one myelin peptide, in particular with at least one or all of the myelin peptides as defined by SEQ ID NOs: 261 to 267.

In one preferred embodiment, the carrier is a blood cell, and the blood cell is chemically coupled by a coupling agent, preferably by EDC, to the at least one protein, fragment, derivative and/or splice variant. A method of manufacturing such a chemically coupled, i.e. antigen-coupled blood cell is also provided, comprising isolating the blood cell from a human subject, adding the at least one protein, fragment, derivative and/or splice variant, i.e. the antigen, and subsequently adding the coupling agent, preferably EDC.

The mechanism of action of cells coupled with peptide by EDC is not fully understood, but involves covalently linking amino- and carboxy groups of peptide and cell surface molecules, subsequent programmed cell death (apoptosis in the case of nucleated cells; eryptosis in the case of RBC) of the peptide-coupled, i.e. antigen-coupled, cells and then tolerogenic presentation of the dying cells in vivo.

The dose of EDC used for the coupling reaction may be titrated to obtain a maximum of safety with best efficacy. In high concentrations, EDC may lead to lysis of cells, in particular of RBC.

For optimal stability of the RBC, a final concentration of EDC of less than 15 mg/ml, preferably less than 10 mg/ml, even more preferably less than 5 mg/ml, even more preferably of about 3 mg/ml may be used. The optimal dose may also vary. The person skilled in the art knows how to determine the optimal stability of the RBC and the optimal dose of EDC.

The protein, fragment, derivative and/or splice variant to be coupled may be added in an amount to be readily determined by the person skilled in the art. The person skilled is aware of measures to determine the optimal amount in the interplay with an optimal amount of EDC.

The incubation time can be varied and tailored for each specific coupling reaction (for example, 15 min, 30 min, 45 min, 60 min, 120 min). Coupling efficiency may be better with longer time of incubation. In one embodiment, a maximum is reached after 60 min.

The incubation temperature may also vary. For example, 15-25° C. or 2-8° C. may be used. In one embodiment, coupling efficiency was higher when the coupling reaction was performed at 15-25° C.

Any excipient that allows the coupling reaction may be used. In one embodiment, the excipient is sterile and endotoxin free. In a preferred embodiment, the excipient is sterile, endotoxin free saline (NaCl 0.9%). Saline is approved for use in humans and provides a maximum of safety.

The person skilled in the art knows how to determine an optimal incubation time and temperature and how to determine possible excipients.

In one aspect of the invention, a pharmaceutical composition is provided which comprises at least one protein, fragment, derivative, splice variant, nucleotide sequence and/or gene sequence as described herein and a pharmaceutically acceptable carrier.

In another aspect of the invention, a method for the therapeutic treatment, the prevention or diagnosis of MS in a human subject is provided comprising administering into said subject a therapeutically effective amount of the protein, fragment, derivative, splice variant, nucleotide sequence and/or gene sequence as described herein and/or the carrier as described herein. Thus, the carrier comprising the at least one protein, fragment, derivative, splice variant, nucleotide sequence and/or gene sequence according to the present invention, in particular the carrier coupled to the at least one protein, fragment, derivative and/or splice variant according to the invention, and/or the carrier containing the at least one protein, fragment, derivative, splice variant, nucleotide sequence and/or gene sequence according to the invention can be used in the treatment, diagnosis and/or prevention of MS.

In a further aspect of the invention, a peptide according to the present invention, preferably a peptide, which comprises 5 to 50, preferably 5 to 20, more preferably 10 to 15, even more preferably 15 amino acids, is used as a medicament.

A preferred peptide for use as a medicament is
a) at least 85%, preferably at least 90%, more preferably at least 95% identical to a respective corresponding amino acid sequence or
b) at least 70%, preferably at least 80%, more preferably at least 90% homologous to a respective corresponding amino acid sequence or
c) at least 60%, preferably at least 70%, more preferably at least 80%, even more preferably at least 90% homologous to a respective corresponding amino acid sequence and binds to an autologous HLA allele, is recognized by a T cell and/or is recognized by an antibody which binds to or recognizes the respective amino acid sequence.

Even more preferred for use as a medicament is a peptide with a sequence selected from the group comprising SEQ ID NOs: 10 to 98, preferably SEQ ID NOs: 10 to 35, even more preferably a peptide which consists of a sequence selected from the group comprising SEQ ID NO: 10 to 98, preferably SEQ ID NOs: 10 to 35.

Figure 3:
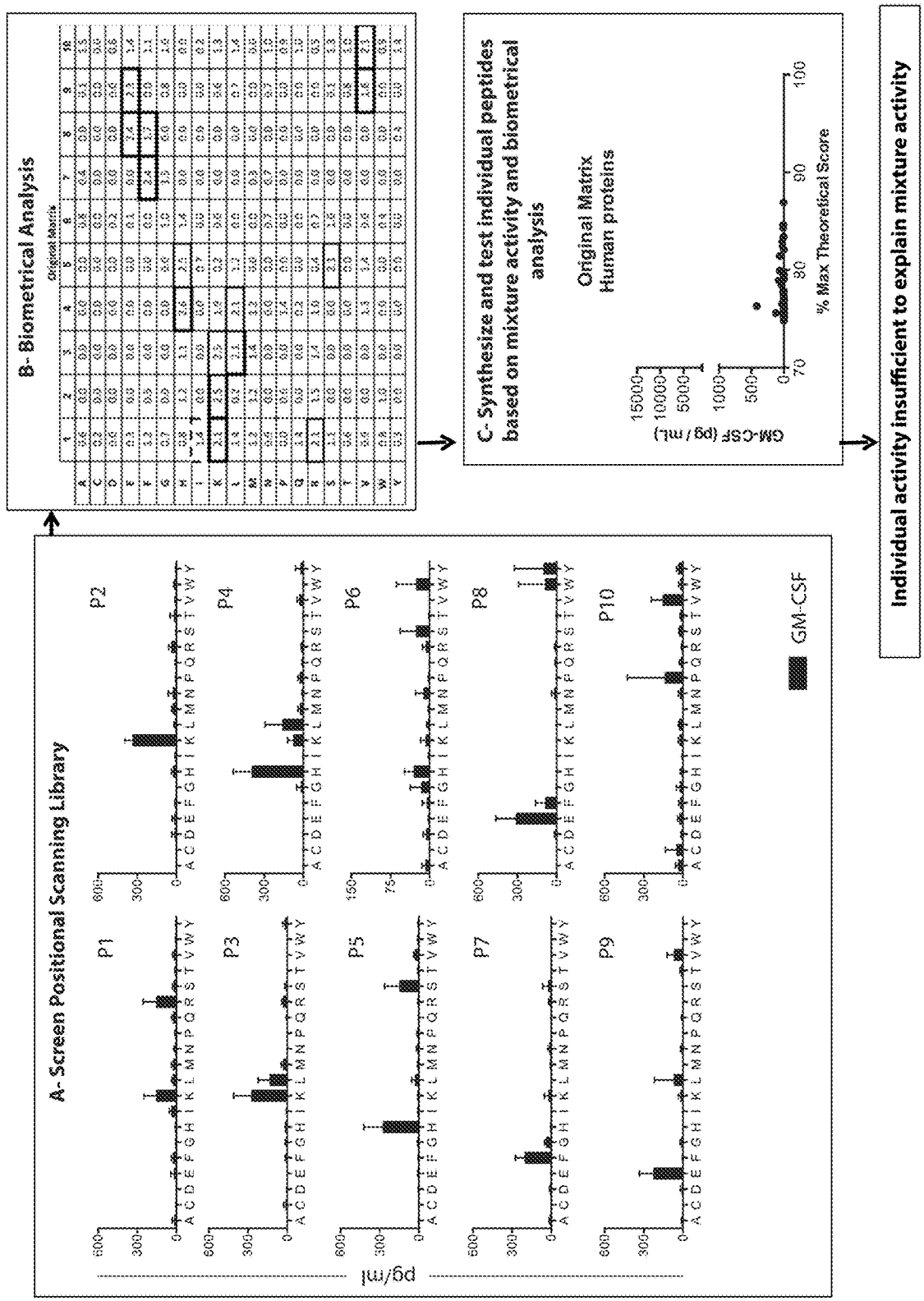
FIG. 3 Single and dual-defined decapeptide positional scanning mixtures in combination with biometric analysis to identify the specificity of TCC21.1

As a further aspect, the peptide motives of FIG. 3 (ii) E (SEQ ID NO: 99), the GDP-L-fucose synthase peptides as depicted in FIG. 5 (SEQ ID NOs: 199-215), the GDP-L-fucose synthase peptides of the table in FIG. 6 (I and II) (SEQ ID NOs: 10-14, 19-20, 22-23, 25-32 and 216-290) and the RASGRP1, RASGRP2 and RASGRP3 peptides of the table in FIG. 12 (SEQ ID NOs: 291-309) are all subject-matter of the present invention and can be used according to the present invention.

Examples

GDP-L-Fucose Synthase Specificity

1. Characterization of TCC21.1

Figure 2:
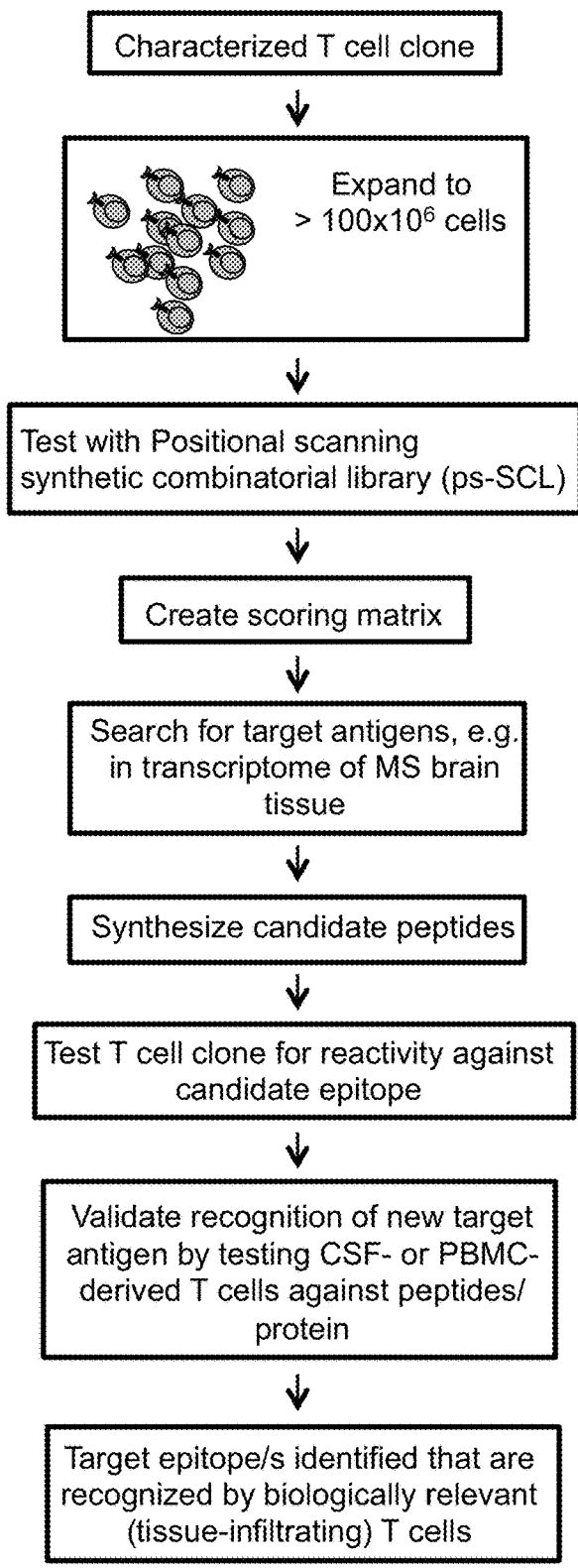
FIG. 2 Target epitope discovery

The unbiased target antigen identification approach using the positional scanning synthetic combinatorial libraries (ps-SCL) is schematically shown in FIG. 2. The clone TCC21.1 has been identified as described in Planes et al. (2015). TCC21.1 is a CD4+ TCC isolated from CSF-infiltrating cells and clonally expanded in two active white matter demyelinating MS lesions (LI and LIII) from an SPMS patient (1154SA) with pattern II demyelination. TCC21.1 releases Th2 cytokines and helps proliferation and antibody production by autologous B cells upon unspecific activation. In order to study the peptides recognized by this TCC of unknown specificity using a decapeptide positional scanning library, at first the HLA class II molecule used by TCC21.1 to recognize the peptide mixtures was identified. This is a prerequisite for using the peptide library/biometrical analysis approach for unbiased identification of target antigens (Zhao et al., 2001, J Immunol, 167:2130-2141; Sospedra et al., 2010, J Immunol Methods, 353(1-2):93-101). Since patient 1154SA was homozygous for the DR15 haplotype, TCC21.1 was initially tested with the mixtures with amino acids (AAs) defined at position 5, presented by EBV immortalized bare lymphocyte syndrome (BLS) B cell line (BCL) cells transfected with different single autologous HLA DR/DQ molecules (DRA*01:01/DRB5*01:01=DR2a, DRA*01:01/DRB1*15:01=DR2b, and DQA1*01:02/DQB1*06:02). As readout of T cell activation GM-CSF production was used, since TCC21.1 releases this cytokine after unspecific stimulation with anti-CD3 and PMA (Planes et al., 2015). Only mixtures presented by BCL expressing DRB1*15:01 (DR2b) class II molecules were stimulatory (data not shown).

2. Positional Scanning Synthetic Combinatorial Library as a Method for Identifying Antigens/Identification of GDP-L-Fucose Synthase TCC21.1 was then tested with the complete decapeptide positional scanning library (200 mixtures; i.e. mixtures representing the 10 positions of a 10-mer and in each of the fixed positions one of the 20 L-amino acids), presented by BCL expressing DRB1*15:01 class II molecules. GM-CSF release in response to the complete library is shown in FIG. 3A. A similar response pattern was obtained with IL-10 release. Next, a biometrical analysis scoring matrix was generated by assigning numerical values to the stimulatory potential of each of the 20 defined AAs in each of the ten positions of the decapeptide library as previously described (Zhao et al., 2001). Here, the values were calculated as the log base 10 of the median GM-CSF (pg/ml) secretion of three independent experiments in the presence of mixtures, minus the secretion in the absence of mixtures (FIG. 3B). Based on a model of independent contribution of individual AAs to peptide antigen recognition, the predicted stimulatory score of a given peptide is the sum of the matrix values of each AA contained in the peptide at each position (Zhao et al., 2001). This scoring approach was applied to rank, according to their stimulatory score that is predictive of their stimulatory potency, all natural overlapping 10-mers peptides of the protein sequences within the UniProt human protein database. Based upon these predicted values, the 50 predicted human natural peptides with highest scores were synthesized and tested at 5 pg/ml (FIG. 4). Unexpectedly, none of the peptides was clearly stimulatory (FIG. 3C). The predictive capacity of the above approach combining positional scanning library and biometrical analysis was lower for this TCC than for others in previous studies. The most stimulatory mixtures as shown in FIG. 3B have identical defined AAs in consecutive positions, suggesting a possible recognition of one AA motif in multiple frames. To be able to analyze the data using the approach outlined in FIG. 2, a set of 22 dual-defined mixtures (i.e. positional scanning mixtures with two defined positions) was designed, synthesized, and tested (FIG. 3D); the results confirmed the presence of a unique recognition motif (LHSXFEV, SEQ ID NO: 99) with different flanking residues (FIG. 3E). In order to apply this recognition motif in the two frames to the original GM-CSF-derived matrix and perform biometrical analysis, the harmonic mean model (HM) was used to integrate the stimulatory responses of some of the dual defined mixtures (FIG. 3D, Frame 1/2-HM mixtures) into the original matrix. Using the new "harmonic boost" frame 1 and frame 2 matrices, all natural overlapping 10-mers peptides derived from the UniProt human protein database were scored and ranked as schematically shown in FIG. 2. The 50 predicted natural peptides with highest scores for both matrices were synthesized and tested for GM-CSF release (FIG. 4). These two matrices allowed the identification of three clearly stimulatory peptides (FIG. 3F). The two most stimulatory peptides, NVLHSAFEVG (SEQ ID NO: 16) predicted with harmonic boost frame 1 and DNVLHSAFEV (SEQ ID NO: 15) predicted with harmonic boost frame 2, belong to GDP-L-fucose synthase encoded by the TSTA3 gene, and overlap by 9 AAs.

In detail, FIG. 3 shows: A. GM-CSF production by TCC21.1 in response to a complete decapeptide positional scanning library (200 mixtures) presented by BLS cells expressing only DRB1*15:01. B. Score matrix designed with the log10 median of GM-CSF production of three independent experiments. Bold borders show mixtures selected for dual defined mixtures. C. GM-CSF production by TCC21.1 in response to the 50 peptides with highest scores predicted using the GM-CSF-based scoring matrix. D. GM-CSF production by TCC21.1 in response to 22 dual-defined mixtures. In grey, mixtures with defined AAs of the TCR motif in frame 1 and in black in frame 2. Stimulatory responses of mixtures in bold (Frame 1/2-HM) were integrated into the original matrix using the harmonic mean model. E. TCR motif and dual-defined mixture activity values selected based on the harmonic mean model and incorporated into the original matrix, Frame 1-HM in grey and Frame 2-HM in black. F. GM-CSF production by TCC21.1 in response to the 50 peptides with higher scores predicted using harmonic boost frame 1 and 2 score matrices. Complete decapeptide library, dual defined mixtures and individual decapeptides were presented by BLS cells expressing DRB1*15:01. Mixtures were tested at 200 pg/ml and individual decapeptides at 5 pg/ml. Histograms show mean±standard error mean (SEM) and dot plots mean of three independent experiments. Cytokine released is always expressed as pg/ml released by TCC21.1 in response to stimuli minus pg/ml released in absence of stimuli (negative control).

FIG. 4 shows a summary of human decapeptides predicted with the biometrical approach, which have been synthesized and then tested for stimulatory capacity at 5 mg/ml based on GM-CSF release. The peptides are ranked from 1 to 50 for the HM Boost Frame 1 and 2, respectively.

3. RNASeq/Transcriptome and Proteome Data Demonstrating Expression of GDP-L-Fucose-Synthase in Brain Tissue Transcript level, expressed as "reads per kilo base of exon model per million mapped reads" (RPKM), of GDP-L-fucose synthase in the autologous brain LI and LIII is shown in FIG. 5. Transcript values for other brain-specific genes are also shown as quality control of the samples and as reference for genes expressed at high (MBP, PLP1), and medium (myelin-associated glycoprotein (MAG), myelin-associated oligodendrocyte basic protein (MOBP) and oligodendrocyte myelin glycoprotein (OMG)) level.

Seventeen GDP-L-fucose synthase peptides were identified in white and grey matter brain tissue from other MS patients and non-MS controls by proteomic analysis. The peptide sequences are listed in FIG. 5 as well as the peptide spectrum matches (PSM) in the different samples. The percentage of the GDP-L-fucose synthase AA sequence covered by identified peptides was 56%. The position refers to the sequence of UniProtKB/Swiss-Prot: Q13630.1. Analysis of other brain-specific proteins as reference is also included (FIG. 5).

In sum, GDP-L-fucose-synthase has been shown to be expressed in the brain (RNA and protein).

4. GDP-L-Fucose Synthase as the Main Autoantigen for a Brain-Infiltrating TCC

In order to identify autoantigens recognized by TCC21.1 in the two autologous brain lesions, within which TCC21.1 was known to be clonally expanded (LI and III (Planes et al., 2015)), the harmonic boost frame 1 and frame 2 matrices were then used to score and rank, according to their stimulatory score, all natural overlapping 10-mer peptides in the protein sequences within a brain-protein sub-database created with RNASeq-based transcriptome data from these two lesions (GSE60943). Of the 40 predicted natural brain peptides with highest scores for the frame 1 matrix, 38 peptides were already predicted from the unbiased UniProt human database. For frame 2 matrix, the top 40 peptides were previously predicted (FIG. 4). The two new peptides for frame 1 were synthesized and tested. NVLHSAFEVG (GDP-L-fucose synthase 96-105, SEQ ID NO: 16) and DNVLHSAFEV (95-104, SEQ ID NO: 15) were found to stimulate TCC21.1 (FIG. 4).

5. Characterization of GDP-L-Fucose Synthase Recognition/Characterization of Response As mentioned above, the two GDP-L-fucose synthase peptides recognized by TCC21.1 overlap by 9 AAs. On DRB1*15:01-expressing BCL cells nine additional 10-mer peptides overlapping by 9 AAs were synthesized and tested and an additional peptide was identified, VLHSAFEVGA (97-106, SEQ ID NO: 18), which induced GM-CSF release. Peptide NVLHSAFEVG (96-105, SEQ ID NO: 16) gave the optimal response with an EC50 of 0.2 pg/ml and was presented by DRB1*15:01 and DQB1*06:02 molecules. The common AAs of the three stimulatory peptides are VLHSAFEV (97-104) (data not shown).

Next, the response of TCC21.1 to GDP-L-fucose synthase peptides presented by autologous irradiated PBMCs and BCL was characterized. GDP-L-fucose synthase peptides presented by the two types of APCs were able to induce proliferation. The functional phenotype of this response was also analyzed. TCC21.1 displayed a Th2 phenotype, releasing mainly Th2 cytokines and lower levels of IL-22 and IL-10. Unexpectedly, when peptides were presented by autologous BCL, they induced higher levels of IFNγ. In addition, TCC21.1 also released GM-CSF and IL-3 in response to GDP-L-fucose synthase peptides. The release of these two cytokines seems to be a specific feature of this TCC compared with other Th1, Th1* or Th1/2 TLCs that were generated from patients with different conditions. Intracellular cytokine staining confirmed the Th2 functional phenotype of TCC21.1 in response to GDP-L-fucose synthase (96-105, SEQ ID NO: 16). More than 60% of TCC21.1 cells were IL-4+ after stimulation with GDP-L-fucose synthase (96-105, SEQ ID NO: 16), while only around 12% were IFNγ+. Around 60% of the cells were GM-CSF+ and 47.7% of these also IL-4+. Further characterization of TCC21.1 demonstrated expression of CD28 and the chemokine receptor CRTh2 (data not shown).

6. Recognition of GDP-L-Fucose Synthase by CSF-Infiltrating CD4+ T Cells from Patient 1154SA Sixty-two 15-mer peptides overlapping by 10 AAs and covering the entire GDP-L-fucose synthase protein (FIG. 6) were synthesized and tested for their ability to induce TCC21.1 proliferation when presented by autologous PBMCs. Seven immunodominant/encephalitogenic myelin peptides (Bielekova et al., 2004), CEF (cytomegalovirus, EBV, influenza virus and tetanus toxoid) peptide pool and control beads were tested in parallel (FIG. 6). TCC21.1 recognized two overlapping GDP-L-fucose synthase peptides, 91-105 (SEQ ID NO: 14) and 96-110 (SEQ ID NO: 17), containing the three stimulatory decapeptides (95-104 (SEQ ID NO: 15), 96-105 (SEQ ID NO: 16) and 97-106 (SEQ ID NO: 18)) that were identified previously.

7. Recognition of GDP-L-Fucose Synthase by CSF-Infiltrating CD4+ T Cells from CIS/MS Patients In order to find out if specific recognition of GDP-L-fucose synthase occurs in CSF-infiltrating CD4+ T cells in patients with different forms of MS (the majority CIS and RRMS), a new protocol was developed to expand fresh CSF-infiltrating CD4+ T cells to high numbers in a single round to minimize variations in the original T cell repertoire. Resting PHA-expanded CSF-infiltrating CD4+ T cells, T cells that are also derived from the CNS compartment, from 31 CIS/MS patients were tested in quadruplicate with the 62 overlapping GDP-L-fucose synthase peptides presented by autologous irradiated PBMCs, as well as with the seven myelin peptides, CEF peptide pool and control beads. All stimulatory indices (SIs; except control beads) were pooled and SI values less than one were treated as having unit value. Cluster k-means analysis was performed to determine the optimal cut-off to differentiate responsive SI values from nonresponsive in this patient population. K-means clustering resulted in a cut-off value of 1.455 to differentiate positive responses from negative. Subsequently, for each patient, all peptides having a median SI (of the quadruplicate wells) greater than 1.455 were identified as positive responses.

Figure 7:
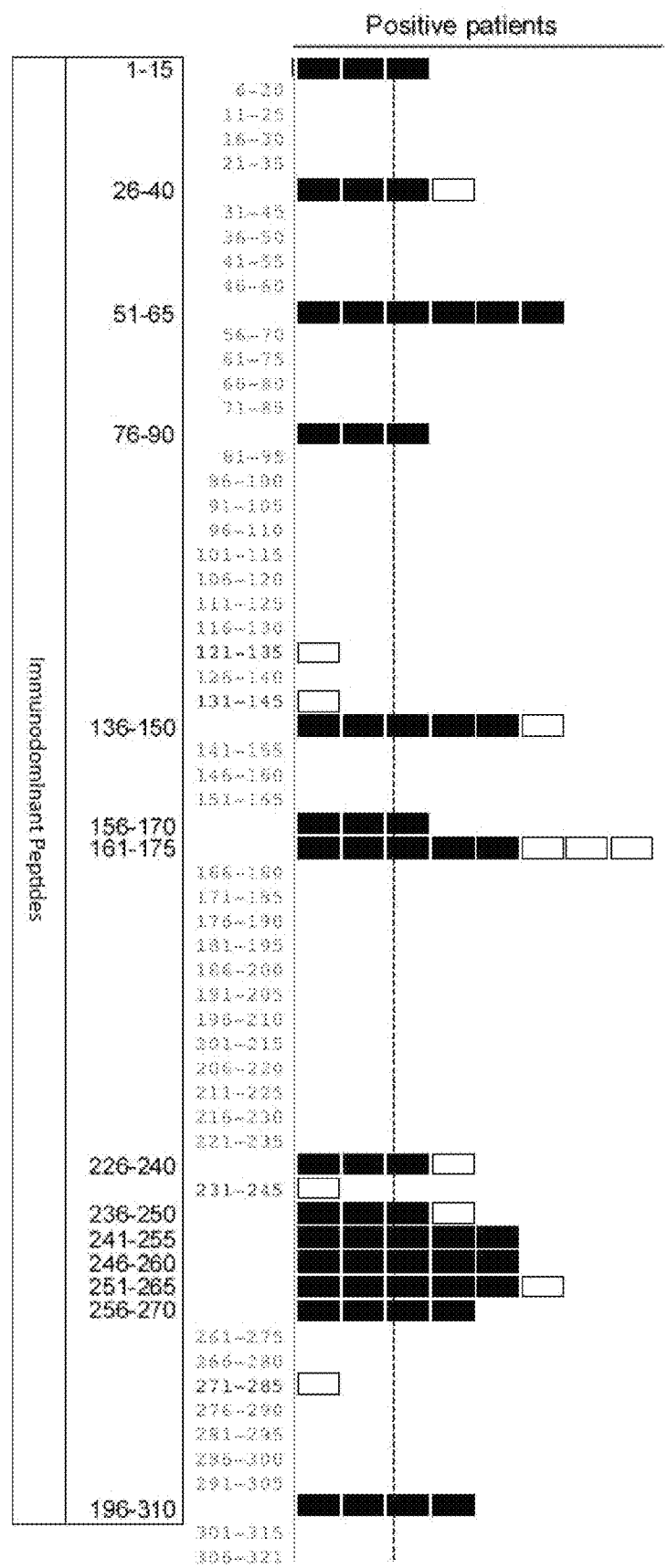
FIG. 7 Recognition of GDP-L-fucose synthase peptides by CSF-infiltrating CD4+ T cells from CIS/MS patients FIG. 8 Isolation of autoproliferating T cells and autoproliferating T cells found in MS brain lesions FIG. 9 Screening procedure for peptide ligand identification of the autoproliferating, peripheral blood isolated brain-homing TCC14 using a positional scanning library FIG. 10 RASGRP2 reactivity of peripheral blood-derived memory T cells FIG. 11 Expression of RASGRPs in peripheral blood B cells and brain FIG. 12 Peptide identification of RASGRP1, 2 and 3 protein in brain tissue FIG. 13 Staining of biotin-PLP1-coupled cells FIG. 14 Recognition of GDP-L-fucose synthase and myelin peptides by CSF-infiltrating CD4+ T cells from 105 MS patients FIG. 15 Recognition of RASGRP2 and myelin peptides by CSF-infiltrating CD4+ T cells from 57 MS patients FIG. 16 Tolerance induction in vivo with red blood cells coupled to myelin peptides

Next, patient scores were constructed by calculating the sum of each responsive peptide median SI, weighted by the number of total patients that responded to that peptide. In this way, both the SI values themselves for each peptide, as well as the relative immunogenicity of each peptide, were factored in to assess the frequency and strength of the immune response against the specific antigens. Three-cluster k-means analysis was performed on base 10 patient scores and clearly grouped patients into three categories: "nonresponders", "moderate responders", and "high responders". Nineteen patients (61.3%) were therefore characterized as nonresponders to GDP-L-fucose synthase, six (19.35%) as moderate, and six (19.35%) as high responders (data not shown). No significant differences between the three groups were found for CEF responses or for the positive or negative controls. Immunodominant peptides were defined as peptides able to induce positive responses in at least 10% of the patients. The 14 GDP-L-fucose peptides achieving this criterion are shown in FIG. 7. Functional analysis of the strongest responses to some immunodominant peptides revealed a Th1 phenotype with mainly production of IFN-γ (data not shown).

In detail, FIG. 7 shows: Number of CIS/MS patients with CSF-infiltrating CD4+ T cells that responded to GDP-L-fucose synthase peptides. Immunodominant peptides that were positive in at least three patients are shown in black. Black squares are high responder and white squares moderate responder patients.

In conclusion, about 20-25% of the MS patients (CIS, RRMS, SPMS) show an immune response to different immunodominant GDP-L-fucose synthase peptides; most of these GDP-L-fucose synthase-specific T cells have a Th1 phenotype (most frequent phenotype in MS patients). A comparison with reaction to 7 myelin peptides (ETIMS peptides) shows that significantly fewer patients react to these peptides as compared to GDP-L-fucose synthase.

RASGRP2 Specificity

8. Identification of TCC14 and Testing ps-SCL with TCC14 to Identify RASGRP2

TCC14 was identified in an analogous approach from MS patient 1 (homozygous for HLA-DR15), however, in this case from the fraction of autoproliferating (proliferation without stimulation) peripheral blood T cells, which is enriched for brain-homing T cells. TCC14 was also shown by deep TCR sequencing of the cells infiltrating the patient's brain lesions that it is clonally expanded in the brain. TCC14 was generated as schematically shown in FIG. 1 (right part). The isolation of autoproliferating T cells is shown in more detail in FIG. 8A. In detail, peripheral blood mononuclear cells are seeded in replicate wells after labeling with the dye carboxyfluorescein diacetate N-succinimidyl ester (CFSE) without stimulus. After 7 days of culture, proliferating ($CFSE^{dim}$) and non-proliferating ($CFSE^{hi}$) cells are identified by flow cytometry and the autoproliferating T cells ($CFSE^{dim}$) isolated by cell sorting. The TCRβV sequences are compared between MS brain lesions and the $CFSE^{dim}$ (autoproliferating) population. Over 20% of TCRβV sequences of the $CFSE^{dim}$ population are also found in MS brain lesions (FIG. 8B).

Figure 9:
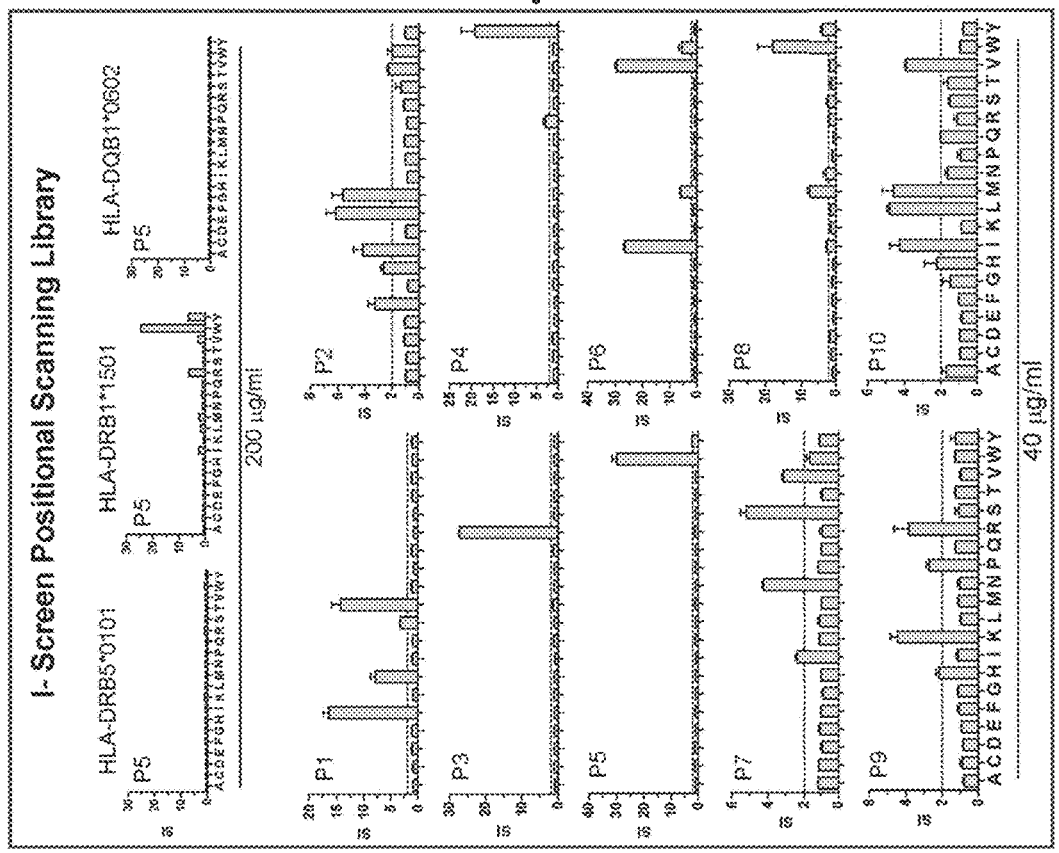

TCC14 was then expanded and tested as shown in FIG. 2, using an unbiased approach to identify the target antigen/s of TCC14 using positional scanning combinatorial peptides libraries and biometrical analysis as described above. TCC14 expanded sufficiently well to be tested with the full set of 200 positional scanning library mixtures. The restriction of TCC14 was tested with BLS cells transfected with HLA-DR15 haplotype expressing HLA class II alleles (DR2a, DR2b or DQw6), since the TCCs are derived from a HLA-DR15 homozygous MS patient. After determining its HLA-class II restriction (DRB1*15:01), reactivity against all 200 samples was tested using BLS cells transfected with DRB1*15:01 and showed positive responses against single or multiple amino acids (aa) in each of the 10 positions. Proliferation (stimulatory index=SI; dotted line SI=2) based on thymidine incorporation assay was used after 72 h as readout for the TCC response (FIG. 9 panel I). Using scoring matrices to summarize the reactivity of TCC14 against all 20 L-aa in each of the 10 positions of the decapeptide library after testing multiple doses, peptides to be recognized by TCC14 (FIG. 9 panel II) were predicted using the biometrical analysis process (Zhao et al., 2001). Mean responses from three repetitive experiments were used to generate a matrix for optimal amino acid combinations of a potential peptide ligand. The brain transcriptome data and the respective proteins of patient 1, from whom the TCC had been isolated, were used as search database. 92 sequences were synthesized and tested for recognition by TCC14 based upon their appearance in the top 50 predicted peptides for at least one of the matrices used (stimulatory response with SI>3) (FIG. 9 panel III). As shown previously for other TLCs, there is a good relationship between predicted high ranking and T cell response (Sospedra et al., 2010; Zhao et al., 2001) since TCC14 recognized many of the high scoring peptides. To assess the functional avidity for these, dose titration experiments were performed with the 33 peptides that gave positive responses. Among these were the peptides with SEQ ID NOs: 33 to 35. The stimulatory peptides were tested in decreasing concentrations for the proliferative response of TCC14 using BLS DR2b after 72 h. (FIG. 9 panel IV). A peptide from RASGRP2 was recognized with high antigen avidity (EC50=0.012 µM) (SEQ ID NO: 33), but peptides from several other RASGRP isoforms (RASGRP1, -3, 4) and other peptides gave positive responses as well (FIG. 9 panel IV). The recognition of the RASGRP2 peptide by TCC14 resulted in secretion of Th2 cytokines and also of IFN-γ (data not shown).

In conclusion, multiple RASGRP versions are recognized by the clone TCC14 with RASGRP2 with by far the highest avidity (i.e. at lower antigen concentrations), underscoring its biological relevance.

9. RASGRP2 Reactivity of Peripheral Blood Cells

In order to test reactivity to RASGRP2 in peripheral blood-derived memory T cells, cryopreserved PBMCs ($1\times10^8$ cells) of natalizumab-treated MS patients (NAT; n=8) were thawed and afterwards depleted for CD45RA-expressing cells using magnetic cell sorting (Miltenyi). $2\times10^8$ CD45RA-depleted PBMCs were seeded per well (10-15 replicate wells per condition) in X-Vivo medium and were either treated with vehicle (DMSO), with CD2/CD3/CD28 beads or pulsed with RASGRP2 peptide pools (final concentration of pool 10 µM) or whole purified RASGRP2 protein (Origene; 0.3 µg/ml). The 15mer-overlapping peptides covering the whole RASGRP2 protein (SEQ ID NO:s 38-98) were organized in 9 peptide pools with 7 peptides per pool covering the sequence of RASGRP2 from N- (pool 1) to C-terminus (pool 9). Thymidine incorporation assay was used to measure proliferation responses to RASGRP2. At day 7 the cells were pulsed with 1 µCi of methyl-3H-thymidine per well (Hartmann Analytic) and harvested after 15 h on a membrane (Tomtec). Incorporation was measured by p-scintillation counting (Wallac 1450, PerkinElmer). The results are shown as dots (mean±SEM). Stimulatory index (SI) was calculated as ratio of peptide or protein stimulation vs. vehicle control. SI values>2 were considered as positive (FIG. 10).

Figure 10:
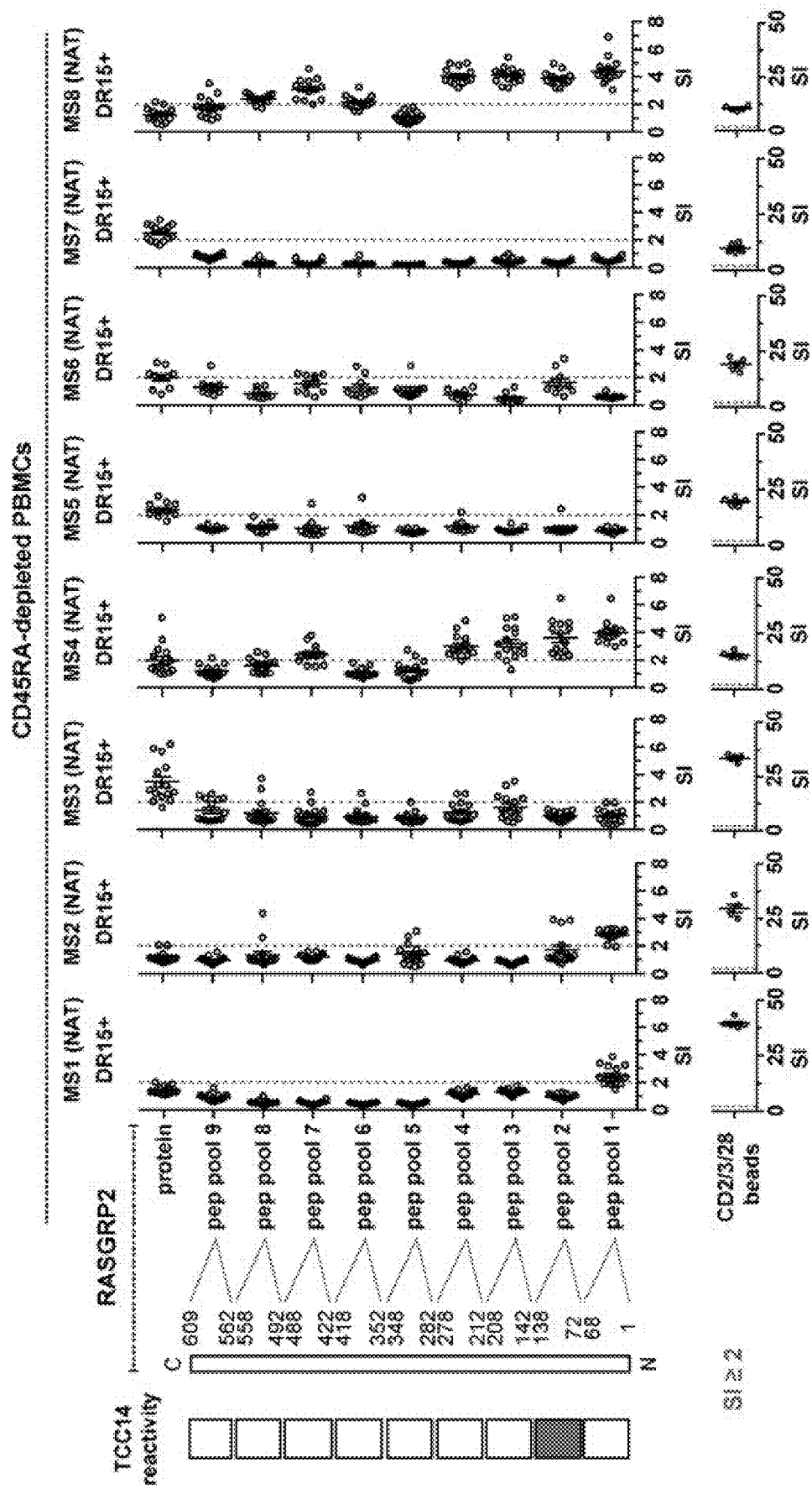

In sum, FIG. 10 shows that memory T cells from MS patients with high autoproliferation react to RASGRP2. All 8 donors responded to either individual or several peptide pools of RASGRP2 peptides (including pool 2, which contains the peptide with SEQ ID NO: 46 which overlaps with a target peptide of TCC 14 (SEQ ID NO: 33)) and/or entire protein demonstrating that RASGRP2 is an autoantigen that is broadly recognized by MS patients with a high degree of autoproliferation.

Figure 11:
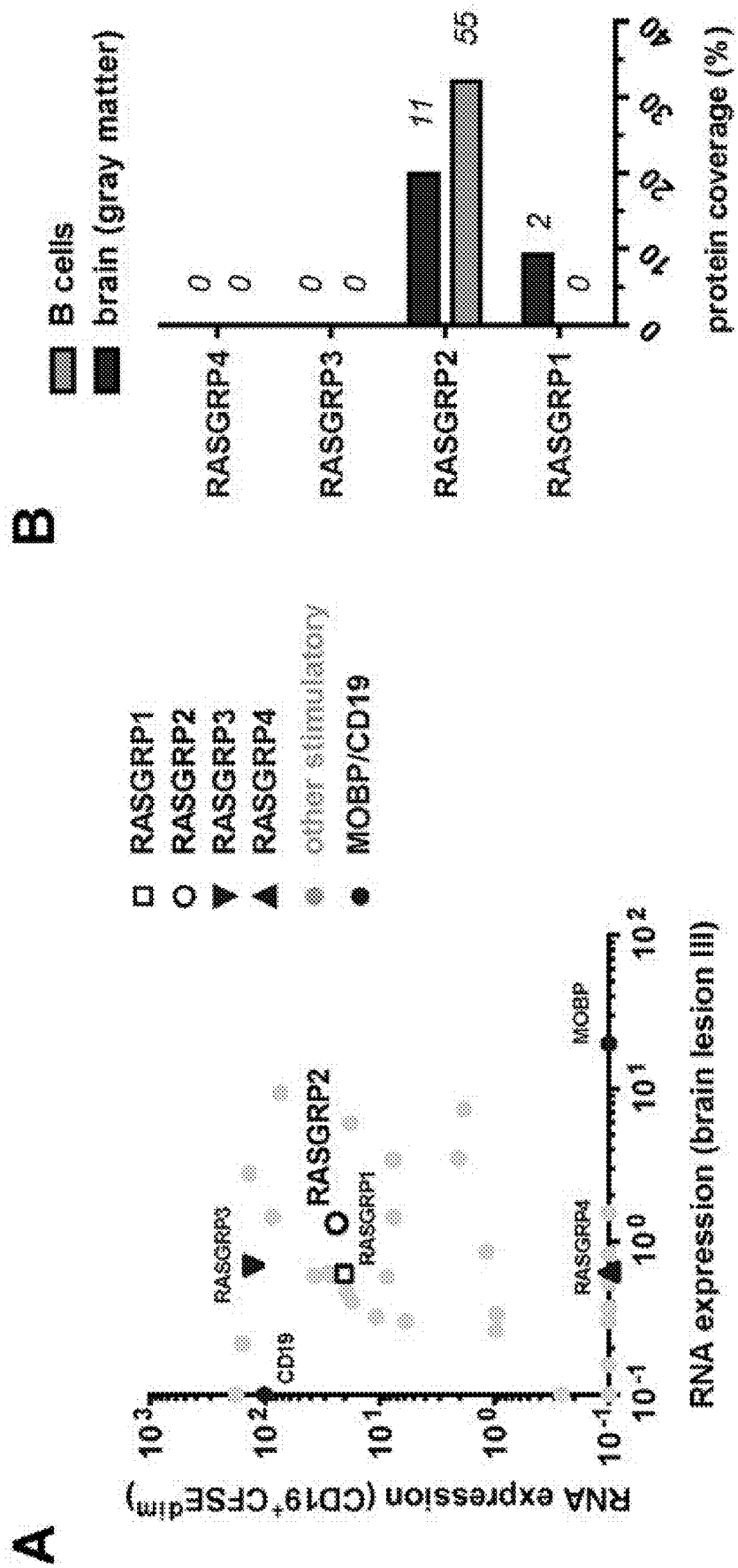

10. RNASeq/Transcriptome and Proteome Data Demonstrating Expression of RASGRP2 in B Cells and in the Brain Expression of RASGRP1-4 was tested on RNA and protein level in peripheral B cells and brain (FIG. 11). RASGRP1-3 are expressed both in the brain of patient 1 and in the transcriptome of autoproliferating memory B cells (FIG. 11).

In detail, FIG. 11 shows: (A) Expression level of stimulatory peptide-originating transcripts in the active brain lesion III of MS patient 1 (RPKM) and autoproliferating ($CFSE^{dim}$), peripheral blood B cells (RPKM) from 6 RRMS (REM) patients. Expression levels under 0.1 or absent transcript expression were set as 0.1. Expression of control transcripts for brain (MOBP) and B cells (CD19) are also shown. (B) Mass spectrometry analysis of peripheral blood B cells of RRMS (REM, nihil; n=4) and brain tissue (gray matter, pooled, n=6) of MS patients. The protein coverage (columns) and spectral counts (numbers) of RASGRP1-4 are depicted as measure for protein abundance.

Brain tissue (white and gray matter) of controls and MS patients were also tested with proteomics using mass spectrometry. Peptides of RASGRP1, 2 and 3 proteins were identified in brain tissue, in particular with a high abundance of RASGRP2 (FIG. 12). The position refers to the sequence of: GenBank AAC97349.1 (RASGRP1), GenBank AAI10307.1 (RASGRP2), and GenBank AAY15037.1 (RASGRP3).

Further, immunohistochemistry (IHC) studies were performed and showed expression of RASGRP2 protein in brain gray matter, specifically in cortical neurons, and spleen (data not shown).

11. Identification of Further Immunodominant Peptides Within the GDP-L-Fucose Synthase and RASGRP2 Sequences Furthermore, peptides have been identified based on commonly used search algorithms and assumptions to be potentially immunogenic. The approach has been adopted from the context of tumor vaccination, where the search for immunogenic peptides in self proteins (from a tumor) is a standard procedure. In this scenario, a protein sequence is screened for peptides that are predicted to bind to disease-relevant HLA alleles (or the HLA alleles of a given tumor patient). Therefore, the GDP-L-fucose synthase and RASGRP2 sequences were taken and strong (SB) or weak (WB) binding peptides were predicted using the well-accepted NetMHCII (http://www.cbs.dtu.dk/services/NetMHCII/) and IEDB (http://www.iedb.org/) in silico peptide binding prediction algorithms. Details how to perform the searches are readily available on the websites of the two search algorithms. In brief, the search entails copying the sequence of the protein of interest into the webtool and choosing a HLA-class II (or class I, if of interest) allele of interest. The algorithm will then yield the peptide sequences and their respective predicted binding to the HLA-class II allele. For alleles, for which NetMHCII searches were not possible, IEDB was used. HLA alleles that are known to be associated with MS have been used. If one now considers all regions of the two proteins that are predicted to be WB (these are of highest interest in the context of autoantigens) or SB (NetMHCII searches) or have a predicted binding rank of 25% or lower (IEDB), these stretches of amino acids will cover almost the whole GDP-L-fucose synthase and RASGRP2 proteins:

For the GDP-L-fucose synthase protein, peptides spanning the area of amino acids 1 to 315 were predicted to bind.

For the RASGRP2 protein, peptides spanning the areas of amino acids 9 to 449 and 457 to 659 were predicted to bind.

The following alleles were used:
HLA-DRB1*15:01 (NetMHCII)
HLA-DRB5*01:01 (NetMHCII)
HLA-DRB1*03:01 (NetMHCII)
HLA-DRB1*13:03 (IEDB)
HLA-DRB1*08:01 (IEDB)
HLA-DRB3*02:02 (IEDB)
HLA-DRB1*04:01 (NetMHCII)
HLA-DRB1*04:04 (NetMHCII)
HLA-DQw6 (DQA1*01:01; DQB1*06:02) (IEDB)

The following protein sequences were used:
GDP-L-fucose synthase: GenBank: AAH93061.1
RASGRP2: GenBank: AAI10307.1

In conclusion, whole proteins and immunodominant peptides are suitable for use in the treatment, diagnosis and/or prevention of MS.

12. Manufacturing of a Chemically Coupled Red Blood Cell EDC as Chemical Cross Linker A peptide that had been synthesized with a biotin residue (biotin-PLP1; PLP1=PLP 139-154) has been used to allow highly specific detection of the peptide using fluorophore-conjugated strepatividin. Briefly, peripheral blood mononuclear cells were pulsed with either biotin-PLP1 (final concentration 0.05 mg/ml), EDC (final concentration 10 mg/ml), both in PBS for 1 h at 4° C. After two washing steps cells were stained with fluorophore-conjugated streptavidin and analysed by flow cytometry (Streptavidin-APC).

Figure 13:
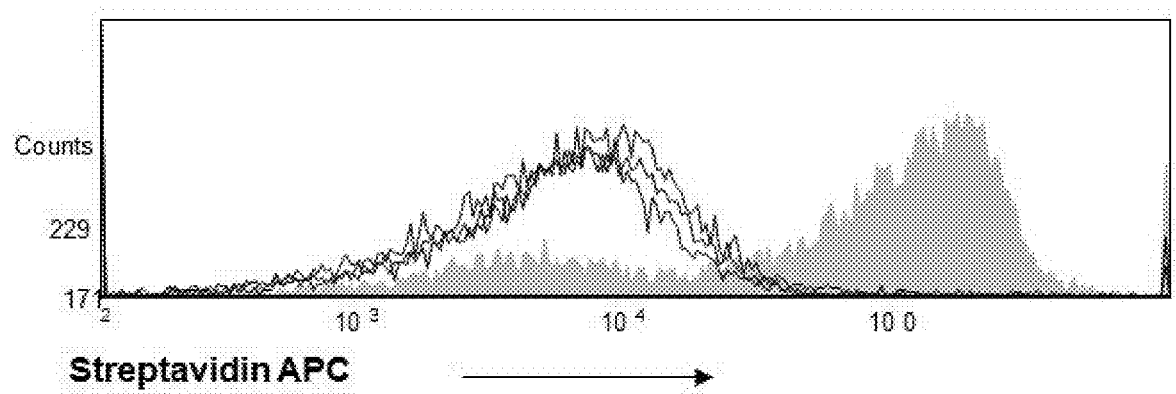

As shown in FIG. 13, efficient peptide binding was only observed in the presence of both (biotin-PLP peptide and EDC).

13. Further Analysis with 105 MS Patients (for GDP-L-Fucose Synthase) and 57 MS Patients (for RASGRP2)

A further analysis with 105 MS patients (for GDP-L-fucose synthase) and 57 MS patients (for RASGRP2) was performed to validate the immunodominance of GDP-L-fucose synthase peptides 51-65, 136-150, 161-175, 246-260 and 296-310 (SEQ ID NOs: 12, 21, 23, 28 and 32) and RASGRP2 peptide 78-92 (SEQ ID NO: 46). The reactivity of CSF-infiltrating CD4+ T cells, which are highly relevant for the pathogenicity of MS, to the tested peptides was compared with the reactivity to the known immunodominant reference peptides MBP 13-32, MBP 83-99, MBP 111-129, MBP 146-170, MOG 1-20, MOG 35-55, and PLP 139-154.

Figure 14:
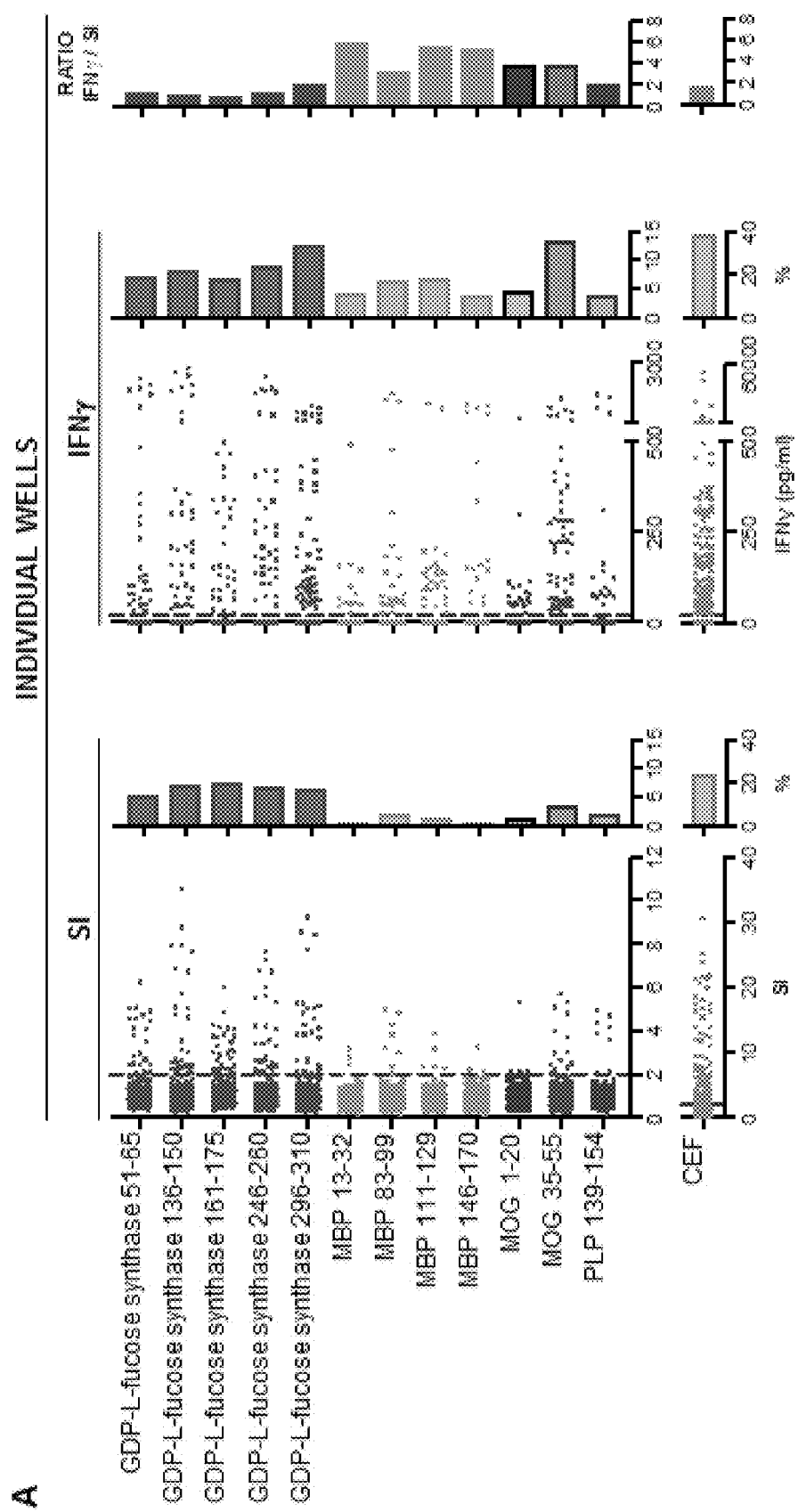
Figure 15:
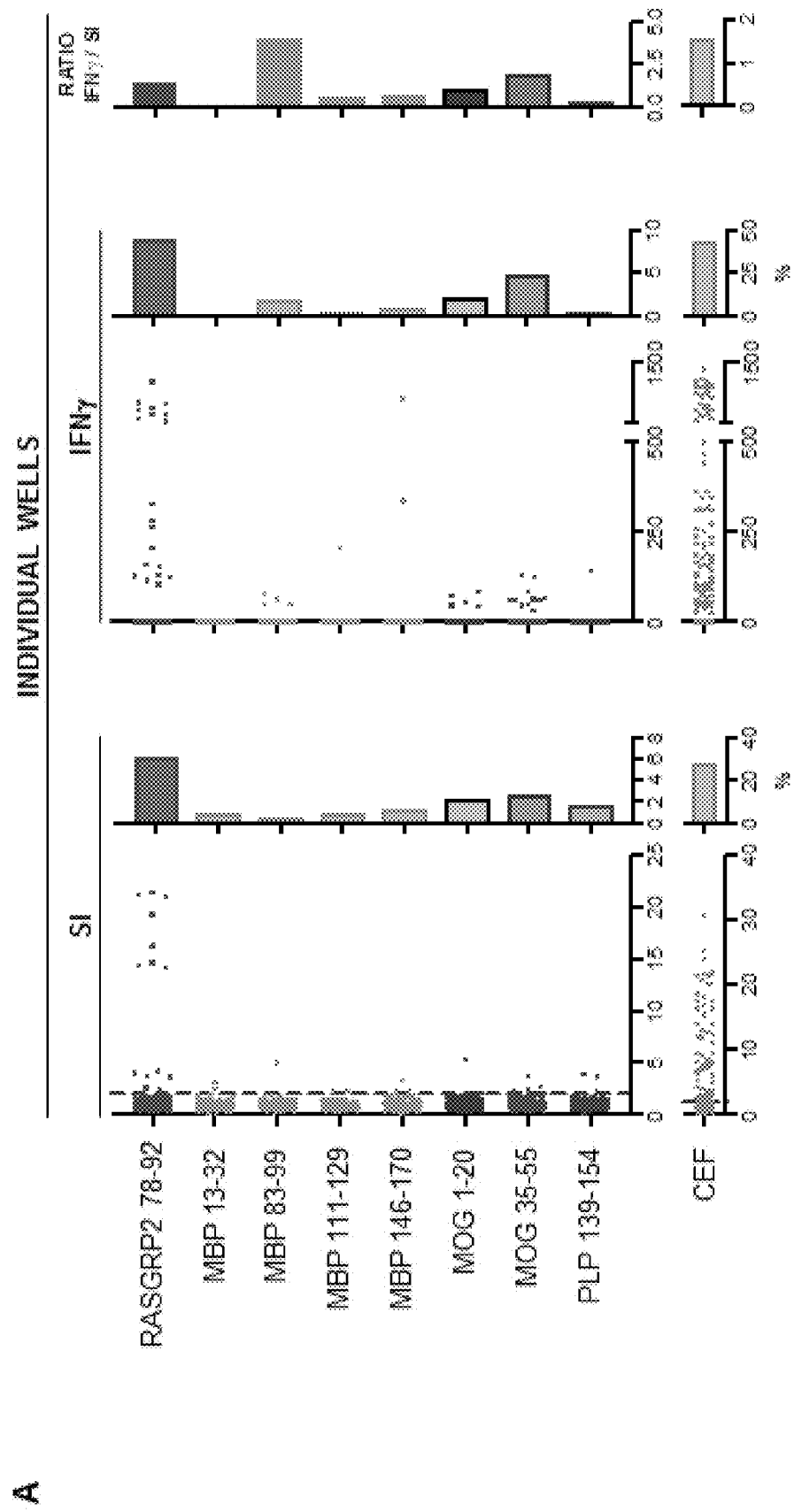

The results are shown in FIGS. 14 and 15. The data show that the tested peptides, which are fragments of the herein identified proteins GDP-L-fucose synthase and RASGRP2, are as reactive or even more reactive than the known immunodominant reference peptides. Thus, the tested peptides have again been confirmed as immunodominant. Studying CSF-infiltrating T cells and their response to a putative autoantigen is particularly meaningful because autoreactive T cells that have infiltrated the target organ, i.e. brain, spinal cord or CSF, are considered likely biologically relevant Proliferative responses and IFN-γ secretion were tested as described above under 7. and below under 15. Materials and Methods, unless otherwise specified.

In detail, FIG. 14 shows: A. Proliferative responses expressed as stimulatory indices (SI) and IFN-γ secretion (pg/ml) of CSF-infiltrating CD4+ T cells (single round of PHA expansion) to five GDP-L-fucose synthase peptides (51-65, 136-150, 161-175, 246-260 and 296-310), four MBP peptides (13-32, 83-99, 111-129 and 146-170), two MOG peptides (1-20 and 35-55), one PLP peptide (139-154) and CEF peptides, presented by autologous PBMCs. All peptides have been tested in four wells per patient. Each dot represents one well and each peptide has been tested in 420 wells (4 wells×105 patients). Positive wells are wells with SIs above 2 (dotted line) or with IFN-γ above 20 pg/ml (dotted line). Percentage of positive wells are also shown as well as the ratio between the percentage of positive wells for IFN-γ and SI. B. Percentage of positive patients with CSF-infiltrating CD4+ T cells specific for the different peptides or without identified specificity. Positive patients are defined as patients with more than 2 of the 4 wells positive for SI (left histogram), IFN-γ (middle histogram) and SI or IFN-γ (right histogram).

In detail, FIG. 15 shows: A. Proliferative responses expressed as stimulatory indices (SI) and IFN-γ secretion (pg/ml) of CSF-infiltrating CD4+ T cells (single round of PHA expansion) to one RASGRP2 peptide (78-92), four MBP peptides (13-32, 83-99, 111-129 and 146-170), two MOG peptides (1-20 and 35-55), one PLP peptide (139-154) and CEF peptides, presented by autologous PBMCs. All peptides have been tested in four wells per patient. Each dot represents one well and each peptide has been tested in 228 wells (4 wells×57 patients). Positive wells are wells with SIs above 2 (dotted line) or with IFN-γ above 20 pg/ml (dotted line). Percentage of positive wells are also shown as well as the ratio between the percentage of positive wells for IFN-γ and SI. B. Percentage of positive patients with CSF-infiltrating CD4+ T cells specific for the different peptides or without identified specificity. Positive patients are defined as patients with more than 2 of the 4 wells positive for SI (left histogram), IFN-γ (middle histogram) and SI or IFN-γ (right histogram).

14. Tolerance Induction In Vivo with Myelin Peptides in a Phase Ib Trial 10 patients who were diagnosed with MS were tested for tolerance induction. In particular, they were tested for safety and tolerability of peptide-coupled, EDC-fixed red blood cells and for indicators of tolerance induction in vivo by i.v. injection of autologous red blood cells chemically (by EDC) coupled to a set of myelin peptides (MBP 13-32, MBP 83-99, MBP 111-129, MBP 146-170, MOG 1-20, MOG 35-55, and PLP 139-154) (SEQ ID Nos: 261-267) in context of a Phase Ib trial. In short, blood is taken from each patient and red blood cells are separated. The red blood cells are then chemically coupled to the myelin peptides ex vivo under sterile conditions and i.v. injected into the patient. 2 patients received $1 \times 10^{10}$ cells, 3 patients received $1 \times 10^{11}$ cells and 5 patients received $3 \times 10^{11}$ cells. The day of injection was defined as Day 0.

Blood was also taken 6 weeks before injection (=Pre Tolerization) and 12 weeks after injection (=Post Tolerization). On these dates, the peripheral blood lymphocytes were obtained and examined by flow cytometry with fluorescently labeled antibodies for the presence of a wide range of different cell types including several subpopulations of T cells, B cells, monocytes and dendritic cells, natural killer cells including those expressing markers of induced T regulatory cells (Tr1) or natural T regulatory cells (nTregs). The latter two cell types can be characterized by the following markers:

T regulatory 1 (Tr1) cells (CD3+ CD4+ CD45RA− CD49b+ LAG3+)

FoxP3+ natural T regulatory (nTreg) cells (CD4+ CD25hi FOXP3+)

In addition, T cell reactivity to all seven peptides individually was measured for peripheral blood T cells and for CSF-infiltrating T cells as described below under "Testing of CSF-derived bulk T cells from CIS- and RRMS patients against GDP-L-fucose synthase and myelin peptides" and "T cell stimulation" on the same dates, i.e. 6 weeks before injection and 12 weeks after injection.

FIG. 16 shows that signs of antigen-specific tolerance induction upon injection of the coupled red blood cells were detectable as measured by an increase in Tr1 and FoxP3+ nTreg cells and a decrease of peptide-specific T cell reactivity. These data indicate that by administering immunodominant peptides tolerance to the respective immunodominant peptides can be induced.

In detail, FIG. 16 shows:

A. Percentage of Tr1 cells of CD4+ memory cells 6 weeks before injection (=Pre Tolerization) and 12 weeks after injection (=Post Tolerization). B. Percentage of FoxP3+ nTreg cells of CD4+ memory cells 6 weeks before injection (=Pre Tolerization) and 12 weeks after injection (=Post Tolerization). C. T cell reactivity in five patients that received $3 \times 10^{11}$ cells 6 weeks before injection and 12 weeks after injection (grey dots: before injection; black dots: after injection). Top graph shows the percentage of cells responding to all peptides. Bottom graph shows the proliferation of each individual microwell (60 in total).

15. Materials and Methods

Patient Material

GDP-L-Fucose Synthase

Patient 1154SA: CSF-derived mononuclear cells and PBMCs were obtained from a SPMS patient with pattern II demyelinating lesions as previously described (Planes et al., 2015). HLA-class I and II types of this patient were: A*32:01, A*33:01, B*14:02, B*51:01, DRB1*15:01, DRB5* 01:01, DQB1*06:02 and DQA1*01:02.

CSF from diagnostic lumbar puncture and paired peripheral blood were collected from 31 untreated MS patients: 8 patients with CIS, 20 patients with RRMS and 3 patients with SPMS. Patients were recruited from the inims outpatient clinic and day hospital at the University Medical Center Hamburg-Eppendorf and the nims section, Neurology Clinic, University Hospital Zurich. MS diagnosis was based on the revised McDonald criteria. All CIS patients had CSF-specific oligoclonal bands detected by isoelectric focusing (IEF). Patients, who had not received steroids at least 4 weeks prior to enrolment or any immunomodulatory or immunosuppressive agent during the last 3 months, were considered untreated and included in the study. Fresh CSF cells from these patients were expanded in vitro (see below). PBMCs were freshly isolated from EDTA-containing blood tubes by Ficoll density gradient centrifugation (PAA, Pasching, Austria) and cryopreserved. The Ethik Kommission der Arztekammer Hamburg, protocol No. 2758 and the Cantonal Ethical Committee of Zurich, EC-No. of the research project 2013-0001, approved the study procedures. Informed consent was obtained from all patients or relatives.

Brain autopsy tissue from 13 MS patients (7 SPMS, 5 PPMS and 1 primary relapsing (PR)MS) and 7 non-MS controls were obtained from the UK Multiple Sclerosis Tissue Bank (UK Multicentre Research Ethics Committee, MREC/02/2/39).

For the further analysis of GDP-L-fucose synthase (13. of "Examples"), CSF from 105 patients were collected. Among the 105 patients, the ratio females to males was 1.9, the mean age was 35.68 (range 17-58), 4 patients were diagnosed with RIS, 10 patients were diagnosed with CIS, 82 patients were diagnosed with RRMS, 4 patients were diagnosed with SPMS and 5 patients were diagnosed with PPMS.

RASGRP2

PBMC were isolated from patient 1154SA by Ficoll density centrifugation.

For the further analysis of RASGRP2 (13. of "Examples"), CSF from 57 patients were collected. The 57 patients were among the 105 patients tested for GDP-L-fucose synthase. Among the 57 patients, the ratio females to males was 2.5, the mean age was 35.33 (range 17-55), 2 patients were diagnosed with RIS, 8 patients were diagnosed with CIS, 43 patients were diagnosed with RRMS, 1 patient was diagnosed with SPMS and 3 patients were diagnosed with PPMS.

Autoproliferation Assays

PBMCs were thawed with complete IMDM media (GE Healthcare) containing 100 U/mL penicillin/streptomycin (Corning), 50 µg/mL gentamicin (Sigma-Aldrich), 2 mmol/L L-glutamine (PAA) and 5% heat-decomplemented human serum (HS, PAA) and afterwards washed once with serum-free AIM-V medium (GIBCO, Thermo Fisher Scientific), containing human albumin. Cells were incubated for 15 min in AIM-V medium containing 50 U/ml DNAse (Roche) at 37° C. to avoid cell clump formation. Following two wash steps with PBS containing 0.1% HS, cells were resuspended at a concentration of $10 \times 10^6$ cells/ml in PBS/0.1% HS and were then labeled at a final concentration of 0.5 μM CFSE(Sigma-Aldrich) for 3 min at room temperature. The labeling was stopped by quenching with 5× excess volume of cold complete RPMI (PAN Biotech) medium containing 10% HS. After one further wash step with AIM-V, CFSE-labeled cells were seeded at $2 \times 10^5$ PBMCs/200 μl per well in AIM-V (10-12 replicate wells per donor and condition) in 96-well U-bottom microtiter plates (Greiner Bio-One) at 37° C., 5% $CO_2$, in the absence of exogenous stimuli (=autoproliferation). For conventional T cell reactions, for the same donors PHA (0.5 μg/ml) as TCR-independent stimulus, tetanus toxoid (TTx, 5 μg/ml, Novartis Behring) as foreign antigen stimulus and mixed lymphocyte reaction (MLR) as allogeneic antigen stimulus were used. After 7 days CFSE-labeled cells were collected and pooled from replicate wells, washed with PBS, Fc-blocked with human IgG (Sigma-Aldrich) and labeled with Live/Dead® Aqua (Invitrogen, Thermo Fisher Scientific) at 4° C. After washing with cold PBS containing 2 mM EDTA and 2% FCS, cells were directly stained for surface markers using the fluorochrome-conjugated antibodies (Key Resource Table). Measurements were performed on an LSR Fortessa Flow Cytometer (BD Biosciences), and data were analyzed with FlowJo (Tree Star). This assay was further used to test competition of autoproliferation by incubating CFSE-labeled PBMCs in the presence of anti-HLA-DR, anti-CD4, anti-IFN-γ and anti-GM-CSF antibodies (10 μg/ml) or appropriate isotype controls for 7 days. For thymidine incorporation assay, $2 \times 10^5$ PBMCs/well (10-12 replicate wells per donor and condition) were cultured with serum-free AIM-V medium in 96-well U-bottom microtiter plates at 37° C., 5% $CO_2$ and at day 7 pulsed with 1 μCi of methyl-$^3$H-thymidine per well (Hartmann Analytic) and harvested cells after 15 h (Tomtec). Incorporation was measured by p-scintillation counting (Wallac 1450, PerkinElmer).

T Cell Cloning

In order to generate TCCs from the autoproliferating compartment, 500 $CFSE^{dim}$ cells from the sorted cell pool of $CFSE^{dim}$ cells (20.000 cells) of MS patient 1 (for the TCRVβ sequencing, described above) were split and limiting dilution was performed as previously described (Aly et al., 2011). TCCs were enriched using an expansion protocol with PHA (Sigma) and human IL-2 (Aly et al., 2011). Sequencing of TCR rearrangements of the generated TCCs was analyzed, as previously described (Yousef et al., 2012). To assess the cytokine response of the TCCs, anti-CD2/CD3/CD28 antibody-loaded MACSibead particles (Miltenyi) were used to stimulate each TCC in 7 replicate wells with each 200.000 cells in X-Vivo medium (Lonza). After 48 h supernatants were collected and cytokine responses measured, as described above. For chemokine receptor expression, TCCs were stained with Live/dead Aqua and antibodies against CXCR3 and CCR6 after thawing and resting cells overnight.

Transcriptomic Analysis

Transcriptomic analysis of brain lesions was performed as previously described (Planes et al., 2015). The data discussed was deposited in NCBI's Gene Expression Omnibus and are accessible through GEO Series accession number GSE60943.

Proteomic Analysis

For proteomic analysis, pressure-assisted protein extraction and digestion was performed with a barocycler (2320EXT, BioSciences, Inc, South Easton, MA). Reduction and alkylation was applied on the homogenate before samples were digested with Lys-C and trypsin. Peptides were desalted on solid phase extraction columns (C18 Finisterre, Wicom Germany), vacuum dried, re-dissolved and measured (Nanodrop 1000, spectrophotometer (Thermo Scientific, Wilmington, De., USA). Resulting peptides were purified and separated by hydrophilic interaction chromatography (HILIC, Agilent LC1200 equipped with a column Polyamin II 250×3.0 mm 120 Å, 5 μm) before they were injected on a nano liquid chromatography system Easy-nLC linked to an Orbitrap Fusion instrument (Thermo Fisher). Data analysis was performed with MASCOT software using a human UniProtKB/Swiss-Prot protein database (Mar. 22, 2016 with 40912 entries). Search parameters were 0.05 Da fragment mass tolerance and 10 ppm precursor mass, minimal number of peptides 2, and FDR (false discovery rate) of 0.1%, allowing 2 mis-cleavages on trypsin fragments. Carbamidomethylation at cysteine was set as a fixed modification, and oxidation of methionine, n-terminal acetylation as variable modifications.

Positional Scanning Peptide Libraries and Individual Peptides

GDP-L-Fucose Synthase

A synthetic N-acetylated, C-amide L-amino acid (AA) decapeptide combinatorial library in a positional scanning format (200 mixtures) and twenty-two dual defined mixtures were prepared. Individual peptides (FIG. 4 and FIG. 6) were synthesized by Peptides and Elephants GmbH (Potsdam, Germany).

RASGRP2

An L-aa decapeptide positional scanning library (N-acetylated and C-amide TPI 2040) was prepared by standard methods. Each of the 200 mixtures of the library was tested for their proliferative activity by TCC14 at 40, 120, and 200 μg/ml using thymidine incorporation assay. The restriction of TCC14 was tested with BLS cells transfected with HLA-DR15 haplotype expressing HLA class II alleles (DR2a (=DRBS*01:01), DR2b (=DRB1*15:01) or DQw6 (=DQB1*0602)), since the TCC is derived from a HLA-DR15 homozygous MS patient. HLA class II expression of BLS cell lines was verified with specific antibodies against DR2a, DR2b and DQ and cells were tested negative for mycoplasma. The results were organized into four matrices (data not shown): three matrices each representing the activity at one of the above doses, and a matrix using the concentration to achieve 3-fold proliferation to combine all three doses into a single activity. Using the biometrical analysis process (Zhao et al., 2001) against the transcriptome protein database from the brain of MS patient 1154SA, predicted peptide lists were generated for each of the four matrices. Due to a large amount of agreement between the predicted lists, a total of 92 distinct decamer peptides occurred within the top 50 predicted peptides in at least one matrix's prediction list. These peptides were chosen to be synthesized (by Peptides and Elephants GmbH, Potsdam, Germany) and tested.

Cells and Culture Conditions

Bulk CSF-derived mononuclear cells from patient 1154SA were expanded as previously reported (Planes et al., 2015). Briefly, 2000 cells per well were seeded in 96-well U-bottom microtiter plates together with 2×10⁵ allogeneic irradiated PBMC (45 Gy), 1 µg/ml of PHA-L (Sigma, St Louis, MO) and IL-2 supernatant (500 U/ml). Medium consisted of IMDM (PAA) containing 100 U/ml penicillin/ streptomycin (PAA), 50 µg/ml gentamicin (BioWhittaker, Cambrex), 2 mM L-glutamine (Gibco, Invitrogen, Carlsbad, CA) and 5% heat-decomplemented human serum (PAA). Additional IL-2 was added every 3-4 days. CSF-infiltrating CD4+ T cells were positively selected using anti-CD4 magnetic beads (CD4 Micro Beads human MACS, Miltenyi Biotec Inc, CA, USA) and restimulated once again with PHA-L, IL-2 and allogeneic irradiated PBMC.

TCC21.1 was established from CSF-infiltrating cells and TCC14 from PBMC-derived autoproliferating T cells as previously described (Planes et al., 2015).

Testing of CSF-Derived Bulk T Cells from CIS- and RRMS Patients Against GDP-L-Fucose Synthase and Myelin Peptides Fresh bulk CSF-derived mononuclear cells from the 31 CIS/MS patients were mixed with 5×10⁶ allogeneic irradiated PBMCs and CD4+ T cells were positively selected with anti-CD4 magnetic beads. CD4+ fractions were then seeded at 1500 cells per well in 96-well U-bottom microtiter plates together with 1.5×10⁵ allogeneic irradiated PBMC, 1 µg/ml of PHA-L and IL-2 supernatant. Medium consisted of RPMI 1640 without Hepes (Pan-Biotech, Aidenbach, Germany) supplemented with 2 mM glutamine (Pan-Biotech), 1% (vol/vol) nonessential amino acids (Gibco), 1% (vol/vol) sodium pyruvate (Gibco), 50 µg/ml penicillin-streptomycin (Corning, NY, USA), 0.00001% β-mercaptoethanol(Gibco) and 5% human serum (Blood Bank Basel). Additional IL-2 was added every 4 days. Growing wells were transferred to 48 well plates and finally to 75 cm3 flask until cells were fully rested (20-25 days). Cells were highly expanded in a single round of stimulation.

For the further analysis of GDP-L-fucose synthase peptides and a RASGRP2 peptide (13. of "Examples"), the same method was performed.

An autologous BCL from patient 1154SA was generated by EBV-transformation. BLS cells were transfected with single HLA class II molecules, DR2a (DRA1*01:01, DRB5*01:01), DR2b (DRA1*01:01, DRB1*15:01) and DQw6 (DQA1*01:02, DQB1*06:02).

T Cell Stimulation

TCC responses to single/dual defined peptide mixtures or individual decapeptides were tested by seeding in duplicate 2×10⁴ T cells and 5×10⁴ irradiated BLS cell lines or autologous BCL or 1×10⁵ irradiated PBMC (as indicated) with or without combinatorial peptide mixtures or individual decapeptides. 2.5 µg/ml PHA and 10⁻⁷ M PMA (Sigma), 1 µg/ml of surface-coated anti-CD3 (OKT3, Ortho Biotech Products, Raritan, NJ) and 0.5 pg/ml of soluble anti-CD28 (Biolegend, San Diego, CA), and a T Cell Activation Kit (anti-CD3, anti-CD28, anti-CD2 beads) (Miltenyi Biotec) served as positive controls as indicated.

The response of PHA-expanded CSF-infiltrating CD4+ T cells to GDP-L-fucose synthase, myelin and CEF peptides (FIG. 6) was tested by seeding in quadruplicate 6×10⁴ T cells and 2×10⁵ irradiated autologous PBMCs with or without peptides. For EdU experiments BLS DRB1*15:01 were used as APCs. T Cell Activation Kit was used as positive control.

For the further analysis of GDP-L-fucose synthase peptides and a RASGRP2 peptide (13. of "Examples"), the same method was performed as for the response of PHA-expanded CSF-infiltrating CD4+ T cells to GDP-L-fucose synthase.

Cytokine Measurement
GDP-L-Fucose Synthase

Cytokines in the supernatant of stimulated TCC21.1 and expanded CSF cells were measured 48 h after stimulation using the Human T Helper Cytokine Panel LEGENDplex bead-based immunoassay (Biolegend), GM-CSF ELISA (BD Biosciences, Franklin Lakes, NJ) and IL-3 ELISA (Biolegend) according to the manufacturer's instructions.

For intracellular cytokine staining, TCC21.1 was analyzed 48 h after stimulation. After 5 h in presence of GolgiStop protein transport inhibitor (BD Biosciences), T cells were labeled with Live/Dead® Aqua (Invitrogen). Following fixation and permeabilization with Cytofix/Cytoperm (BD Biosciences), cells were stained with antibodies against CD4 (APC-Cy7, Biolegend), IFN-γ (FITC, Biolegend), IL-4 (PE, BD Bioscience), GM-CSF (APC, Biolegend) and IL-3 (PE, Biolegend) in PBS containing saponin and BSA, and analyzed by flow cytometry.

For the further analysis of GDP-L-fucose synthase peptides and a RASGRP2 peptide (13. of "Examples"), the secretion of IFN-γ in the supernatant of stimulated and unstimulated expanded CSF-infiltrating T cells was measured after 48 h of culture using IFN-γ ELISA (Biolegend) per duplicate in all single wells according to the manufacturer's instructions.

Proliferative Responses
GDP-L-Fucose Synthase

Proliferation was measured 72 h after stimulation by 3H-thymidine (Hartmann Analytic, Braunschweig, Germany) incorporation in a scintillation counter (Wallac 1450, PerkinElmer, Rodgau-Jurgesheim, Germany). The stimulatory index (SI) was calculated as follows: SI=Median (replicates cpm peptide)/Median (replicates cpm without peptide). Proliferation was also measured using a Click-iT™ EdU Flow Cytometry Assay Kit (APC, Molecular Probes, Invitrogen) following manufacturer's instructions. Cells were stained with the following antibodies anti-CD3 (PE-Cy-7, e-Bioscience, San Diego, CA) and anti-TRBV-21 (FITC, Beckman Coulter, Brea, CA) and analyzed by flow cytometry.

RASGRP2

The proliferative responses were tested as described under 9.

For the further analysis of GDP-L-fucose synthase peptides and a RASGRP2 peptide (13. of "Examples"), proliferative responses were measured as described for GDP-L-fucose synthase above.

Surface Receptor Expression

Resting TCC21.1 was stained with antibodies against CD4 (PE-Texas Red, Thermo Fischer, Waltham, MA), TRBV21 (FITC, Beckman Coulter), CD28 (PE-Cy7, BioLegend), CCR4 (APC, BioLegend), CCR6 (BV785, BioLegend) and CRTh2 (PE, BioLegend) and analyzed by flow cytometry.

Flow Cytometric Analysis

Sample acquisition was conducted using a LSR Fortessa Flow Cytometer (BD Biosciences) with Diva software, and data were analyzed with FlowJo (Tree Star, Ashland, OR).

RT-PCR and Sequencing of TCR Rearrangements

RNA extraction, reverse transcription and TCRα/β-chain (TRA/BV) sequencing of TCC21.1 was assessed as previously reported (Planes et al., 2015). TCR gene designations are in accord with IMGT nomenclature (ImMunoGeneTics, vvww.IMGT.org).

HLA

Individuals were typed for HLA-class I and II molecules at Histogenetics LLC, NY, USA. Isolation of DNA from whole blood with a final concentration of 15 ng/μl was performed with a standard DNA isolation protocol using a Triton™ lysis buffer and proteinase K treatment. The samples were typed for HLA class I (A* and B*) and HLA class II (DRB1*, DRB3*, DRB4*, DRB5*, DQA1* and DQB1*) using high-resolution HLA sequence-based typing (SBT). The HLA class II binding predictions were made using the IEDB analysis resource consensus tool.

Statistical Analysis

Three-cluster k-means analysis was performed on patient scores to group patients into three categories. Associations between response levels of peptides, patients, and HLA status were all performed using Fisher's Exact Test with Bonferroni-Holm correction applied as appropriate, with 5% significance.

Embodiments

1. A GDP-L-fucose synthase protein or a protein of the RASGRP protein family, or a fragment, derivative or splice variant thereof, or a nucleotide sequence encoding any of the proteins or fragment, derivative or splice variant thereof, for use in the treatment, diagnosis and/or prevention of multiple sclerosis (MS).
    A GDP-L-fucose synthase protein or a protein of the RASGRP protein family, in particular RASGRP2, or a fragment thereof is especially preferred.
2. The protein, fragment, derivative or splice variant according to embodiment 1, wherein the GDP-L-fucose synthase protein
    a) has the amino acid sequence as set forth in SEQ ID NO: 1 or
    b) has an amino acid sequence which is at least 85%, preferably at least 90%, more preferably at least 95% identical to the amino acid sequence as set forth in SEQ ID NO: 1 or
    c) has an amino acid sequence which is at least 70%, preferably at least 80%, more preferably at least 90% homologous to the amino acid sequence as set forth in SEQ ID NO: 1 or
    d) has an amino acid sequence which is at least 60%, preferably at least 70%, more preferably at least 80%, even more preferably at least 90% homologous to the amino acid sequence as set forth in SEQ ID NO: 1 and the protein or fragment or splice variant thereof binds to an autologous HLA allele, is recognized by a T cell and/or is recognized by an antibody which binds to or recognizes the amino acid sequence as set forth in SEQ ID NO: 1 or a fragment thereof or
    e) is encoded by a TSTA3 gene, in particular by a gene sequence of nucleotides 143612618 to 143618048 of NC_000008.11, or is encoded by a gene which is at least 80%, preferably at least 90%, even more preferably at least 95% identical to the gene sequence of nucleotides 143612618 to 143618048 of NC_000008.11 and/or
    wherein the member of the RASGRP protein family
    f) has the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
    g) has an amino acid sequence which is at least 85%, preferably at least 90%, more preferably at least 95% identical to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
    h) has an amino acid sequence which is at least 70%, preferably at least 80%, more preferably at least 90% homologous to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or
    i) has an amino acid sequence which is at least 60%, preferably at least 70%, more preferably at least 80%, even more preferably at least 90% homologous to the amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 and the protein or fragment or splice variant thereof binds to an autologous HLA allele, is recognized by a T cell and/or is recognized by an antibody which binds to or recognizes the respective amino acid sequence as set forth in any of SEQ ID NO: 2, SEQ ID NO: 3, SEQ ID NO: 4, SEQ ID NO: 5, SEQ ID NO: 6, SEQ ID NO: 7, SEQ ID NO: 8 or SEQ ID NO: 9 or a fragment thereof or
    j) is encoded by a RASGRP gene, in particular by a gene sequence of nucleotides
        38488101 to 38565575 of NC_000015.10,
        64726911 to 64745456 of NC_000011.10,
        33436324 to 33564750 of NC_000002.12, or
        38409051 to 38426305 of NC_000019.10,
    or is encoded by a gene which is at least 80%, preferably at least 90%, even more preferably at least 95% identical to the gene sequence of nucleotides
        38488101 to 38565575 of NC_000015.10,
        64726911 to 64745456 of NC_000011.10,
        33436324 to 33564750 of NC_000002.12, or
        38409051 to 38426305 of NC_000019.10.

The GDP-L-fucose synthase protein with the amino acid sequence as set forth in SEQ ID NO: 1 or a protein with at least 90% identity or a fragment thereof is especially preferred. A RASGRP2 protein with the amino acid sequence as set forth in SEQ ID NO: 2, SEQ ID NO: 6, SEQ ID NO: 7, SEQ ID NO: 8 or SEQ ID NO: 9 or a protein with at least 90% identity or a fragment thereof is also especially preferred.

3. The protein, fragment, derivative or splice variant according to embodiment 1 or 2, wherein the fragment comprises 5 to 50, preferably 5 to 20, more preferably 10 to 15 amino acids, even more preferably 15 amino acids.
    A fragment of a length of 10 to 15 amino acids is particularly preferred.
4. The protein, fragment, derivative or splice variant according to embodiment 2 or 3, wherein the fragment is
    a) at least 85%, preferably at least 90%, more preferably at least 95% identical to a respective corresponding amino acid sequence or
    b) at least 70%, preferably at least 80%, more preferably at least 90% homologous to a respective corresponding amino acid sequence or
    c) at least 60%, preferably at least 70%, more preferably at least 80%, even more preferably at least 90% homologous to a respective corresponding amino acid sequence and binds to an autologous HLA allele, is recognized by a T cell and/or is recognized by an antibody which binds to or recognizes the respective amino acid sequence.

It is especially preferred that the fragment is at least 90% identical to the respective corresponding amino acid sequence.

5. The protein, fragment, derivative or splice variant according to any of the preceding embodiments, wherein the fragment comprises a sequence selected from the group comprising SEQ ID NOs: 10 to 98, preferably SEQ ID NOs: 10 to 35, preferably consists of a sequence selected from the group comprising SEQ ID NO: 10 to 98, preferably SEQ ID NOs: 10 to 35.
   The fragment preferably comprises a sequence selected from the group comprising SEQ ID NOs: 10 to 35.
6. The protein, fragment, derivative or splice variant according to any of the preceding embodiments for identifying a human subject who is suitable for tolerization to autoantigens in MS, preferably early MS. It is particularly preferred to use the protein or fragment thereof.
7. The protein, fragment, derivative or splice variant according to any of embodiments 1 to 5 for diagnosing pattern II MS in a human subject. It is particularly preferred to use the protein or fragment thereof.
8. A carrier comprising at least one protein, fragment, derivative, splice variant, nucleotide sequence and/or gene sequence according to any of embodiments 1 to 5. It is particularly preferred that the carrier comprises at least one protein, fragment or nucleotide sequence.
9. The carrier according to embodiment 8, wherein the carrier is coupled to the at least one protein, fragment, derivative and/or splice variant, and/or the carrier contains the at least one protein, fragment, derivative, splice variant, nucleotide sequence and/or gene sequence.
   It is particularly preferred that the carrier is coupled to the at least one protein or fragment and/or that the carrier contains the nucleotide sequence.
10. The carrier according to embodiment 8 or 9, wherein the carrier is selected from the group comprising a cell, preferably a blood cell, a protein, a lipid, a glycolipid, a bead, a nanoparticle, a virus-like-particle (VLP) and a molecule, such as a sugar molecule, and any combination thereof.
    The carrier is preferably a blood cell.
11. The carrier according to embodiment 10, wherein the protein, fragment, derivative and/or splice variant is expressed by the cell, preferably the blood cell.
    It is especially preferred that the protein is expressed by a blood cell.
12. The carrier according to embodiment 10 or 11, wherein the blood cell is a red or white blood cell.
13. The carrier according to any of embodiments 10 to 12, wherein the carrier is a blood cell and the blood cell is chemically coupled by a coupling agent, preferably by 1-ethyl-3-(3-dimethylaminopropyl)-carbodiimide (ECDI/EDC), to the at least one protein, fragment, derivative and/or splice variant. Preferably, the at least one protein or fragment is coupled by EDC to a blood cell.
14. A method of manufacturing the chemically coupled blood cell of embodiment 13, comprising isolating the blood cell from a human subject, adding the at least one protein, fragment, derivative and/or splice variant and subsequently adding the coupling agent, preferably EDC. Preferably, at least one protein or fragment is added.
15. A pharmaceutical composition comprising at least one protein, fragment, derivative, splice variant, nucleotide sequence and/or gene sequence according to any of embodiments 1 to 5 and a pharmaceutically acceptable carrier. The pharmaceutical composition preferably comprises at least one protein or fragment thereof or a nucleotide sequence and a pharmaceutically acceptable carrier.
16. A method for inducing antigen-specific tolerance to autoantigens in a human subject suffering from or at risk of developing MS comprising the step of applying to the human subject
    a) at least one protein, fragment, derivative, splice variant, nucleotide sequence and/or gene sequence according to any of embodiments 1 to 5, and/or
    b) at least one carrier according to any of embodiments 8 to 13.
    A method for inducing antigen-specific tolerance is preferred, wherein at least one protein or fragment thereof or a carrier which coupled to the at least one protein or fragment and/or a carrier which contains the nucleotide sequence is applied.
17. The method according to embodiment 16, wherein the at least one protein, fragment, derivative, splice variant, nucleotide sequence and/or gene sequence is applied by nasal, inhaled, oral, subcutaneous (s.c.), intracoelomic (i.c), intramuscular (i.m.), intradermal (i.d.), transdermal (t.d.) or intravenous (i.v.) administration, preferably by i.v., s.c., i.d., t.d., oral, inhaled, nasal or coupled to a carrier, preferably a red blood cell.
18. The method according to embodiment 16 or 17 for inducing antigen-specific tolerance to autoantigens in early MS.
19. A method for identifying a human subject suitable for tolerization to autoantigens in MS, preferably early MS, comprising isolating T cells and/or antibodies from blood, CSF or other body fluid of the subject and measuring reactivity of the T cells and/or antibodies against the protein, fragment, derivative and/or splice variant according to any of embodiments 1 to 5. It is particularly preferred to measure the reactivity of the T cells and/or antibodies against a fragment.
20. The fragment according to any of embodiments 3 to 5, preferably the fragment according to embodiment 5, for use as a medicament. The fragment particularly comprises a sequence selected from the group comprising SEQ ID NOs: 10 to 35.
21. Use of the protein, fragment, derivative and/or splice variant according to any of embodiments 1 to 5 in the in vitro diagnosis of MS. It is particularly preferred to use the protein or a fragment thereof.
22. A method for in vitro diagnosing MS using the protein, fragment, derivative and/or splice variant according to any of embodiments 1 to 5. It is particularly preferred to use the protein or a fragment thereof.
23. Use of the protein, fragment, derivative and/or splice variant according to any of embodiments 1 to 5 in the in vitro pretesting of a human subject diagnosed with MS or a human subject at risk to develop MS. It is particularly preferred to use the protein or a fragment thereof.
24. Use of the protein, fragment, derivative and/or splice variant according to any of embodiments 1 to 5 for the manufacture of a medicament for the treatment, diagnosis and/or prevention of MS. It is particularly preferred to use the protein or a fragment thereof.
25. The protein, fragment, derivative and/or splice variant according to any of embodiments 1 to 5, wherein the derivative is an amino acid sequence which shares a homology or identity over its entire length with a corresponding part of the reference amino acid sequence of at least 75%, more preferably at least 80%, at least 85%, at least 90%, at least 93%, at least 95%, at least 97%, at least 98% or at least 99%.

26. An in vitro method for identifying a human subject suitable for tolerization to autoantigens in MS, preferably early MS, comprising measuring reactivity of T cells and/or antibodies against the protein, fragment, derivative and/or splice variant according to any of embodiments 1 to 5 with previously obtained T cells and/or antibodies from blood, CSF or other body fluid of the subject. It is particularly preferred to use the protein or a fragment thereof.

27. The at least one protein, fragment, derivative, splice variant, nucleotide sequence and/or gene sequence according to any of embodiments 1 to 5, and/or the at least one carrier according to any of embodiments 8 to 13 for use in a method for inducing antigen-specific tolerance to autoantigens in a human subject suffering from or at risk of developing MS comprising the step of applying to the human subject the at least one protein, fragment, derivative, splice variant, nucleotide sequence and/or gene sequence according to any of embodiments 1 to 5, and/or the at least one carrier according to any of embodiments 8 to 13. It is particularly preferred to use the protein or a fragment thereof and/or the at least one carrier coupled to the protein or the fragment thereof.

28. The at least one protein, fragment, derivative, splice variant, nucleotide sequence and/or gene sequence according to embodiment 27 and/or the at least one carrier according to embodiment 27, wherein the at least one protein, fragment, derivative, splice variant, nucleotide sequence and/or gene sequence is applied by nasal, inhaled, oral, subcutaneous (s.c.), intracoelomic (i.c), intramuscular (i.m.), intradermal (i.d.), transdermal (t.d.) or intravenous (i.v.) administration, preferably by i.v., s.c., i.d., t.d., oral, inhaled, nasal or coupled to a carrier, preferably a red blood cell. It is particularly preferred to use the protein or a fragment thereof and/or the at least one carrier coupled to the protein or the fragment thereof.

29. The at least one protein, fragment, derivative, splice variant, nucleotide sequence and/or gene sequence according to any of embodiments 1 to 5, and/or the at least one carrier according to any of embodiments 8 to 13 for inducing antigen-specific tolerance to autoantigens in early MS. It is particularly preferred to use the protein or a fragment thereof and/or the at least one carrier coupled to the protein or the fragment thereof.

The invention claimed is:

1. A pharmaceutical composition comprising:
more than three different immunodominant fragments of a GDP-L-fucose synthase protein or of a protein of the RAS guanyl releasing protein (RASGRP) protein family, or at least one nucleotide sequence encoding the more than three different immunodominant fragments, and a pharmaceutically acceptable carrier,
wherein each of the more than three different immunodominant fragments is a peptide and consists of 5 to 50 amino acids,
wherein at least one of the more than three different immunodominant fragments is an immunodominant fragment of a GDP-L-fucose synthase protein and at least another one of the more than three different immunodominant fragments is an immunodominant fragment of a protein of the RAS guanyl releasing protein (RASGRP) protein family,
wherein one of the more than three different immunodominant fragments is a myelin peptide.

2. The pharmaceutical composition according to claim 1, wherein each of the more than three different immunodominant fragments consists of 5 to 20 amino acids.

3. The pharmaceutical composition according to claim 1, wherein each of the more than three different immunodominant fragments consists of 10 to 15 amino acids.

4. The pharmaceutical composition according to claim 1, wherein each of the more than three different immunodominant fragments consists of 15 amino acids.

* * * * *

SEQUENCE LISTING

```
<160> NUMBER OF SEQ ID NOS: 309

<210> SEQ ID NO 1
<211> LENGTH: 321
<212> TYPE: PRT
<213> ORGANISM: Homo sapiens

<400> SEQUENCE: 1

Met Gly Glu Pro Gln Gly Ser Met Arg Ile Leu Val Thr Gly Gly Ser
1               5                   10                  15

Gly Leu Val Gly Lys Ala Ile Gln Lys Val Val Ala Asp Gly Ala Gly
            20                  25                  30

Leu Pro Gly Glu Asp Trp Val Phe Val Ser Ser Lys Asp Ala Asp Leu
        35                  40                  45

Thr Asp Thr Ala Gln Thr Arg Ala Leu Phe Glu Lys Val Gln Pro Thr
    50                  55                  60

His Val Ile His Leu Ala Ala Met Val Gly Gly Leu Phe Arg Asn Ile
65                  70                  75                  80

Lys Tyr Asn Leu Asp Phe Trp Arg Lys Asn Val His Met Asn Asp Asn
                85                  90                  95

Val Leu His Ser Ala Phe Glu Val Gly Ala Arg Lys Val Val Ser Cys
            100                 105                 110

Leu Ser Thr Cys Ile Phe Pro Asp Lys Thr Thr Tyr Pro Ile Asp Glu
        115                 120                 125

Thr Met Ile His Asn Gly Pro Pro His Asn Ser Asn Phe Gly Tyr Ser
    130                 135                 140

Tyr Ala Lys Arg Met Ile Asp Val Gln Asn Arg Ala Tyr Phe Gln Gln
145                 150                 155                 160

Tyr Gly Cys Thr Phe Thr Ala Val Ile Pro Thr Asn Val Phe Gly Pro
                165                 170                 175

His Asp Asn Phe Asn Ile Glu Asp Gly His Val Leu Pro Gly Leu Ile
            180                 185                 190

His Lys Val His Leu Ala Lys Ser Ser Gly Ser Ala Leu Thr Val Trp
        195                 200                 205
```

```
Gly Thr Gly Asn Pro Arg Arg Gln Phe Ile Tyr Ser Leu Asp Leu Ala
        210                 215                 220

Gln Leu Phe Ile Trp Val Leu Arg Glu Tyr Asn Glu Val Glu Pro Ile
225                 230                 235                 240

Ile Leu Ser Val Gly Glu Glu Asp Glu Val Ser Ile Lys Glu Ala Ala
                245                 250                 255

Glu Ala Val Val Glu Ala Met Asp Phe His Gly Glu Val Thr Phe Asp
                260                 265                 270

Thr Thr Lys Ser Asp Gly Gln Phe Lys Lys Thr Ala Ser Asn Ser Lys
            275                 280                 285

Leu Arg Thr Tyr Leu Pro Asp Phe Arg Phe Thr Pro Phe Lys Gln Ala
        290                 295                 300

Val Lys Glu Thr Cys Ala Trp Phe Thr Asp Asn Tyr Glu Gln Ala Arg
305                 310                 315                 320

Lys

<210> SEQ ID NO 2
<211> LENGTH: 662
<212> TYPE: PRT
<213> ORGANISM: Homo sapiens

<400> SEQUENCE: 2

Ala Ala Ala Ala Ala Arg Pro Ala Gly Gly Ser Ala Arg Arg Trp Gly
1               5                   10                  15

Arg Pro Gly Arg Cys Gly Leu Leu Ala Ala Gly Pro Lys Arg Val Arg
                20                  25                  30

Ser Glu Pro Gly Gly Arg Leu Pro Glu Arg Ser Leu Gly Pro Ala His
            35                  40                  45

Pro Ala Pro Ala Ala Met Ala Gly Thr Leu Asp Leu Asp Lys Gly Cys
        50                  55                  60

Thr Val Glu Glu Leu Leu Arg Gly Cys Ile Glu Ala Phe Asp Asp Ser
65                  70                  75                  80

Gly Lys Val Arg Asp Pro Gln Leu Val Arg Met Phe Leu Met Met His
                85                  90                  95

Pro Trp Tyr Ile Pro Ser Ser Gln Leu Ala Ala Lys Leu Leu His Ile
                100                 105                 110

Tyr Gln Gln Ser Arg Lys Asp Asn Ser Asn Ser Leu Gln Val Lys Thr
            115                 120                 125

Cys His Leu Val Arg Tyr Trp Ile Ser Ala Phe Pro Ala Glu Phe Asp
        130                 135                 140

Leu Asn Pro Glu Leu Ala Glu Gln Ile Lys Glu Leu Lys Ala Leu Leu
145                 150                 155                 160

Asp Gln Glu Gly Asn Arg Arg His Ser Ser Leu Ile Asp Ile Asp Ser
                165                 170                 175

Val Pro Thr Tyr Lys Trp Lys Arg Gln Val Thr Gln Arg Asn Pro Val
            180                 185                 190

Gly Gln Lys Lys Arg Lys Met Ser Leu Leu Phe Asp His Leu Glu Pro
        195                 200                 205

Met Glu Leu Ala Glu His Leu Thr Tyr Leu Glu Tyr Arg Ser Phe Cys
210                 215                 220

Lys Ile Leu Phe Gln Asp Tyr His Ser Phe Val Thr His Gly Cys Thr
225                 230                 235                 240

Val Asp Asn Pro Val Leu Glu Arg Phe Ile Ser Leu Phe Asn Ser Val
                245                 250                 255
```

```
Ser Gln Trp Val Gln Leu Met Ile Leu Ser Lys Pro Thr Ala Pro Gln
                260                 265                 270

Arg Ala Leu Val Ile Thr His Phe Val His Val Ala Glu Lys Leu Leu
            275                 280                 285

Gln Leu Gln Asn Phe Asn Thr Leu Met Ala Val Val Gly Gly Leu Ser
        290                 295                 300

His Ser Ser Ile Ser Arg Leu Lys Glu Thr His Ser His Val Ser Pro
305                 310                 315                 320

Glu Thr Ile Lys Leu Trp Glu Gly Leu Thr Glu Leu Val Thr Ala Thr
                325                 330                 335

Gly Asn Tyr Gly Asn Tyr Arg Arg Arg Leu Ala Ala Cys Val Gly Phe
            340                 345                 350

Arg Phe Pro Ile Leu Gly Val His Leu Lys Asp Leu Val Ala Leu Gln
        355                 360                 365

Leu Ala Leu Pro Asp Trp Leu Asp Pro Ala Arg Thr Arg Leu Asn Gly
    370                 375                 380

Ala Lys Met Lys Gln Leu Phe Ser Ile Leu Glu Glu Leu Ala Met Val
385                 390                 395                 400

Thr Ser Leu Arg Pro Pro Val Gln Ala Asn Pro Asp Leu Leu Ser Leu
                405                 410                 415

Leu Thr Val Ser Leu Asp Gln Tyr Gln Thr Glu Asp Glu Leu Tyr Gln
            420                 425                 430

Leu Ser Leu Gln Arg Glu Pro Arg Ser Lys Ser Ser Pro Thr Ser Pro
        435                 440                 445

Thr Ser Cys Thr Pro Pro Arg Pro Pro Val Leu Glu Glu Trp Thr
    450                 455                 460

Ser Ala Ala Lys Pro Lys Leu Asp Gln Ala Leu Val Val Glu His Ile
465                 470                 475                 480

Glu Lys Met Val Glu Ser Val Phe Arg Asn Phe Asp Val Asp Gly Asp
                485                 490                 495

Gly His Ile Ser Gln Glu Glu Phe Gln Ile Ile Arg Gly Asn Phe Pro
            500                 505                 510

Tyr Leu Ser Ala Phe Gly Asp Leu Asp Gln Asn Gln Asp Gly Cys Ile
        515                 520                 525

Ser Arg Glu Glu Met Val Ser Tyr Phe Leu Arg Ser Ser Ser Val Leu
    530                 535                 540

Gly Gly Arg Met Gly Phe Val His Asn Phe Gln Glu Ser Asn Ser Leu
545                 550                 555                 560

Arg Pro Val Ala Cys Arg His Cys Lys Ala Leu Ile Leu Gly Ile Tyr
                565                 570                 575

Lys Gln Gly Leu Lys Cys Arg Ala Cys Gly Val Asn Cys His Lys Gln
            580                 585                 590

Cys Lys Asp Arg Leu Ser Val Glu Cys Arg Arg Arg Ala Gln Ser Val
        595                 600                 605

Ser Leu Glu Gly Ser Ala Pro Ser Pro Ser Pro Met His Ser His His
    610                 615                 620

His Arg Ala Phe Ser Phe Ser Leu Pro Arg Pro Gly Arg Arg Gly Ser
625                 630                 635                 640

Arg Pro Pro Glu Ile Arg Glu Glu Val Gln Thr Val Glu Asp Gly
                645                 650                 655

Val Phe Asp Ile His Leu
            660
```

```
<210> SEQ ID NO 3
<211> LENGTH: 797
<212> TYPE: PRT
<213> ORGANISM: Homo sapiens

<400> SEQUENCE: 3

Met Gly Thr Leu Gly Lys Ala Arg Glu Ala Pro Arg Lys Pro Ser His
1               5                   10                  15

Gly Cys Arg Ala Ala Ser Lys Ala Arg Leu Glu Ala Lys Pro Ala Asn
            20                  25                  30

Ser Pro Phe Pro Ser His Pro Ser Leu Ala His Ile Thr Gln Phe Arg
        35                  40                  45

Met Met Val Ser Leu Gly His Leu Ala Lys Gly Ala Ser Leu Asp Asp
    50                  55                  60

Leu Ile Asp Ser Cys Ile Gln Ser Phe Asp Ala Asp Gly Asn Leu Cys
65                  70                  75                  80

Arg Ser Asn Gln Leu Leu Gln Val Met Leu Thr Met His Arg Ile Val
                85                  90                  95

Ile Ser Ser Ala Glu Leu Leu Gln Lys Val Ile Thr Leu Tyr Lys Asp
            100                 105                 110

Ala Leu Ala Lys Asn Ser Pro Gly Leu Cys Leu Lys Ile Cys Tyr Phe
        115                 120                 125

Val Arg Tyr Trp Ile Thr Glu Phe Trp Val Met Phe Lys Met Asp Ala
    130                 135                 140

Ser Leu Thr Asp Thr Met Glu Glu Phe Gln Glu Leu Val Lys Ala Lys
145                 150                 155                 160

Gly Glu Glu Leu His Cys Arg Leu Ile Asp Thr Thr Gln Ile Asn Ala
                165                 170                 175

Arg Asp Trp Ser Arg Lys Leu Thr Gln Arg Ile Lys Ser Asn Thr Ser
            180                 185                 190

Lys Lys Arg Lys Val Ser Leu Leu Phe Asp His Leu Glu Pro Glu Glu
        195                 200                 205

Leu Ser Glu His Leu Thr Tyr Leu Glu Phe Lys Ser Phe Arg Arg Ile
    210                 215                 220

Ser Phe Ser Asp Tyr Gln Asn Tyr Leu Val Asn Ser Cys Val Lys Glu
225                 230                 235                 240

Asn Pro Thr Met Glu Arg Ser Ile Ala Leu Cys Asn Gly Ile Ser Gln
                245                 250                 255

Trp Val Gln Leu Met Val Leu Ser Arg Pro Thr Pro Gln Leu Arg Ala
            260                 265                 270

Glu Val Phe Ile Lys Phe Ile Gln Val Ala Gln Lys Leu His Gln Leu
        275                 280                 285

Gln Asn Phe Asn Thr Leu Met Ala Val Ile Gly Gly Leu Cys His Ser
    290                 295                 300

Ser Ile Ser Arg Leu Lys Glu Thr Ser Ser His Val Pro His Glu Ile
305                 310                 315                 320

Asn Lys Val Leu Gly Glu Met Thr Glu Leu Leu Ser Ser Ser Arg Asn
                325                 330                 335

Tyr Asp Asn Tyr Arg Arg Ala Tyr Gly Glu Cys Thr Asp Phe Lys Ile
            340                 345                 350

Pro Ile Leu Gly Val His Leu Lys Asp Leu Ile Ser Leu Tyr Glu Ala
        355                 360                 365

Met Pro Asp Tyr Leu Glu Asp Gly Lys Val Asn Val His Lys Leu Leu
    370                 375                 380
```

```
Ala Leu Tyr Asn His Ile Ser Glu Leu Val Gln Leu Gln Glu Val Ala
385                 390                 395                 400

Pro Pro Leu Glu Ala Asn Lys Asp Leu Val His Leu Leu Thr Leu Ser
            405                 410                 415

Leu Asp Leu Tyr Tyr Thr Glu Asp Glu Ile Tyr Glu Leu Ser Tyr Ala
        420                 425                 430

Arg Glu Pro Arg Asn His Arg Ala Pro Pro Leu Thr Pro Ser Lys Pro
        435                 440                 445

Pro Val Val Val Asp Trp Ala Ser Gly Val Ser Pro Lys Pro Asp Pro
    450                 455                 460

Lys Thr Ile Ser Lys His Val Gln Arg Met Val Asp Ser Val Phe Lys
465                 470                 475                 480

Asn Tyr Asp His Asp Gln Asp Gly Tyr Ile Ser Gln Glu Glu Phe Glu
                485                 490                 495

Lys Ile Ala Ala Ser Phe Pro Phe Ser Phe Cys Val Met Asp Lys Asp
                500                 505                 510

Arg Glu Gly Leu Ile Ser Arg Asp Glu Ile Thr Ala Tyr Phe Met Arg
            515                 520                 525

Ala Ser Ser Ile Tyr Ser Lys Leu Gly Leu Gly Phe Pro His Asn Phe
    530                 535                 540

Gln Glu Thr Thr Tyr Leu Lys Pro Thr Phe Cys Asp Asn Cys Ala Gly
545                 550                 555                 560

Phe Leu Trp Gly Val Ile Lys Gln Gly Tyr Arg Cys Lys Asp Cys Gly
                565                 570                 575

Met Asn Cys His Lys Gln Cys Lys Asp Leu Val Val Phe Glu Cys Lys
                580                 585                 590

Lys Arg Ala Lys Asn Pro Val Ala Pro Thr Glu Asn Asn Thr Ser Val
            595                 600                 605

Gly Pro Val Ser Asn Leu Cys Ser Leu Gly Ala Lys Asp Leu Leu His
    610                 615                 620

Ala Pro Glu Glu Gly Pro Phe Thr Phe Pro Asn Gly Glu Ala Val Glu
625                 630                 635                 640

His Gly Glu Glu Ser Lys Asp Arg Thr Ile Met Leu Met Gly Val Ser
                645                 650                 655

Ser Gln Lys Ile Ser Leu Arg Leu Lys Arg Ala Val Ala His Lys Ala
                660                 665                 670

Thr Gln Thr Glu Ser Gln Pro Trp Ile Gly Ser Glu Gly Pro Ser Gly
            675                 680                 685

Pro Phe Val Leu Ser Ser Pro Arg Lys Thr Ala Gln Asp Thr Leu Tyr
    690                 695                 700

Val Leu Pro Ser Pro Thr Ser Pro Cys Pro Ser Pro Val Leu Val Arg
705                 710                 715                 720

Lys Arg Ala Phe Val Lys Trp Glu Asn Lys Asp Ser Leu Ile Lys Ser
                725                 730                 735

Lys Glu Glu Leu Arg His Leu Arg Leu Pro Thr Tyr Gln Glu Leu Glu
            740                 745                 750

Gln Glu Ile Asn Thr Leu Lys Ala Asp Asn Asp Ala Leu Lys Ile Gln
    755                 760                 765

Leu Lys Tyr Ala Gln Lys Lys Ile Glu Ser Leu Gln Leu Glu Lys Ser
    770                 775                 780

Asn His Val Leu Ala Gln Met Glu Gln Gly Asp Cys Ser
785                 790                 795
```

<210> SEQ ID NO 4
<211> LENGTH: 690
<212> TYPE: PRT
<213> ORGANISM: Homo sapiens

<400> SEQUENCE: 4

```
Met Gly Ser Ser Gly Leu Gly Lys Ala Ala Thr Leu Asp Glu Leu Leu
1               5                   10                  15

Cys Thr Cys Ile Glu Met Phe Asp Asp Asn Gly Glu Leu Asp Asn Ser
            20                  25                  30

Tyr Leu Pro Arg Ile Val Leu Leu Met His Arg Trp Tyr Leu Ser Ser
        35                  40                  45

Thr Glu Leu Ala Glu Lys Leu Leu Cys Met Tyr Arg Asn Ala Thr Gly
    50                  55                  60

Glu Ser Cys Asn Glu Phe Arg Leu Lys Ile Cys Tyr Phe Met Arg Tyr
65                  70                  75                  80

Trp Ile Leu Lys Phe Pro Ala Glu Phe Asn Leu Asp Leu Gly Leu Ile
                85                  90                  95

Arg Met Thr Glu Glu Phe Arg Glu Val Ala Ser Gln Leu Gly Tyr Glu
            100                 105                 110

Lys His Val Ser Leu Ile Asp Ile Ser Ser Ile Pro Ser Tyr Asp Trp
        115                 120                 125

Met Arg Arg Val Thr Gln Arg Lys Lys Val Ser Lys Lys Gly Lys Ala
    130                 135                 140

Cys Leu Leu Phe Asp His Leu Glu Pro Ile Glu Leu Ala Glu His Leu
145                 150                 155                 160

Thr Phe Leu Glu His Lys Ser Phe Arg Arg Ile Ser Phe Thr Asp Tyr
                165                 170                 175

Gln Ser Tyr Val Ile His Gly Cys Leu Glu Asn Asn Pro Thr Leu Glu
            180                 185                 190

Arg Ser Ile Ala Leu Phe Asn Gly Ile Ser Lys Trp Val Gln Leu Met
        195                 200                 205

Val Leu Ser Lys Pro Thr Pro Gln Gln Arg Ala Glu Val Ile Thr Lys
    210                 215                 220

Phe Ile Asn Val Ala Lys Lys Leu Leu Gln Leu Lys Asn Phe Asn Thr
225                 230                 235                 240

Leu Met Ala Val Val Gly Gly Leu Ser His Ser Ser Ile Ser Arg Leu
                245                 250                 255

Lys Glu Thr His Ser His Leu Ser Ser Glu Val Thr Lys Asn Trp Asn
            260                 265                 270

Glu Met Thr Glu Leu Val Ser Ser Asn Gly Asn Tyr Cys Asn Tyr Arg
        275                 280                 285

Lys Ala Phe Ala Asp Cys Asp Gly Phe Lys Ile Pro Ile Leu Gly Val
    290                 295                 300

His Leu Lys Asp Leu Ile Ala Val His Val Ile Phe Pro Asp Trp Thr
305                 310                 315                 320

Glu Glu Asn Lys Val Asn Ile Val Lys Met His Gln Leu Ser Val Thr
                325                 330                 335

Leu Ser Glu Leu Val Ser Leu Gln Asn Ala Ser His His Leu Glu Pro
            340                 345                 350

Asn Met Asp Leu Ile Asn Leu Leu Thr Leu Ser Leu Asp Leu Tyr His
        355                 360                 365

Thr Glu Asp Asp Ile Tyr Lys Leu Ser Leu Val Leu Glu Pro Arg Asn
    370                 375                 380
```

Ser Lys Ser Gln Pro Thr Ser Pro Thr Thr Pro Asn Lys Pro Val Val
385                 390                 395                 400

Pro Leu Glu Trp Ala Leu Gly Val Met Pro Lys Pro Asp Pro Thr Val
            405                 410                 415

Ile Asn Lys His Ile Arg Lys Leu Val Glu Ser Val Phe Arg Asn Tyr
            420                 425                 430

Asp His Asp His Asp Gly Tyr Ile Ser Gln Glu Asp Phe Glu Ser Ile
            435                 440                 445

Ala Ala Asn Phe Pro Phe Leu Asp Ser Phe Cys Val Leu Asp Lys Asp
450                 455                 460

Gln Asp Gly Leu Ile Ser Lys Asp Glu Met Met Ala Tyr Phe Leu Arg
465                 470                 475                 480

Ala Lys Ser Gln Leu His Cys Lys Met Gly Pro Gly Phe Ile His Asn
            485                 490                 495

Phe Gln Glu Met Thr Tyr Leu Lys Pro Thr Phe Cys Glu His Cys Ala
            500                 505                 510

Gly Phe Leu Trp Gly Ile Ile Lys Gln Gly Tyr Lys Cys Lys Asp Cys
            515                 520                 525

Gly Ala Asn Cys His Lys Gln Cys Lys Asp Leu Leu Val Leu Ala Cys
530                 535                 540

Arg Arg Phe Ala Arg Ala Pro Ser Leu Ser Ser Gly His Gly Ser Leu
545                 550                 555                 560

Pro Gly Ser Pro Ser Leu Pro Pro Ala Gln Asp Glu Val Phe Glu Phe
            565                 570                 575

Pro Gly Val Thr Ala Gly His Arg Asp Leu Asp Ser Arg Ala Ile Thr
            580                 585                 590

Leu Val Thr Gly Ser Ser Arg Lys Ile Ser Val Arg Leu Gln Arg Ala
            595                 600                 605

Thr Thr Ser Gln Ala Thr Gln Thr Glu Pro Val Trp Ser Glu Ala Gly
            610                 615                 620

Trp Gly Asp Ser Gly Ser His Thr Phe Pro Lys Met Lys Ser Lys Phe
625                 630                 635                 640

His Asp Lys Ala Ala Lys Asp Lys Gly Phe Ala Lys Trp Glu Asn Glu
            645                 650                 655

Lys Pro Arg Val His Ala Gly Val Asp Val Asp Arg Gly Thr Glu
            660                 665                 670

Phe Glu Leu Asp Gln Asp Glu Gly Glu Glu Thr Arg Gln Asp Gly Glu
            675                 680                 685

Asp Gly
    690

<210> SEQ ID NO 5
<211> LENGTH: 673
<212> TYPE: PRT
<213> ORGANISM: Homo sapiens

<400> SEQUENCE: 5

Met Asn Arg Lys Asp Ser Lys Arg Lys Ser His Gln Glu Cys Thr Gly
1               5                   10                  15

Lys Ile Gly Gly Arg Gly Arg Pro Arg Gln Val Arg Arg His Lys Thr
            20                  25                  30

Cys Pro Ser Pro Arg Glu Ile Ser Lys Val Met Ala Ser Met Asn Leu
        35                  40                  45

```
Gly Leu Leu Ser Glu Gly Gly Cys Ser Glu Asp Glu Leu Leu Glu Lys
     50                  55                  60

Cys Ile Gln Ser Phe Asp Ser Ala Gly Ser Leu Cys His Glu Asp His
 65                  70                  75                  80

Met Leu Asn Met Val Leu Ala Met His Ser Trp Val Leu Pro Ser Ala
                 85                  90                  95

Asp Leu Ala Ala Arg Leu Leu Thr Ser Tyr Gln Lys Ala Thr Gly Asp
                100                 105                 110

Thr Gln Glu Leu Arg Arg Leu Gln Ile Cys His Leu Val Arg Tyr Trp
            115                 120                 125

Leu Met Arg His Pro Glu Val Met His Gln Asp Pro Gln Leu Glu Glu
    130                 135                 140

Val Ile Gly Arg Phe Trp Ala Thr Val Ala Arg Glu Gly Asn Ser Ala
145                 150                 155                 160

Gln Arg Arg Leu Gly Asp Ser Ser Asp Leu Leu Ser Pro Gly Gly Pro
                165                 170                 175

Gly Pro Pro Leu Pro Met Ser Ser Pro Gly Leu Gly Lys Lys Arg Lys
                180                 185                 190

Val Ser Leu Leu Phe Asp His Leu Glu Thr Gly Glu Leu Ala Gln His
            195                 200                 205

Leu Thr Tyr Leu Glu Phe Arg Ser Phe Gln Ala Ile Thr Pro Gln Asp
    210                 215                 220

Leu Arg Ser Tyr Val Leu Gln Gly Ser Val Arg Gly Cys Pro Ala Leu
225                 230                 235                 240

Glu Gly Ser Val Gly Leu Ser Asn Ser Val Ser Arg Trp Val Gln Val
                245                 250                 255

Met Val Leu Ser Arg Pro Gly Pro Leu Gln Arg Ala Gln Val Leu Asp
            260                 265                 270

Lys Phe Ile His Val Ala Gln Arg Leu His Gln Leu Gln Asn Phe Asn
    275                 280                 285

Thr Leu Met Ala Val Thr Gly Gly Leu Cys His Ser Ala Ile Ser Arg
290                 295                 300

Leu Lys Asp Ser His Ala His Leu Ser Pro Asp Ser Thr Lys Ala Leu
305                 310                 315                 320

Leu Glu Leu Thr Glu Leu Leu Ala Ser His Asn Asn Tyr Ala Arg Tyr
                325                 330                 335

Arg Arg Thr Trp Ala Gly Cys Ala Gly Phe Arg Leu Pro Val Leu Gly
            340                 345                 350

Val His Leu Lys Asp Leu Val Ser Leu His Glu Ala Gln Pro Asp Arg
    355                 360                 365

Leu Pro Asp Gly Arg Leu His Leu Pro Lys Leu Asn Asn Leu Tyr Leu
    370                 375                 380

Arg Leu Gln Glu Leu Val Ala Leu Gln Gly Gln His Pro Pro Cys Ser
385                 390                 395                 400

Ala Asn Glu Asp Leu Leu His Leu Leu Thr Leu Ser Leu Asp Leu Phe
                405                 410                 415

Tyr Thr Glu Asp Glu Ile Tyr Glu Leu Ser Tyr Ala Arg Glu Pro Arg
                420                 425                 430

Cys Pro Lys Ser Leu Pro Pro Ser Pro Phe Asn Ala Pro Leu Val Val
            435                 440                 445

Glu Trp Ala Pro Gly Val Thr Pro Lys Pro Asp Arg Val Thr Leu Gly
    450                 455                 460
```

-continued

```
Arg His Val Glu Gln Leu Val Glu Ser Val Phe Lys Asn Tyr Asp Pro
465                 470                 475                 480

Glu Gly Arg Gly Thr Ile Ser Gln Glu Asp Phe Glu Arg Leu Ser Gly
            485                 490                 495

Asn Phe Pro Phe Ala Cys His Gly Leu His Pro Pro Arg Gln Gly
            500                 505                 510

Arg Gly Ser Phe Ser Arg Glu Glu Leu Thr Gly Tyr Leu Leu Arg Ala
            515                 520                 525

Ser Ala Ile Cys Ser Lys Leu Gly Leu Ala Phe Leu His Thr Phe His
    530                 535                 540

Glu Val Thr Phe Arg Lys Pro Thr Phe Cys Asp Ser Cys Ser Gly Phe
545                 550                 555                 560

Leu Trp Gly Val Thr Lys Gln Gly Tyr Arg Cys Arg Glu Cys Gly Leu
                565                 570                 575

Cys Cys His Lys His Cys Arg Asp Gln Val Lys Val Glu Cys Lys Lys
                580                 585                 590

Arg Pro Gly Ala Lys Gly Asp Ala Gly Pro Gly Ala Pro Val Pro
            595                 600                 605

Ser Thr Pro Ala Pro His Ala Ser Cys Gly Ser Glu Glu Asn His Ser
    610                 615                 620

Tyr Thr Leu Ser Leu Glu Pro Glu Thr Gly Cys Gln Leu Arg His Ala
625                 630                 635                 640

Trp Thr Gln Thr Glu Ser Pro His Pro Ser Trp Glu Thr Asp Thr Val
                645                 650                 655

Pro Cys Pro Val Met Asp Pro Pro Ser Thr Ala Ser Ser Lys Leu Asp
            660                 665                 670

Ser

<210> SEQ ID NO 6
<211> LENGTH: 609
<212> TYPE: PRT
<213> ORGANISM: Homo sapiens

<400> SEQUENCE: 6

Met Ala Gly Thr Leu Asp Leu Asp Lys Gly Cys Thr Val Glu Glu Leu
1               5                   10                  15

Leu Arg Gly Cys Ile Glu Ala Phe Asp Asp Ser Gly Lys Val Arg Asp
            20                  25                  30

Pro Gln Leu Val Arg Met Phe Leu Met Met His Pro Trp Tyr Ile Pro
            35                  40                  45

Ser Ser Gln Leu Ala Ala Lys Leu Leu His Ile Tyr Gln Gln Ser Arg
    50                  55                  60

Lys Asp Asn Ser Asn Ser Leu Gln Val Lys Thr Cys His Leu Val Arg
65                  70                  75                  80

Tyr Trp Ile Ser Ala Phe Pro Ala Glu Phe Asp Leu Asn Pro Glu Leu
                85                  90                  95

Ala Glu Gln Ile Lys Glu Leu Lys Ala Leu Leu Asp Gln Glu Gly Asn
            100                 105                 110

Arg Arg His Ser Ser Leu Ile Asp Ile Asp Ser Val Pro Thr Tyr Lys
            115                 120                 125

Trp Lys Arg Gln Val Thr Gln Arg Asn Pro Val Gly Gln Lys Lys Arg
    130                 135                 140

Lys Met Ser Leu Leu Phe Asp His Leu Glu Pro Met Glu Leu Ala Glu
145                 150                 155                 160
```

```
His Leu Thr Tyr Leu Glu Tyr Arg Ser Phe Cys Lys Ile Leu Phe Gln
                165                 170                 175
Asp Tyr His Ser Phe Val Thr His Gly Cys Thr Val Asp Asn Pro Val
            180                 185                 190
Leu Glu Arg Phe Ile Ser Leu Phe Asn Ser Val Ser Gln Trp Val Gln
            195                 200                 205
Leu Met Ile Leu Ser Lys Pro Thr Ala Pro Gln Arg Ala Leu Val Ile
            210                 215                 220
Thr His Phe Val His Val Ala Glu Lys Leu Leu Gln Leu Gln Asn Phe
225                 230                 235                 240
Asn Thr Leu Met Ala Val Val Gly Gly Leu Ser His Ser Ser Ile Ser
                245                 250                 255
Arg Leu Lys Glu Thr His Ser His Val Ser Pro Glu Thr Ile Lys Leu
                260                 265                 270
Trp Glu Gly Leu Thr Glu Leu Val Thr Ala Thr Gly Asn Tyr Gly Asn
                275                 280                 285
Tyr Arg Arg Arg Leu Ala Ala Cys Val Gly Phe Arg Phe Pro Ile Leu
                290                 295                 300
Gly Val His Leu Lys Asp Leu Val Ala Leu Gln Leu Ala Leu Pro Asp
305                 310                 315                 320
Trp Leu Asp Pro Ala Arg Thr Arg Leu Asn Gly Ala Lys Met Lys Gln
                325                 330                 335
Leu Phe Ser Ile Leu Glu Glu Leu Ala Met Val Thr Ser Leu Arg Pro
                340                 345                 350
Pro Val Gln Ala Asn Pro Asp Leu Leu Ser Leu Leu Thr Val Ser Leu
                355                 360                 365
Asp Gln Tyr Gln Thr Glu Asp Glu Leu Tyr Gln Leu Ser Leu Gln Arg
                370                 375                 380
Glu Pro Arg Ser Lys Ser Ser Pro Thr Ser Pro Thr Ser Cys Thr Pro
385                 390                 395                 400
Pro Pro Arg Pro Pro Val Leu Glu Glu Trp Thr Ser Ala Ala Lys Pro
                405                 410                 415
Lys Leu Asp Gln Ala Leu Val Val Glu His Ile Glu Lys Met Val Glu
                420                 425                 430
Ser Val Phe Arg Asn Phe Asp Val Asp Gly Asp Gly His Ile Ser Gln
                435                 440                 445
Glu Glu Phe Gln Ile Ile Arg Gly Asn Phe Pro Tyr Leu Ser Ala Phe
                450                 455                 460
Gly Asp Leu Asp Gln Asn Gln Asp Gly Cys Ile Ser Arg Glu Glu Met
465                 470                 475                 480
Val Ser Tyr Phe Leu Arg Ser Ser Ser Val Leu Gly Gly Arg Met Gly
                485                 490                 495
Phe Val His Asn Phe Gln Glu Ser Asn Ser Leu Arg Pro Val Ala Cys
                500                 505                 510
Arg His Cys Lys Ala Leu Ile Leu Gly Ile Tyr Lys Gln Gly Leu Lys
                515                 520                 525
Cys Arg Ala Cys Gly Val Asn Cys His Lys Gln Cys Lys Asp Arg Leu
                530                 535                 540
Ser Val Glu Cys Arg Arg Ala Gln Ser Val Ser Leu Glu Gly Ser
545                 550                 555                 560
Ala Pro Ser Pro Ser Pro Met His Ser His His Arg Ala Phe Ser
                565                 570                 575
```

```
Phe Ser Leu Pro Arg Pro Gly Arg Arg Gly Ser Arg Pro Pro Glu Ile
            580                 585                 590

Arg Glu Glu Val Gln Thr Val Glu Asp Gly Val Phe Asp Ile His
        595                 600                 605

Leu

<210> SEQ ID NO 7
<211> LENGTH: 671
<212> TYPE: PRT
<213> ORGANISM: Homo sapiens

<400> SEQUENCE: 7

Met Gly Thr Gln Arg Leu Cys Gly Arg Gly Thr Gln Gly Trp Pro Gly
1               5                   10                  15

Ser Ser Glu Gln His Val Gln Glu Ala Thr Ser Ser Ala Gly Leu His
            20                  25                  30

Ser Gly Val Asp Glu Leu Gly Val Arg Ser Glu Pro Gly Gly Arg Leu
        35                  40                  45

Pro Glu Arg Ser Leu Gly Pro Ala His Pro Ala Pro Ala Ala Met Ala
    50                  55                  60

Gly Thr Leu Asp Leu Asp Lys Gly Cys Thr Val Glu Glu Leu Leu Arg
65                  70                  75                  80

Gly Cys Ile Glu Ala Phe Asp Asp Ser Gly Lys Val Arg Asp Pro Gln
                85                  90                  95

Leu Val Arg Met Phe Leu Met Met His Pro Trp Tyr Ile Pro Ser Ser
            100                 105                 110

Gln Leu Ala Ala Lys Leu Leu His Ile Tyr Gln Gln Ser Arg Lys Asp
        115                 120                 125

Asn Ser Asn Ser Leu Gln Val Lys Thr Cys His Leu Val Arg Tyr Trp
    130                 135                 140

Ile Ser Ala Phe Pro Ala Glu Phe Asp Leu Asn Pro Glu Leu Ala Glu
145                 150                 155                 160

Gln Ile Lys Glu Leu Lys Ala Leu Leu Asp Gln Glu Gly Asn Arg Arg
                165                 170                 175

His Ser Ser Leu Ile Asp Ile Asp Ser Val Pro Thr Tyr Lys Trp Lys
            180                 185                 190

Arg Gln Val Thr Gln Arg Asn Pro Val Gly Gln Lys Lys Arg Lys Met
        195                 200                 205

Ser Leu Leu Phe Asp His Leu Glu Pro Met Glu Leu Ala Glu His Leu
    210                 215                 220

Thr Tyr Leu Glu Tyr Arg Ser Phe Cys Lys Ile Leu Phe Gln Asp Tyr
225                 230                 235                 240

His Ser Phe Val Thr His Gly Cys Thr Val Asp Asn Pro Val Leu Glu
                245                 250                 255

Arg Phe Ile Ser Leu Phe Asn Ser Val Ser Gln Trp Val Gln Leu Met
            260                 265                 270

Ile Leu Ser Lys Pro Thr Ala Pro Gln Arg Ala Leu Val Ile Thr His
        275                 280                 285

Phe Val His Val Ala Glu Lys Leu Leu Gln Leu Gln Asn Phe Asn Thr
    290                 295                 300

Leu Met Ala Val Val Gly Gly Leu Ser His Ser Ser Ile Ser Arg Leu
305                 310                 315                 320

Lys Glu Thr His Ser His Val Ser Pro Glu Thr Ile Lys Leu Trp Glu
                325                 330                 335
```

Gly Leu Thr Glu Leu Val Thr Ala Thr Gly Asn Tyr Gly Asn Tyr Arg
                340                 345                 350

Arg Arg Leu Ala Ala Cys Val Gly Phe Arg Phe Pro Ile Leu Gly Val
                355                 360                 365

His Leu Lys Asp Leu Val Ala Leu Gln Leu Ala Leu Pro Asp Trp Leu
            370                 375                 380

Asp Pro Ala Arg Thr Arg Leu Asn Gly Ala Lys Met Lys Gln Leu Phe
385                 390                 395                 400

Ser Ile Leu Glu Glu Leu Ala Met Val Thr Ser Leu Arg Pro Pro Val
                405                 410                 415

Gln Ala Asn Pro Asp Leu Leu Ser Leu Leu Thr Val Ser Leu Asp Gln
                420                 425                 430

Tyr Gln Thr Glu Asp Glu Leu Tyr Gln Leu Ser Leu Gln Arg Glu Pro
            435                 440                 445

Arg Ser Lys Ser Ser Pro Thr Ser Pro Thr Ser Cys Thr Pro Pro Pro
            450                 455                 460

Arg Pro Pro Val Leu Glu Glu Trp Thr Ser Ala Ala Lys Pro Lys Leu
465                 470                 475                 480

Asp Gln Ala Leu Val Val Glu His Ile Glu Lys Met Val Glu Ser Val
                485                 490                 495

Phe Arg Asn Phe Asp Val Asp Gly Asp Gly His Ile Ser Gln Glu Glu
                500                 505                 510

Phe Gln Ile Ile Arg Gly Asn Phe Pro Tyr Leu Ser Ala Phe Gly Asp
            515                 520                 525

Leu Asp Gln Asn Gln Asp Gly Cys Ile Ser Arg Glu Glu Met Val Ser
530                 535                 540

Tyr Phe Leu Arg Ser Ser Ser Val Leu Gly Gly Arg Met Gly Phe Val
545                 550                 555                 560

His Asn Phe Gln Glu Ser Asn Ser Leu Arg Pro Val Ala Cys Arg His
                565                 570                 575

Cys Lys Ala Leu Ile Leu Gly Ile Tyr Lys Gln Gly Leu Lys Cys Arg
                580                 585                 590

Ala Cys Gly Val Asn Cys His Lys Gln Cys Lys Asp Arg Leu Ser Val
            595                 600                 605

Glu Cys Arg Arg Arg Ala Gln Ser Val Ser Leu Glu Gly Ser Ala Pro
            610                 615                 620

Ser Pro Ser Pro Met His Ser His His Arg Ala Phe Ser Phe Ser
625                 630                 635                 640

Leu Pro Arg Pro Gly Arg Arg Gly Ser Arg Pro Pro Glu Ile Arg Glu
                645                 650                 655

Glu Glu Val Gln Thr Val Glu Asp Gly Val Phe Asp Ile His Leu
                660                 665                 670

<210> SEQ ID NO 8
<211> LENGTH: 144
<212> TYPE: PRT
<213> ORGANISM: Homo sapiens

<400> SEQUENCE: 8

Met Ala Gly Thr Leu Asp Leu Asp Lys Gly Cys Thr Val Glu Glu Leu
1               5                   10                  15

Leu Arg Gly Cys Ile Glu Ala Phe Asp Asp Ser Gly Lys Val Arg Asp
                20                  25                  30

```
Pro Gln Leu Val Arg Met Phe Leu Met Met His Pro Trp Tyr Ile Pro
            35                  40                  45

Ser Ser Gln Leu Ala Ala Lys Leu Leu His Ile Tyr Gln Gln Ser Arg
    50                  55                  60

Lys Asp Asn Ser Asn Ser Leu Gln Val Lys Thr Cys His Leu Val Arg
65                  70                  75                  80

Tyr Trp Ile Ser Ala Phe Pro Ala Glu Phe Asp Leu Asn Pro Glu Leu
                85                  90                  95

Ala Glu Gln Ile Lys Glu Leu Lys Ala Leu Leu Asp Gln Glu Gly Asn
                100                 105                 110

Arg Arg His Ser Ser Leu Ile Asp Ile Asp Ser Val Cys Val Gly Ala
                115                 120                 125

Glu His Arg Gly Leu Gly Gly His Ser Val Ser Tyr Thr Ile Cys Ala
            130                 135                 140
```

<210> SEQ ID NO 9
<211> LENGTH: 610
<212> TYPE: PRT
<213> ORGANISM: Homo sapiens

<400> SEQUENCE: 9

```
Met Ala Gly Thr Leu Asp Leu Asp Lys Gly Cys Thr Val Glu Glu Leu
1               5                   10                  15

Leu Arg Gly Cys Ile Glu Ala Phe Asp Asp Ser Gly Lys Val Arg Asp
                20                  25                  30

Pro Gln Leu Val Arg Met Phe Leu Met Met His Pro Trp Tyr Ile Pro
            35                  40                  45

Ser Ser Gln Leu Ala Ala Lys Leu Leu His Ile Tyr Gln Gln Ser Arg
    50                  55                  60

Lys Asp Asn Ser Asn Ser Leu Gln Val Lys Thr Cys His Leu Val Arg
65                  70                  75                  80

Tyr Trp Ile Ser Ala Phe Pro Ala Glu Phe Asp Leu Asn Pro Glu Leu
                85                  90                  95

Ala Glu Gln Ile Lys Glu Leu Lys Ala Leu Leu Asp Gln Glu Gly Asn
                100                 105                 110

Arg Arg His Ser Ser Leu Ile Asp Ile Asp Ser Val Pro Thr Tyr Lys
            115                 120                 125

Trp Lys Arg Gln Val Thr Gln Arg Asn Pro Val Gly Gln Lys Lys Arg
            130                 135                 140

Lys Met Ser Leu Leu Phe Asp His Leu Glu Pro Met Glu Leu Ala Glu
145                 150                 155                 160

His Leu Thr Tyr Leu Glu Tyr Arg Ser Phe Cys Lys Ile Leu Phe Gln
                165                 170                 175

Asp Tyr His Ser Phe Val Thr His Gly Cys Thr Val Asp Asn Pro Val
                180                 185                 190

Leu Glu Arg Phe Ile Ser Leu Phe Asn Ser Val Ser Gln Trp Val Gln
            195                 200                 205

Leu Met Ile Leu Ser Lys Pro Thr Ala Pro Gln Arg Ala Leu Val Ile
            210                 215                 220

Thr His Phe Val His Val Ala Glu Lys Leu Leu Gln Leu Gln Asn Phe
225                 230                 235                 240

Asn Thr Leu Met Ala Val Val Gly Gly Leu Ser His Ser Ser Ile Ser
                245                 250                 255
```

```
Arg Leu Lys Glu Thr His Ser His Val Ser Pro Glu Thr Ile Lys Leu
            260                 265                 270

Trp Glu Gly Leu Thr Glu Leu Val Thr Ala Thr Gly Asn Tyr Gly Asn
            275                 280                 285

Tyr Arg Arg Arg Leu Ala Ala Cys Val Gly Phe Arg Phe Pro Ile Leu
        290                 295                 300

Gly Val His Leu Lys Asp Leu Val Ala Leu Gln Leu Ala Leu Pro Asp
305                 310                 315                 320

Trp Leu Asp Pro Ala Arg Thr Arg Leu Asn Gly Ala Lys Met Lys Gln
                325                 330                 335

Leu Phe Ser Ile Leu Glu Glu Leu Ala Met Val Thr Ser Leu Arg Pro
            340                 345                 350

Pro Val Gln Ala Asn Pro Asp Leu Leu Ser Leu Leu Thr Val Ser Leu
            355                 360                 365

Asp Gln Tyr Gln Thr Glu Asp Glu Leu Tyr Gln Leu Ser Leu Gln Arg
            370                 375                 380

Glu Pro Arg Ser Lys Ser Ser Pro Thr Ser Pro Thr Ser Cys Thr Pro
385                 390                 395                 400

Pro Pro Arg Pro Pro Val Leu Glu Glu Trp Thr Ser Ala Ala Lys Pro
                405                 410                 415

Lys Leu Asp Gln Ala Leu Val Val Glu His Ile Glu Lys Met Val Glu
            420                 425                 430

Ser Val Phe Arg Asn Phe Asp Val Asp Gly Asp Gly His Ile Ser Gln
            435                 440                 445

Glu Glu Phe Gln Ile Ile Arg Gly Asn Phe Pro Tyr Leu Ser Ala Phe
            450                 455                 460

Gly Asp Leu Asp Gln Asn Gln Asp Gly Cys Ile Ser Arg Glu Glu Met
465                 470                 475                 480

Val Ser Tyr Phe Leu Arg Ser Ser Val Leu Gly Gly Arg Met Gly
            485                 490                 495

Phe Val His Asn Phe Gln Glu Ser Asn Ser Leu Arg Pro Val Ala Cys
            500                 505                 510

Arg His Cys Lys Ala Leu Ile Leu Gly Ile Tyr Lys Gln Gly Leu Lys
        515                 520                 525

Cys Arg Ala Cys Gly Val Asn Cys His Lys Gln Cys Lys Asp Arg Leu
            530                 535                 540

Ser Val Glu Cys Arg Arg Arg Ala Gln Ser Val Ser Leu Glu Gly Ser
545                 550                 555                 560

Ala Pro Ser Pro Ser Pro Met His Ser His His His Arg Ala Phe Ser
                565                 570                 575

Phe Ser Leu Pro Arg Pro Gly Arg Gly Ser Arg Pro Pro Ala Glu
            580                 585                 590

Ile Arg Glu Glu Glu Val Gln Thr Val Glu Asp Gly Val Phe Asp Ile
        595                 600                 605

His Leu
    610

<210> SEQ ID NO 10
<211> LENGTH: 15
<212> TYPE: PRT
<213> ORGANISM: Homo sapiens
```

```
<400> SEQUENCE: 10

Met Gly Glu Pro Gln Gly Ser Met Arg Ile Leu Val Thr Gly Gly
1               5                   10                  15

<210> SEQ ID NO 11
<211> LENGTH: 15
<212> TYPE: PRT
<213> ORGANISM: Homo sapiens

<400> SEQUENCE: 11

Val Val Ala Asp Gly Ala Gly Leu Pro Gly Glu Asp Trp Val Phe
1               5                   10                  15

<210> SEQ ID NO 12
<211> LENGTH: 15
<212> TYPE: PRT
<213> ORGANISM: Homo sapiens

<400> SEQUENCE: 12

Thr Ala Gln Thr Arg Ala Leu Phe Glu Lys Val Gln Pro Thr His
1               5                   10                  15

<210> SEQ ID NO 13
<211> LENGTH: 15
<212> TYPE: PRT
<213> ORGANISM: Homo sapiens

<400> SEQUENCE: 13

Leu Phe Arg Asn Ile Lys Tyr Asn Leu Asp Phe Trp Arg Lys Asn
1               5                   10                  15

<210> SEQ ID NO 14
<211> LENGTH: 15
<212> TYPE: PRT
<213> ORGANISM: Homo sapiens

<400> SEQUENCE: 14

Val His Met Asn Asp Asn Val Leu His Ser Ala Phe Glu Val Gly
1               5                   10                  15

<210> SEQ ID NO 15
<211> LENGTH: 10
<212> TYPE: PRT
<213> ORGANISM: Homo sapiens

<400> SEQUENCE: 15

Asp Asn Val Leu His Ser Ala Phe Glu Val
1               5                   10

<210> SEQ ID NO 16
<211> LENGTH: 10
<212> TYPE: PRT
<213> ORGANISM: Homo sapiens

<400> SEQUENCE: 16

Asn Val Leu His Ser Ala Phe Glu Val Gly
1               5                   10

<210> SEQ ID NO 17
<211> LENGTH: 15
<212> TYPE: PRT
<213> ORGANISM: Homo sapiens
```

<400> SEQUENCE: 17

Asn Val Leu His Ser Ala Phe Glu Val Gly Ala Arg Lys Val Val
1               5                   10                  15

<210> SEQ ID NO 18
<211> LENGTH: 10
<212> TYPE: PRT
<213> ORGANISM: Homo sapiens

<400> SEQUENCE: 18

Val Leu His Ser Ala Phe Glu Val Gly Ala
1               5                   10

<210> SEQ ID NO 19
<211> LENGTH: 15
<212> TYPE: PRT
<213> ORGANISM: Homo sapiens

<400> SEQUENCE: 19

Lys Thr Thr Tyr Pro Ile Asp Glu Thr Met Ile His Asn Gly Pro
1               5                   10                  15

<210> SEQ ID NO 20
<211> LENGTH: 15
<212> TYPE: PRT
<213> ORGANISM: Homo sapiens

<400> SEQUENCE: 20

Ile His Asn Gly Pro Pro His Asn Ser Asn Phe Gly Tyr Ser Tyr
1               5                   10                  15

<210> SEQ ID NO 21
<211> LENGTH: 15
<212> TYPE: PRT
<213> ORGANISM: Homo sapiens

<400> SEQUENCE: 21

Pro His Asn Ser Asn Phe Gly Tyr Ser Tyr Ala Lys Arg Met Ile
1               5                   10                  15

<210> SEQ ID NO 22
<211> LENGTH: 15
<212> TYPE: PRT
<213> ORGANISM: Homo sapiens

<400> SEQUENCE: 22

Ala Tyr Phe Gln Gln Tyr Gly Cys Thr Phe Thr Ala Val Ile Pro
1               5                   10                  15

<210> SEQ ID NO 23
<211> LENGTH: 15
<212> TYPE: PRT
<213> ORGANISM: Homo sapiens

<400> SEQUENCE: 23

Tyr Gly Cys Thr Phe Thr Ala Val Ile Pro Thr Asn Val Phe Gly
1               5                   10                  15

<210> SEQ ID NO 24
<211> LENGTH: 15
<212> TYPE: PRT
<213> ORGANISM: Homo sapiens

<400> SEQUENCE: 24

Leu Phe Ile Trp Val Leu Arg Glu Tyr Asn Glu Val Glu Pro Ile
1               5                   10                  15

<210> SEQ ID NO 25
<211> LENGTH: 15
<212> TYPE: PRT
<213> ORGANISM: Homo sapiens

<400> SEQUENCE: 25

Leu Arg Glu Tyr Asn Glu Val Glu Pro Ile Ile Leu Ser Val Gly
1               5                   10                  15

<210> SEQ ID NO 26
<211> LENGTH: 15
<212> TYPE: PRT
<213> ORGANISM: Homo sapiens

<400> SEQUENCE: 26

Glu Val Glu Pro Ile Ile Leu Ser Val Gly Glu Asp Glu Val
1               5                   10                  15

<210> SEQ ID NO 27
<211> LENGTH: 15
<212> TYPE: PRT
<213> ORGANISM: Homo sapiens

<400> SEQUENCE: 27

Ile Leu Ser Val Gly Glu Glu Asp Glu Val Ser Ile Lys Glu Ala
1               5                   10                  15

<210> SEQ ID NO 28
<211> LENGTH: 15
<212> TYPE: PRT
<213> ORGANISM: Homo sapiens

<400> SEQUENCE: 28

Glu Glu Asp Glu Val Ser Ile Lys Glu Ala Ala Glu Ala Val Val
1               5                   10                  15

<210> SEQ ID NO 29
<211> LENGTH: 15
<212> TYPE: PRT
<213> ORGANISM: Homo sapiens

<400> SEQUENCE: 29

Ser Ile Lys Glu Ala Ala Glu Ala Val Val Glu Ala Met Asp Phe
1               5                   10                  15

<210> SEQ ID NO 30
<211> LENGTH: 15
<212> TYPE: PRT
<213> ORGANISM: Homo sapiens

<400> SEQUENCE: 30

Ala Glu Ala Val Val Glu Ala Met Asp Phe His Gly Glu Val Thr
1               5                   10                  15

<210> SEQ ID NO 31
<211> LENGTH: 15
<212> TYPE: PRT
<213> ORGANISM: Homo sapiens

```
<400> SEQUENCE: 31

Phe Asp Thr Thr Lys Ser Asp Gly Gln Phe Lys Thr Ala Ser
1               5                   10                  15

<210> SEQ ID NO 32
<211> LENGTH: 15
<212> TYPE: PRT
<213> ORGANISM: Homo sapiens

<400> SEQUENCE: 32

Phe Arg Phe Thr Pro Phe Lys Gln Ala Val Lys Glu Thr Cys Ala
1               5                   10                  15

<210> SEQ ID NO 33
<211> LENGTH: 10
<212> TYPE: PRT
<213> ORGANISM: Homo sapiens

<400> SEQUENCE: 33

Leu Val Arg Tyr Trp Ile Ser Ala Phe Pro
1               5                   10

<210> SEQ ID NO 34
<211> LENGTH: 10
<212> TYPE: PRT
<213> ORGANISM: Homo sapiens

<400> SEQUENCE: 34

Phe Val Arg Tyr Trp Ile Thr Glu Phe Trp
1               5                   10

<210> SEQ ID NO 35
<211> LENGTH: 10
<212> TYPE: PRT
<213> ORGANISM: Homo sapiens

<400> SEQUENCE: 35

Phe Met Arg Tyr Trp Ile Leu Lys Phe Pro
1               5                   10

<210> SEQ ID NO 36
<211> LENGTH: 23
<212> TYPE: PRT
<213> ORGANISM: Homo sapiens

<400> SEQUENCE: 36

Leu Leu Phe Asp His Leu Glu Pro Met Glu Leu Ala Glu His Leu Thr
1               5                   10                  15

Tyr Leu Glu Tyr Arg Ser Phe
            20

<210> SEQ ID NO 37
<211> LENGTH: 28
<212> TYPE: PRT
<213> ORGANISM: Homo sapiens

<400> SEQUENCE: 37

Asn Phe Asn Thr Leu Met Ala Val Val Gly Gly Leu Ser His Ser Ser
1               5                   10                  15

Ile Ser Arg Leu Lys Glu Thr His Ser His Val Ser
            20                  25
```

```
<210> SEQ ID NO 38
<211> LENGTH: 15
<212> TYPE: PRT
<213> ORGANISM: Homo sapiens

<400> SEQUENCE: 38

Pro Ala Ala Met Ala Gly Thr Leu Asp Leu Asp Lys Gly Cys Thr
1               5                   10                  15

<210> SEQ ID NO 39
<211> LENGTH: 15
<212> TYPE: PRT
<213> ORGANISM: Homo sapiens

<400> SEQUENCE: 39

Asp Lys Gly Cys Thr Val Glu Glu Leu Leu Arg Gly Cys Ile Glu
1               5                   10                  15

<210> SEQ ID NO 40
<211> LENGTH: 15
<212> TYPE: PRT
<213> ORGANISM: Homo sapiens

<400> SEQUENCE: 40

Arg Gly Cys Ile Glu Ala Phe Asp Asp Ser Gly Lys Val Arg Asp
1               5                   10                  15

<210> SEQ ID NO 41
<211> LENGTH: 15
<212> TYPE: PRT
<213> ORGANISM: Homo sapiens

<400> SEQUENCE: 41

Gly Lys Val Arg Asp Pro Gln Leu Val Arg Met Phe Leu Met Met
1               5                   10                  15

<210> SEQ ID NO 42
<211> LENGTH: 15
<212> TYPE: PRT
<213> ORGANISM: Homo sapiens

<400> SEQUENCE: 42

Met Phe Leu Met Met His Pro Trp Tyr Ile Pro Ser Ser Gln Leu
1               5                   10                  15

<210> SEQ ID NO 43
<211> LENGTH: 15
<212> TYPE: PRT
<213> ORGANISM: Homo sapiens

<400> SEQUENCE: 43

Pro Ser Ser Gln Leu Ala Ala Lys Leu Leu His Ile Tyr Gln Gln
1               5                   10                  15

<210> SEQ ID NO 44
<211> LENGTH: 15
<212> TYPE: PRT
<213> ORGANISM: Homo sapiens

<400> SEQUENCE: 44

His Ile Tyr Gln Gln Ser Arg Lys Asp Asn Ser Asn Ser Leu Gln
1               5                   10                  15

<210> SEQ ID NO 45
<211> LENGTH: 15
```

```
<212> TYPE: PRT
<213> ORGANISM: Homo sapiens

<400> SEQUENCE: 45

Ser Asn Ser Leu Gln Val Lys Thr Cys His Leu Val Arg Tyr Trp
1               5                   10                  15

<210> SEQ ID NO 46
<211> LENGTH: 15
<212> TYPE: PRT
<213> ORGANISM: Homo sapiens

<400> SEQUENCE: 46

Leu Val Arg Tyr Trp Ile Ser Ala Phe Pro Ala Glu Phe Asp Leu
1               5                   10                  15

<210> SEQ ID NO 47
<211> LENGTH: 15
<212> TYPE: PRT
<213> ORGANISM: Homo sapiens

<400> SEQUENCE: 47

Ala Glu Phe Asp Leu Asn Pro Glu Leu Ala Glu Gln Ile Lys Glu
1               5                   10                  15

<210> SEQ ID NO 48
<211> LENGTH: 15
<212> TYPE: PRT
<213> ORGANISM: Homo sapiens

<400> SEQUENCE: 48

Glu Gln Ile Lys Glu Leu Lys Ala Leu Leu Asp Gln Glu Gly Asn
1               5                   10                  15

<210> SEQ ID NO 49
<211> LENGTH: 15
<212> TYPE: PRT
<213> ORGANISM: Homo sapiens

<400> SEQUENCE: 49

Asp Gln Glu Gly Asn Arg Arg His Ser Ser Leu Ile Asp Ile Asp
1               5                   10                  15

<210> SEQ ID NO 50
<211> LENGTH: 15
<212> TYPE: PRT
<213> ORGANISM: Homo sapiens

<400> SEQUENCE: 50

Leu Ile Asp Ile Asp Ser Val Pro Thr Tyr Lys Trp Lys Arg Gln
1               5                   10                  15

<210> SEQ ID NO 51
<211> LENGTH: 15
<212> TYPE: PRT
<213> ORGANISM: Homo sapiens

<400> SEQUENCE: 51

Lys Trp Lys Arg Gln Val Thr Gln Arg Asn Pro Val Gly Gln Lys
1               5                   10                  15

<210> SEQ ID NO 52
<211> LENGTH: 15
<212> TYPE: PRT
<213> ORGANISM: Homo sapiens
```

<400> SEQUENCE: 52

Pro Val Gly Gln Lys Lys Arg Lys Met Ser Leu Leu Phe Asp His
1               5                   10                  15

<210> SEQ ID NO 53
<211> LENGTH: 15
<212> TYPE: PRT
<213> ORGANISM: Homo sapiens

<400> SEQUENCE: 53

Leu Leu Phe Asp His Leu Glu Pro Met Glu Leu Ala Glu His Leu
1               5                   10                  15

<210> SEQ ID NO 54
<211> LENGTH: 15
<212> TYPE: PRT
<213> ORGANISM: Homo sapiens

<400> SEQUENCE: 54

Leu Ala Glu His Leu Thr Tyr Leu Glu Tyr Arg Ser Phe Cys Lys
1               5                   10                  15

<210> SEQ ID NO 55
<211> LENGTH: 15
<212> TYPE: PRT
<213> ORGANISM: Homo sapiens

<400> SEQUENCE: 55

Arg Ser Phe Cys Lys Ile Leu Phe Gln Asp Tyr His Ser Phe Val
1               5                   10                  15

<210> SEQ ID NO 56
<211> LENGTH: 15
<212> TYPE: PRT
<213> ORGANISM: Homo sapiens

<400> SEQUENCE: 56

Tyr His Ser Phe Val Thr His Gly Cys Thr Val Asp Asn Pro Val
1               5                   10                  15

<210> SEQ ID NO 57
<211> LENGTH: 15
<212> TYPE: PRT
<213> ORGANISM: Homo sapiens

<400> SEQUENCE: 57

Val Asp Asn Pro Val Leu Glu Arg Phe Ile Ser Leu Phe Asn Ser
1               5                   10                  15

<210> SEQ ID NO 58
<211> LENGTH: 15
<212> TYPE: PRT
<213> ORGANISM: Homo sapiens

<400> SEQUENCE: 58

Ser Leu Phe Asn Ser Val Ser Gln Trp Val Gln Leu Met Ile Leu
1               5                   10                  15

<210> SEQ ID NO 59
<211> LENGTH: 15
<212> TYPE: PRT
<213> ORGANISM: Homo sapiens

<400> SEQUENCE: 59

Gln Leu Met Ile Leu Ser Lys Pro Thr Ala Pro Gln Arg Ala Leu
1               5                   10                  15

<210> SEQ ID NO 60
<211> LENGTH: 15
<212> TYPE: PRT
<213> ORGANISM: Homo sapiens

<400> SEQUENCE: 60

Pro Gln Arg Ala Leu Val Ile Thr His Phe Val His Val Ala Glu
1               5                   10                  15

<210> SEQ ID NO 61
<211> LENGTH: 15
<212> TYPE: PRT
<213> ORGANISM: Homo sapiens

<400> SEQUENCE: 61

Val His Val Ala Glu Lys Leu Leu Gln Leu Gln Asn Phe Asn Thr
1               5                   10                  15

<210> SEQ ID NO 62
<211> LENGTH: 15
<212> TYPE: PRT
<213> ORGANISM: Homo sapiens

<400> SEQUENCE: 62

Gln Asn Phe Asn Thr Leu Met Ala Val Val Gly Gly Leu Ser His
1               5                   10                  15

<210> SEQ ID NO 63
<211> LENGTH: 15
<212> TYPE: PRT
<213> ORGANISM: Homo sapiens

<400> SEQUENCE: 63

Gly Gly Leu Ser His Ser Ser Ile Ser Arg Leu Lys Glu Thr His
1               5                   10                  15

<210> SEQ ID NO 64
<211> LENGTH: 15
<212> TYPE: PRT
<213> ORGANISM: Homo sapiens

<400> SEQUENCE: 64

Leu Lys Glu Thr His Ser His Val Ser Pro Glu Thr Ile Lys Leu
1               5                   10                  15

<210> SEQ ID NO 65
<211> LENGTH: 15
<212> TYPE: PRT
<213> ORGANISM: Homo sapiens

<400> SEQUENCE: 65

Glu Thr Ile Lys Leu Trp Glu Gly Leu Thr Glu Leu Val Thr Ala
1               5                   10                  15

<210> SEQ ID NO 66
<211> LENGTH: 15
<212> TYPE: PRT
<213> ORGANISM: Homo sapiens

```
<400> SEQUENCE: 66

Glu Leu Val Thr Ala Thr Gly Asn Tyr Gly Asn Tyr Arg Arg Arg
1               5                   10                  15

<210> SEQ ID NO 67
<211> LENGTH: 15
<212> TYPE: PRT
<213> ORGANISM: Homo sapiens

<400> SEQUENCE: 67

Asn Tyr Arg Arg Arg Leu Ala Ala Cys Val Gly Phe Arg Phe Pro
1               5                   10                  15

<210> SEQ ID NO 68
<211> LENGTH: 15
<212> TYPE: PRT
<213> ORGANISM: Homo sapiens

<400> SEQUENCE: 68

Gly Phe Arg Phe Pro Ile Leu Gly Val His Leu Lys Asp Leu Val
1               5                   10                  15

<210> SEQ ID NO 69
<211> LENGTH: 15
<212> TYPE: PRT
<213> ORGANISM: Homo sapiens

<400> SEQUENCE: 69

Leu Lys Asp Leu Val Ala Leu Gln Leu Ala Leu Pro Asp Trp Leu
1               5                   10                  15

<210> SEQ ID NO 70
<211> LENGTH: 15
<212> TYPE: PRT
<213> ORGANISM: Homo sapiens

<400> SEQUENCE: 70

Leu Pro Asp Trp Leu Asp Pro Ala Arg Thr Arg Leu Asn Gly Ala
1               5                   10                  15

<210> SEQ ID NO 71
<211> LENGTH: 15
<212> TYPE: PRT
<213> ORGANISM: Homo sapiens

<400> SEQUENCE: 71

Arg Leu Asn Gly Ala Lys Met Lys Gln Leu Phe Ser Ile Leu Glu
1               5                   10                  15

<210> SEQ ID NO 72
<211> LENGTH: 15
<212> TYPE: PRT
<213> ORGANISM: Homo sapiens

<400> SEQUENCE: 72

Phe Ser Ile Leu Glu Glu Leu Ala Met Val Thr Ser Leu Arg Pro
1               5                   10                  15

<210> SEQ ID NO 73
<211> LENGTH: 15
<212> TYPE: PRT
<213> ORGANISM: Homo sapiens
```

```
<400> SEQUENCE: 73

Thr Ser Leu Arg Pro Pro Val Gln Ala Asn Pro Asp Leu Leu Ser
1               5                   10                  15

<210> SEQ ID NO 74
<211> LENGTH: 15
<212> TYPE: PRT
<213> ORGANISM: Homo sapiens

<400> SEQUENCE: 74

Pro Asp Leu Leu Ser Leu Leu Thr Val Ser Leu Asp Gln Tyr Gln
1               5                   10                  15

<210> SEQ ID NO 75
<211> LENGTH: 15
<212> TYPE: PRT
<213> ORGANISM: Homo sapiens

<400> SEQUENCE: 75

Leu Asp Gln Tyr Gln Thr Glu Asp Glu Leu Tyr Gln Leu Ser Leu
1               5                   10                  15

<210> SEQ ID NO 76
<211> LENGTH: 15
<212> TYPE: PRT
<213> ORGANISM: Homo sapiens

<400> SEQUENCE: 76

Tyr Gln Leu Ser Leu Gln Arg Glu Pro Arg Ser Lys Ser Ser Pro
1               5                   10                  15

<210> SEQ ID NO 77
<211> LENGTH: 15
<212> TYPE: PRT
<213> ORGANISM: Homo sapiens

<400> SEQUENCE: 77

Ser Lys Ser Ser Pro Thr Ser Pro Thr Ser Cys Thr Pro Pro Pro
1               5                   10                  15

<210> SEQ ID NO 78
<211> LENGTH: 15
<212> TYPE: PRT
<213> ORGANISM: Homo sapiens

<400> SEQUENCE: 78

Cys Thr Pro Pro Pro Arg Pro Pro Val Leu Glu Glu Trp Thr Ser
1               5                   10                  15

<210> SEQ ID NO 79
<211> LENGTH: 15
<212> TYPE: PRT
<213> ORGANISM: Homo sapiens

<400> SEQUENCE: 79

Glu Glu Trp Thr Ser Ala Ala Lys Pro Lys Leu Asp Gln Ala Leu
1               5                   10                  15

<210> SEQ ID NO 80
<211> LENGTH: 15
<212> TYPE: PRT
<213> ORGANISM: Homo sapiens
```

-continued

<400> SEQUENCE: 80

Leu Asp Gln Ala Leu Val Val Glu His Ile Glu Lys Met Val Glu
1               5                   10                  15

<210> SEQ ID NO 81
<211> LENGTH: 15
<212> TYPE: PRT
<213> ORGANISM: Homo sapiens

<400> SEQUENCE: 81

Glu Lys Met Val Glu Ser Val Phe Arg Asn Phe Asp Val Asp Gly
1               5                   10                  15

<210> SEQ ID NO 82
<211> LENGTH: 15
<212> TYPE: PRT
<213> ORGANISM: Homo sapiens

<400> SEQUENCE: 82

Phe Asp Val Asp Gly Asp Gly His Ile Ser Gln Glu Glu Phe Gln
1               5                   10                  15

<210> SEQ ID NO 83
<211> LENGTH: 15
<212> TYPE: PRT
<213> ORGANISM: Homo sapiens

<400> SEQUENCE: 83

Gln Glu Glu Phe Gln Ile Ile Arg Gly Asn Phe Pro Tyr Leu Ser
1               5                   10                  15

<210> SEQ ID NO 84
<211> LENGTH: 15
<212> TYPE: PRT
<213> ORGANISM: Homo sapiens

<400> SEQUENCE: 84

Phe Pro Tyr Leu Ser Ala Phe Gly Asp Leu Asp Gln Asn Gln Asp
1               5                   10                  15

<210> SEQ ID NO 85
<211> LENGTH: 15
<212> TYPE: PRT
<213> ORGANISM: Homo sapiens

<400> SEQUENCE: 85

Asp Gln Asn Gln Asp Gly Cys Ile Ser Arg Glu Glu Met Val Ser
1               5                   10                  15

<210> SEQ ID NO 86
<211> LENGTH: 15
<212> TYPE: PRT
<213> ORGANISM: Homo sapiens

<400> SEQUENCE: 86

Glu Glu Met Val Ser Tyr Phe Leu Arg Ser Ser Ser Val Leu Gly
1               5                   10                  15

<210> SEQ ID NO 87
<211> LENGTH: 15
<212> TYPE: PRT
<213> ORGANISM: Homo sapiens

```
<400> SEQUENCE: 87

Ser Ser Val Leu Gly Gly Arg Met Gly Phe Val His Asn Phe Gln
1               5                   10                  15

<210> SEQ ID NO 88
<211> LENGTH: 15
<212> TYPE: PRT
<213> ORGANISM: Homo sapiens

<400> SEQUENCE: 88

Val His Asn Phe Gln Glu Ser Asn Ser Leu Arg Pro Val Ala Cys
1               5                   10                  15

<210> SEQ ID NO 89
<211> LENGTH: 15
<212> TYPE: PRT
<213> ORGANISM: Homo sapiens

<400> SEQUENCE: 89

Arg Pro Val Ala Cys Arg His Cys Lys Ala Leu Ile Leu Gly Ile
1               5                   10                  15

<210> SEQ ID NO 90
<211> LENGTH: 15
<212> TYPE: PRT
<213> ORGANISM: Homo sapiens

<400> SEQUENCE: 90

Leu Ile Leu Gly Ile Tyr Lys Gln Gly Leu Lys Cys Arg Ala Cys
1               5                   10                  15

<210> SEQ ID NO 91
<211> LENGTH: 15
<212> TYPE: PRT
<213> ORGANISM: Homo sapiens

<400> SEQUENCE: 91

Lys Cys Arg Ala Cys Gly Val Asn Cys His Lys Gln Cys Lys Asp
1               5                   10                  15

<210> SEQ ID NO 92
<211> LENGTH: 15
<212> TYPE: PRT
<213> ORGANISM: Homo sapiens

<400> SEQUENCE: 92

Lys Gln Cys Lys Asp Arg Leu Ser Val Glu Cys Arg Arg Arg Ala
1               5                   10                  15

<210> SEQ ID NO 93
<211> LENGTH: 15
<212> TYPE: PRT
<213> ORGANISM: Homo sapiens

<400> SEQUENCE: 93

Cys Arg Arg Arg Ala Gln Ser Val Ser Leu Glu Gly Ser Ala Pro
1               5                   10                  15

<210> SEQ ID NO 94
<211> LENGTH: 15
<212> TYPE: PRT
<213> ORGANISM: Homo sapiens
```

<400> SEQUENCE: 94

Glu Gly Ser Ala Pro Ser Pro Ser Pro Met His Ser His His His
1               5                   10                  15

<210> SEQ ID NO 95
<211> LENGTH: 15
<212> TYPE: PRT
<213> ORGANISM: Homo sapiens

<400> SEQUENCE: 95

His Ser His His His Arg Ala Phe Ser Phe Ser Leu Pro Arg Pro
1               5                   10                  15

<210> SEQ ID NO 96
<211> LENGTH: 15
<212> TYPE: PRT
<213> ORGANISM: Homo sapiens

<400> SEQUENCE: 96

Ser Leu Pro Arg Pro Gly Arg Arg Gly Ser Arg Pro Pro Glu Ile
1               5                   10                  15

<210> SEQ ID NO 97
<211> LENGTH: 15
<212> TYPE: PRT
<213> ORGANISM: Homo sapiens

<400> SEQUENCE: 97

Arg Pro Pro Glu Ile Arg Glu Glu Val Gln Thr Val Glu Asp
1               5                   10                  15

<210> SEQ ID NO 98
<211> LENGTH: 15
<212> TYPE: PRT
<213> ORGANISM: Homo sapiens

<400> SEQUENCE: 98

Glu Glu Val Gln Thr Val Glu Asp Gly Val Phe Asp Ile His Leu
1               5                   10                  15

<210> SEQ ID NO 99
<211> LENGTH: 7
<212> TYPE: PRT
<213> ORGANISM: Homo sapiens
<220> FEATURE:
<221> NAME/KEY: misc_feature
<222> LOCATION: (4)..(4)
<223> OTHER INFORMATION: Xaa can be any naturally occurring amino acid

<400> SEQUENCE: 99

Leu His Ser Xaa Phe Glu Val
1               5

<210> SEQ ID NO 100
<211> LENGTH: 8
<212> TYPE: PRT
<213> ORGANISM: Homo sapiens

<400> SEQUENCE: 100

Val Leu His Ser Ala Phe Glu Val
1               5

<210> SEQ ID NO 101
<211> LENGTH: 10

```
<212> TYPE: PRT
<213> ORGANISM: Homo sapiens

<400> SEQUENCE: 101

Arg Lys Leu His Ser Phe Tyr Glu Val Lys
1               5                   10

<210> SEQ ID NO 102
<211> LENGTH: 10
<212> TYPE: PRT
<213> ORGANISM: Homo sapiens

<400> SEQUENCE: 102

Leu Lys Leu His Ser Arg Phe Tyr Glu Leu
1               5                   10

<210> SEQ ID NO 103
<211> LENGTH: 10
<212> TYPE: PRT
<213> ORGANISM: Homo sapiens

<400> SEQUENCE: 103

Gln Lys Lys His Ser Gly Phe Glu Asp Glu
1               5                   10

<210> SEQ ID NO 104
<211> LENGTH: 10
<212> TYPE: PRT
<213> ORGANISM: Homo sapiens

<400> SEQUENCE: 104

Leu Ala Leu His Ser Val Phe Glu Gly Leu
1               5                   10

<210> SEQ ID NO 105
<211> LENGTH: 10
<212> TYPE: PRT
<213> ORGANISM: Homo sapiens

<400> SEQUENCE: 105

Arg Arg Leu His Ser Pro Pro Glu Val Glu
1               5                   10

<210> SEQ ID NO 106
<211> LENGTH: 10
<212> TYPE: PRT
<213> ORGANISM: Homo sapiens

<400> SEQUENCE: 106

Leu Ser Leu His Arg Met Phe Glu Val Val
1               5                   10

<210> SEQ ID NO 107
<211> LENGTH: 10
<212> TYPE: PRT
<213> ORGANISM: Homo sapiens

<400> SEQUENCE: 107

Gln Lys Leu His Leu His Phe Glu Arg Leu
1               5                   10

<210> SEQ ID NO 108
<211> LENGTH: 10
<212> TYPE: PRT
<213> ORGANISM: Homo sapiens
```

<400> SEQUENCE: 108

Gln Arg Leu His Leu His Phe Glu Lys Val
1               5                   10

<210> SEQ ID NO 109
<211> LENGTH: 10
<212> TYPE: PRT
<213> ORGANISM: Homo sapiens

<400> SEQUENCE: 109

Leu Leu Leu His Ser Ile Phe Glu Leu Asn
1               5                   10

<210> SEQ ID NO 110
<211> LENGTH: 10
<212> TYPE: PRT
<213> ORGANISM: Homo sapiens

<400> SEQUENCE: 110

Asn Gly Leu His Ser His Ser Glu Val Leu
1               5                   10

<210> SEQ ID NO 111
<211> LENGTH: 10
<212> TYPE: PRT
<213> ORGANISM: Homo sapiens

<400> SEQUENCE: 111

Arg Arg Leu His Leu His Phe Glu Arg Val
1               5                   10

<210> SEQ ID NO 112
<211> LENGTH: 10
<212> TYPE: PRT
<213> ORGANISM: Homo sapiens

<400> SEQUENCE: 112

Leu Arg Leu His Ser Pro Pro Glu Val Thr
1               5                   10

<210> SEQ ID NO 113
<211> LENGTH: 10
<212> TYPE: PRT
<213> ORGANISM: Homo sapiens

<400> SEQUENCE: 113

Ser His Leu His Ser Leu Phe Arg Val Leu
1               5                   10

<210> SEQ ID NO 114
<211> LENGTH: 10
<212> TYPE: PRT
<213> ORGANISM: Homo sapiens

<400> SEQUENCE: 114

Val Glu Leu His Ser His Ser Glu Val Pro
1               5                   10

<210> SEQ ID NO 115
<211> LENGTH: 10
<212> TYPE: PRT
<213> ORGANISM: Homo sapiens

<400> SEQUENCE: 115

Gly His Leu His Ser Gln Leu Glu Val Ser
1               5                   10

<210> SEQ ID NO 116
<211> LENGTH: 10
<212> TYPE: PRT
<213> ORGANISM: Homo sapiens

<400> SEQUENCE: 116

Glu Lys Lys Val Ser Ser Phe Glu Val Phe
1               5                   10

<210> SEQ ID NO 117
<211> LENGTH: 10
<212> TYPE: PRT
<213> ORGANISM: Homo sapiens

<400> SEQUENCE: 117

Asp Gly Leu His Ser Ser Asn Glu Val Leu
1               5                   10

<210> SEQ ID NO 118
<211> LENGTH: 10
<212> TYPE: PRT
<213> ORGANISM: Homo sapiens

<400> SEQUENCE: 118

Leu Ser Leu His Ser Leu Phe Glu Leu Arg
1               5                   10

<210> SEQ ID NO 119
<211> LENGTH: 10
<212> TYPE: PRT
<213> ORGANISM: Homo sapiens

<400> SEQUENCE: 119

Phe Thr Pro His Ser Arg Phe Glu Val Leu
1               5                   10

<210> SEQ ID NO 120
<211> LENGTH: 10
<212> TYPE: PRT
<213> ORGANISM: Homo sapiens

<400> SEQUENCE: 120

Ile Lys Leu Pro Ser Ser Phe Glu Lys Trp
1               5                   10

<210> SEQ ID NO 121
<211> LENGTH: 10
<212> TYPE: PRT
<213> ORGANISM: Homo sapiens

<400> SEQUENCE: 121

Val Met Leu Leu Ser Leu Phe Glu Glu Glu
1               5                   10

<210> SEQ ID NO 122
<211> LENGTH: 10
<212> TYPE: PRT
<213> ORGANISM: Homo sapiens

<400> SEQUENCE: 122

Phe Ala Leu His Ser Leu Phe Glu Ala Lys
1               5                   10

<210> SEQ ID NO 123
<211> LENGTH: 10
<212> TYPE: PRT
<213> ORGANISM: Homo sapiens

<400> SEQUENCE: 123

Arg Lys Leu Lys Ala Ser Phe Glu Val Ser
1               5                   10

<210> SEQ ID NO 124
<211> LENGTH: 10
<212> TYPE: PRT
<213> ORGANISM: Homo sapiens

<400> SEQUENCE: 124

Lys Ala Leu His Ser Asp Phe Ile Val Lys
1               5                   10

<210> SEQ ID NO 125
<211> LENGTH: 10
<212> TYPE: PRT
<213> ORGANISM: Homo sapiens

<400> SEQUENCE: 125

Lys Lys Leu Arg Ser Ser Phe Glu Ser Ser
1               5                   10

<210> SEQ ID NO 126
<211> LENGTH: 10
<212> TYPE: PRT
<213> ORGANISM: Homo sapiens

<400> SEQUENCE: 126

Leu Gln Leu His Ser Pro Phe Glu Arg Gly
1               5                   10

<210> SEQ ID NO 127
<211> LENGTH: 10
<212> TYPE: PRT
<213> ORGANISM: Homo sapiens

<400> SEQUENCE: 127

Arg Lys Cys His Ser Ser Gly Glu Val Gln
1               5                   10

<210> SEQ ID NO 128
<211> LENGTH: 10
<212> TYPE: PRT
<213> ORGANISM: Homo sapiens

<400> SEQUENCE: 128

Arg Lys Leu Leu Ser Asp Phe Pro Val Val
1               5                   10

<210> SEQ ID NO 129
<211> LENGTH: 10
<212> TYPE: PRT
<213> ORGANISM: Homo sapiens

```
<400> SEQUENCE: 129

Lys Lys Arg His Ser Tyr Phe Glu Lys Pro
1               5                   10

<210> SEQ ID NO 130
<211> LENGTH: 10
<212> TYPE: PRT
<213> ORGANISM: Homo sapiens

<400> SEQUENCE: 130

Val His Leu His Ser Phe Phe Ala Val Gly
1               5                   10

<210> SEQ ID NO 131
<211> LENGTH: 10
<212> TYPE: PRT
<213> ORGANISM: Homo sapiens

<400> SEQUENCE: 131

Glu Ala Leu Leu Ser Gly Phe Glu Val Ile
1               5                   10

<210> SEQ ID NO 132
<211> LENGTH: 10
<212> TYPE: PRT
<213> ORGANISM: Homo sapiens

<400> SEQUENCE: 132

Glu Lys Leu Phe Ser Gln Phe Glu Val Asp
1               5                   10

<210> SEQ ID NO 133
<211> LENGTH: 10
<212> TYPE: PRT
<213> ORGANISM: Homo sapiens

<400> SEQUENCE: 133

Gly Asp Leu Lys Ser Gly Phe Glu Glu Val
1               5                   10

<210> SEQ ID NO 134
<211> LENGTH: 10
<212> TYPE: PRT
<213> ORGANISM: Homo sapiens

<400> SEQUENCE: 134

Lys Gly Leu His Ser Lys Lys Glu Val Pro
1               5                   10

<210> SEQ ID NO 135
<211> LENGTH: 10
<212> TYPE: PRT
<213> ORGANISM: Homo sapiens

<400> SEQUENCE: 135

Glu Phe Leu Ala Ser Ser Phe Glu Val Ser
1               5                   10

<210> SEQ ID NO 136
<211> LENGTH: 10
<212> TYPE: PRT
<213> ORGANISM: Homo sapiens
```

```
<400> SEQUENCE: 136

Gly Val Leu His Ser Lys Phe Trp Val Val
1               5                   10

<210> SEQ ID NO 137
<211> LENGTH: 10
<212> TYPE: PRT
<213> ORGANISM: Homo sapiens

<400> SEQUENCE: 137

Lys Gln Leu Val His His Phe Glu Val Asp
1               5                   10

<210> SEQ ID NO 138
<211> LENGTH: 10
<212> TYPE: PRT
<213> ORGANISM: Homo sapiens

<400> SEQUENCE: 138

Arg His Leu His Ser Val Leu Glu Glu Leu
1               5                   10

<210> SEQ ID NO 139
<211> LENGTH: 10
<212> TYPE: PRT
<213> ORGANISM: Homo sapiens

<400> SEQUENCE: 139

Arg Leu Leu Ser Ser Gly Phe Glu Glu Val
1               5                   10

<210> SEQ ID NO 140
<211> LENGTH: 10
<212> TYPE: PRT
<213> ORGANISM: Homo sapiens

<400> SEQUENCE: 140

Gln Met Leu His Pro Ile Phe Glu Glu Ala
1               5                   10

<210> SEQ ID NO 141
<211> LENGTH: 10
<212> TYPE: PRT
<213> ORGANISM: Homo sapiens

<400> SEQUENCE: 141

Arg Arg Leu His Ser Thr His Glu Glu Leu
1               5                   10

<210> SEQ ID NO 142
<211> LENGTH: 10
<212> TYPE: PRT
<213> ORGANISM: Homo sapiens

<400> SEQUENCE: 142

Arg Lys Leu His Trp Leu Phe Glu Leu Leu
1               5                   10

<210> SEQ ID NO 143
<211> LENGTH: 10
<212> TYPE: PRT
<213> ORGANISM: Homo sapiens
```

```
<400> SEQUENCE: 143

Val Glu Leu His Ser Asp Met Glu Val Thr
1               5                   10

<210> SEQ ID NO 144
<211> LENGTH: 10
<212> TYPE: PRT
<213> ORGANISM: Homo sapiens

<400> SEQUENCE: 144

Arg Lys Leu Leu His Arg Phe Glu Thr Glu
1               5                   10

<210> SEQ ID NO 145
<211> LENGTH: 10
<212> TYPE: PRT
<213> ORGANISM: Homo sapiens

<400> SEQUENCE: 145

Asn Lys Leu Ile Ser Glu Phe Glu Glu Glu
1               5                   10

<210> SEQ ID NO 146
<211> LENGTH: 10
<212> TYPE: PRT
<213> ORGANISM: Homo sapiens

<400> SEQUENCE: 146

Ser Lys Leu Val Ser Asn Lys Glu Val Val
1               5                   10

<210> SEQ ID NO 147
<211> LENGTH: 10
<212> TYPE: PRT
<213> ORGANISM: Homo sapiens

<400> SEQUENCE: 147

Leu Leu Leu His Ser Leu Phe Pro Val Pro
1               5                   10

<210> SEQ ID NO 148
<211> LENGTH: 10
<212> TYPE: PRT
<213> ORGANISM: Homo sapiens

<400> SEQUENCE: 148

Arg Lys Leu Asp Ser Val Phe Glu Glu Arg
1               5                   10

<210> SEQ ID NO 149
<211> LENGTH: 10
<212> TYPE: PRT
<213> ORGANISM: Homo sapiens

<400> SEQUENCE: 149

Arg Phe Lys His Ser Ser Thr Glu Val Leu
1               5                   10

<210> SEQ ID NO 150
<211> LENGTH: 10
<212> TYPE: PRT
<213> ORGANISM: Homo sapiens
```

<400> SEQUENCE: 150

Arg Arg Lys Leu His Ser Phe Tyr Glu Val
1               5                   10

<210> SEQ ID NO 151
<211> LENGTH: 10
<212> TYPE: PRT
<213> ORGANISM: Homo sapiens

<400> SEQUENCE: 151

Arg Lys Leu Leu Ser Ser Gly Phe Glu Ile
1               5                   10

<210> SEQ ID NO 152
<211> LENGTH: 10
<212> TYPE: PRT
<213> ORGANISM: Homo sapiens

<400> SEQUENCE: 152

Arg Arg Leu Leu Ser Ser Gly Phe Glu Glu
1               5                   10

<210> SEQ ID NO 153
<211> LENGTH: 10
<212> TYPE: PRT
<213> ORGANISM: Homo sapiens

<400> SEQUENCE: 153

Arg Lys Lys Leu His Lys Phe Glu Glu Thr
1               5                   10

<210> SEQ ID NO 154
<211> LENGTH: 10
<212> TYPE: PRT
<213> ORGANISM: Homo sapiens

<400> SEQUENCE: 154

Leu Lys Lys Leu His Asp Phe Glu Glu Gln
1               5                   10

<210> SEQ ID NO 155
<211> LENGTH: 10
<212> TYPE: PRT
<213> ORGANISM: Homo sapiens

<400> SEQUENCE: 155

Gly Leu Leu Leu His Ser Ile Phe Glu Leu
1               5                   10

<210> SEQ ID NO 156
<211> LENGTH: 10
<212> TYPE: PRT
<213> ORGANISM: Homo sapiens

<400> SEQUENCE: 156

Gln Lys Lys Leu His Asp Phe Glu Glu Gln
1               5                   10

<210> SEQ ID NO 157
<211> LENGTH: 10
<212> TYPE: PRT
<213> ORGANISM: Homo sapiens

<400> SEQUENCE: 157

Gln Lys Lys Leu Ser Ser Gly Glu Glu Lys
1               5                   10

<210> SEQ ID NO 158
<211> LENGTH: 10
<212> TYPE: PRT
<213> ORGANISM: Homo sapiens

<400> SEQUENCE: 158

Arg Lys His Leu His Ser Gly Gln Glu Ala
1               5                   10

<210> SEQ ID NO 159
<211> LENGTH: 10
<212> TYPE: PRT
<213> ORGANISM: Homo sapiens

<400> SEQUENCE: 159

Gln Lys Leu Val His Ser Leu Phe Glu Ser
1               5                   10

<210> SEQ ID NO 160
<211> LENGTH: 10
<212> TYPE: PRT
<213> ORGANISM: Homo sapiens

<400> SEQUENCE: 160

Cys Tyr Leu Leu His Ser Phe Glu Glu Phe
1               5                   10

<210> SEQ ID NO 161
<211> LENGTH: 10
<212> TYPE: PRT
<213> ORGANISM: Homo sapiens

<400> SEQUENCE: 161

Ser Lys Thr Leu His Ser Val Glu Glu Lys
1               5                   10

<210> SEQ ID NO 162
<211> LENGTH: 10
<212> TYPE: PRT
<213> ORGANISM: Homo sapiens

<400> SEQUENCE: 162

Leu Lys Arg Leu His Glu Phe Glu Glu Gln
1               5                   10

<210> SEQ ID NO 163
<211> LENGTH: 10
<212> TYPE: PRT
<213> ORGANISM: Homo sapiens

<400> SEQUENCE: 163

Val Lys Glu Leu His Ser Ala Glu Glu Gly
1               5                   10

<210> SEQ ID NO 164
<211> LENGTH: 10
<212> TYPE: PRT
<213> ORGANISM: Homo sapiens

```
<400> SEQUENCE: 164

Ser Leu Leu Leu His Ser Gln Glu Glu Lys
1               5                   10

<210> SEQ ID NO 165
<211> LENGTH: 10
<212> TYPE: PRT
<213> ORGANISM: Homo sapiens

<400> SEQUENCE: 165

Ala Val His Leu His Ser Gly Glu Glu Leu
1               5                   10

<210> SEQ ID NO 166
<211> LENGTH: 10
<212> TYPE: PRT
<213> ORGANISM: Homo sapiens

<400> SEQUENCE: 166

His Thr Arg Leu His Ser Gly Glu Glu Pro
1               5                   10

<210> SEQ ID NO 167
<211> LENGTH: 10
<212> TYPE: PRT
<213> ORGANISM: Homo sapiens

<400> SEQUENCE: 167

Met Pro Leu Leu His Ala Ile Phe Glu Val
1               5                   10

<210> SEQ ID NO 168
<211> LENGTH: 10
<212> TYPE: PRT
<213> ORGANISM: Homo sapiens

<400> SEQUENCE: 168

Glu Lys Lys Arg His Ser Tyr Phe Glu Lys
1               5                   10

<210> SEQ ID NO 169
<211> LENGTH: 10
<212> TYPE: PRT
<213> ORGANISM: Homo sapiens

<400> SEQUENCE: 169

Gln Ala Lys Leu His Ser Gln Glu Glu Asp
1               5                   10

<210> SEQ ID NO 170
<211> LENGTH: 10
<212> TYPE: PRT
<213> ORGANISM: Homo sapiens

<400> SEQUENCE: 170

Gln Gln Lys Lys His Ser Gly Phe Glu Asp
1               5                   10

<210> SEQ ID NO 171
<211> LENGTH: 10
<212> TYPE: PRT
<213> ORGANISM: Homo sapiens
```

```
<400> SEQUENCE: 171

Leu Lys Lys Leu His Gln Gln Phe Glu Met
1               5                   10

<210> SEQ ID NO 172
<211> LENGTH: 10
<212> TYPE: PRT
<213> ORGANISM: Homo sapiens

<400> SEQUENCE: 172

Lys Leu Leu Leu His Ser Gly Val Glu Asn
1               5                   10

<210> SEQ ID NO 173
<211> LENGTH: 10
<212> TYPE: PRT
<213> ORGANISM: Homo sapiens

<400> SEQUENCE: 173

Phe Ser Lys Leu His Thr Phe Glu Glu Val
1               5                   10

<210> SEQ ID NO 174
<211> LENGTH: 10
<212> TYPE: PRT
<213> ORGANISM: Homo sapiens

<400> SEQUENCE: 174

Gln Ala Lys Leu Ser Ser Phe Glu Glu Thr
1               5                   10

<210> SEQ ID NO 175
<211> LENGTH: 10
<212> TYPE: PRT
<213> ORGANISM: Homo sapiens

<400> SEQUENCE: 175

Ser Leu Ala Leu His Ser Val Phe Glu Gly
1               5                   10

<210> SEQ ID NO 176
<211> LENGTH: 10
<212> TYPE: PRT
<213> ORGANISM: Homo sapiens

<400> SEQUENCE: 176

Glu Phe Ala Leu His Ser Leu Phe Glu Ala
1               5                   10

<210> SEQ ID NO 177
<211> LENGTH: 10
<212> TYPE: PRT
<213> ORGANISM: Homo sapiens

<400> SEQUENCE: 177

Met Arg His Leu Lys Ser Phe Phe Glu Ala
1               5                   10

<210> SEQ ID NO 178
<211> LENGTH: 10
<212> TYPE: PRT
<213> ORGANISM: Homo sapiens
```

<400> SEQUENCE: 178

Gln Lys Lys Arg His Ser Phe Leu Glu Ser
1               5                   10

<210> SEQ ID NO 179
<211> LENGTH: 10
<212> TYPE: PRT
<213> ORGANISM: Homo sapiens

<400> SEQUENCE: 179

Gln Lys Lys Leu His His Phe Phe Ile Gly
1               5                   10

<210> SEQ ID NO 180
<211> LENGTH: 10
<212> TYPE: PRT
<213> ORGANISM: Homo sapiens

<400> SEQUENCE: 180

Thr Leu Ser Leu His Ser Leu Phe Glu Leu
1               5                   10

<210> SEQ ID NO 181
<211> LENGTH: 10
<212> TYPE: PRT
<213> ORGANISM: Homo sapiens

<400> SEQUENCE: 181

Leu Arg Leu Phe His Ser Phe Glu Glu Leu
1               5                   10

<210> SEQ ID NO 182
<211> LENGTH: 10
<212> TYPE: PRT
<213> ORGANISM: Homo sapiens

<400> SEQUENCE: 182

Gln Lys Phe Leu His Ser Ser Phe Val Ala
1               5                   10

<210> SEQ ID NO 183
<211> LENGTH: 10
<212> TYPE: PRT
<213> ORGANISM: Homo sapiens

<400> SEQUENCE: 183

Ala Trp Leu Leu His Ser Gly Pro Glu Gly
1               5                   10

<210> SEQ ID NO 184
<211> LENGTH: 10
<212> TYPE: PRT
<213> ORGANISM: Homo sapiens

<400> SEQUENCE: 184

Thr Lys Leu Leu His Arg Thr Glu Glu Leu
1               5                   10

<210> SEQ ID NO 185
<211> LENGTH: 10
<212> TYPE: PRT
<213> ORGANISM: Homo sapiens

```
<400> SEQUENCE: 185

Phe Lys Thr Leu Ser Ser Lys Phe Glu Leu
1               5                   10

<210> SEQ ID NO 186
<211> LENGTH: 10
<212> TYPE: PRT
<213> ORGANISM: Homo sapiens

<400> SEQUENCE: 186

Lys Arg Arg Leu His Leu Val Phe Glu Tyr
1               5                   10

<210> SEQ ID NO 187
<211> LENGTH: 10
<212> TYPE: PRT
<213> ORGANISM: Homo sapiens

<400> SEQUENCE: 187

Glu His Leu Leu Asn Ser Gly Phe Glu Val
1               5                   10

<210> SEQ ID NO 188
<211> LENGTH: 10
<212> TYPE: PRT
<213> ORGANISM: Homo sapiens

<400> SEQUENCE: 188

Val Met Lys Leu Leu Ser Ile Phe Glu Ser
1               5                   10

<210> SEQ ID NO 189
<211> LENGTH: 10
<212> TYPE: PRT
<213> ORGANISM: Homo sapiens

<400> SEQUENCE: 189

Lys Leu Glu Leu His Ser Ser Glu Glu Ala
1               5                   10

<210> SEQ ID NO 190
<211> LENGTH: 10
<212> TYPE: PRT
<213> ORGANISM: Homo sapiens

<400> SEQUENCE: 190

Lys Leu Pro Leu His Ser Ser Glu Glu Ala
1               5                   10

<210> SEQ ID NO 191
<211> LENGTH: 10
<212> TYPE: PRT
<213> ORGANISM: Homo sapiens

<400> SEQUENCE: 191

Leu Lys Arg Leu Leu Ser Asn Glu Glu Glu
1               5                   10

<210> SEQ ID NO 192
<211> LENGTH: 10
<212> TYPE: PRT
<213> ORGANISM: Homo sapiens
```

<400> SEQUENCE: 192

Thr Thr Arg Leu His Ser Leu Glu Glu Lys
1               5                   10

<210> SEQ ID NO 193
<211> LENGTH: 10
<212> TYPE: PRT
<213> ORGANISM: Homo sapiens

<400> SEQUENCE: 193

His Ala Arg Leu His Ser Leu Glu Glu Thr
1               5                   10

<210> SEQ ID NO 194
<211> LENGTH: 10
<212> TYPE: PRT
<213> ORGANISM: Homo sapiens

<400> SEQUENCE: 194

Leu Pro Arg Leu His Gly His Phe Glu Gln
1               5                   10

<210> SEQ ID NO 195
<211> LENGTH: 10
<212> TYPE: PRT
<213> ORGANISM: Homo sapiens

<400> SEQUENCE: 195

Val Lys Thr Leu His His Lys Glu Glu Val
1               5                   10

<210> SEQ ID NO 196
<211> LENGTH: 10
<212> TYPE: PRT
<213> ORGANISM: Homo sapiens

<400> SEQUENCE: 196

Ser Pro Ser Leu His Ser Arg Glu Glu Ala
1               5                   10

<210> SEQ ID NO 197
<211> LENGTH: 10
<212> TYPE: PRT
<213> ORGANISM: Homo sapiens

<400> SEQUENCE: 197

Pro Arg Lys Leu His Trp Leu Phe Glu Leu
1               5                   10

<210> SEQ ID NO 198
<211> LENGTH: 10
<212> TYPE: PRT
<213> ORGANISM: Homo sapiens

<400> SEQUENCE: 198

Leu Lys Lys Leu Leu Ser Phe Ala Glu Asn
1               5                   10

<210> SEQ ID NO 199
<211> LENGTH: 12
<212> TYPE: PRT
<213> ORGANISM: Homo sapiens

```
<400> SEQUENCE: 199

Ile Leu Val Thr Gly Gly Ser Gly Leu Val Gly Lys
1               5                   10

<210> SEQ ID NO 200
<211> LENGTH: 19
<212> TYPE: PRT
<213> ORGANISM: Homo sapiens

<400> SEQUENCE: 200

Val Val Ala Asp Gly Ala Gly Leu Pro Gly Glu Asp Trp Val Phe Val
1               5                   10                  15

Ser Ser Lys

<210> SEQ ID NO 201
<211> LENGTH: 11
<212> TYPE: PRT
<213> ORGANISM: Homo sapiens

<400> SEQUENCE: 201

Asp Ala Asp Leu Thr Asp Thr Ala Gln Thr Arg
1               5                   10

<210> SEQ ID NO 202
<211> LENGTH: 18
<212> TYPE: PRT
<213> ORGANISM: Homo sapiens

<400> SEQUENCE: 202

Val Gln Pro Thr His Val Ile His Leu Ala Ala Met Val Gly Gly Leu
1               5                   10                  15

Phe Arg

<210> SEQ ID NO 203
<211> LENGTH: 7
<212> TYPE: PRT
<213> ORGANISM: Homo sapiens

<400> SEQUENCE: 203

Tyr Asn Leu Asp Phe Trp Arg
1               5

<210> SEQ ID NO 204
<211> LENGTH: 8
<212> TYPE: PRT
<213> ORGANISM: Homo sapiens

<400> SEQUENCE: 204

Tyr Asn Leu Asp Phe Trp Arg Lys
1               5

<210> SEQ ID NO 205
<211> LENGTH: 18
<212> TYPE: PRT
<213> ORGANISM: Homo sapiens

<400> SEQUENCE: 205

Asn Val His Met Asn Asp Asn Val Leu His Ser Ala Phe Glu Val Gly
1               5                   10                  15

Ala Arg
```

```
<210> SEQ ID NO 206
<211> LENGTH: 19
<212> TYPE: PRT
<213> ORGANISM: Homo sapiens

<400> SEQUENCE: 206

Asn Val His Met Asn Asp Asn Val Leu His Ser Ala Phe Glu Val Gly
1               5                   10                  15

Ala Arg Lys

<210> SEQ ID NO 207
<211> LENGTH: 13
<212> TYPE: PRT
<213> ORGANISM: Homo sapiens

<400> SEQUENCE: 207

Val Val Ser Cys Leu Ser Thr Cys Ile Phe Pro Asp Lys
1               5                   10

<210> SEQ ID NO 208
<211> LENGTH: 7
<212> TYPE: PRT
<213> ORGANISM: Homo sapiens

<400> SEQUENCE: 208

Met Ile Asp Val Gln Asn Arg
1               5

<210> SEQ ID NO 209
<211> LENGTH: 8
<212> TYPE: PRT
<213> ORGANISM: Homo sapiens

<400> SEQUENCE: 209

Arg Met Ile Asp Val Gln Asn Arg
1               5

<210> SEQ ID NO 210
<211> LENGTH: 15
<212> TYPE: PRT
<213> ORGANISM: Homo sapiens

<400> SEQUENCE: 210

Ser Ser Gly Ser Ala Leu Thr Val Trp Gly Thr Gly Asn Pro Arg
1               5                   10                  15

<210> SEQ ID NO 211
<211> LENGTH: 16
<212> TYPE: PRT
<213> ORGANISM: Homo sapiens

<400> SEQUENCE: 211

Ser Ser Gly Ser Ala Leu Thr Val Trp Gly Thr Gly Asn Pro Arg Arg
1               5                   10                  15

<210> SEQ ID NO 212
<211> LENGTH: 26
<212> TYPE: PRT
<213> ORGANISM: Homo sapiens

<400> SEQUENCE: 212

Thr Thr Tyr Pro Ile Asp Glu Thr Met Ile His Asn Gly Pro Pro His
1               5                   10                  15
```

Asn Ser Asn Phe Gly Tyr Ser Tyr Ala Lys
            20                  25

<210> SEQ ID NO 213
<211> LENGTH: 21
<212> TYPE: PRT
<213> ORGANISM: Homo sapiens

<400> SEQUENCE: 213

Glu Tyr Asn Glu Val Glu Pro Ile Ile Leu Ser Val Gly Glu Glu Asp
1               5                   10                  15

Glu Val Ser Ile Lys
            20

<210> SEQ ID NO 214
<211> LENGTH: 7
<212> TYPE: PRT
<213> ORGANISM: Homo sapiens

<400> SEQUENCE: 214

Thr Tyr Leu Pro Asp Phe Arg
1               5

<210> SEQ ID NO 215
<211> LENGTH: 9
<212> TYPE: PRT
<213> ORGANISM: Homo sapiens

<400> SEQUENCE: 215

Leu Arg Thr Tyr Leu Pro Asp Phe Arg
1               5

<210> SEQ ID NO 216
<211> LENGTH: 15
<212> TYPE: PRT
<213> ORGANISM: Homo sapiens

<400> SEQUENCE: 216

Gly Ser Met Arg Ile Leu Val Thr Gly Gly Ser Gly Leu Val Gly
1               5                   10                  15

<210> SEQ ID NO 217
<211> LENGTH: 15
<212> TYPE: PRT
<213> ORGANISM: Homo sapiens

<400> SEQUENCE: 217

Leu Val Thr Gly Gly Ser Gly Leu Val Gly Lys Ala Ile Gln Lys
1               5                   10                  15

<210> SEQ ID NO 218
<211> LENGTH: 15
<212> TYPE: PRT
<213> ORGANISM: Homo sapiens

<400> SEQUENCE: 218

Ser Gly Leu Val Gly Lys Ala Ile Gln Lys Val Val Ala Asp Gly
1               5                   10                  15

<210> SEQ ID NO 219
<211> LENGTH: 15
<212> TYPE: PRT
<213> ORGANISM: Homo sapiens

```
<400> SEQUENCE: 219

Lys Ala Ile Gln Lys Val Val Ala Asp Gly Ala Gly Leu Pro Gly
1               5                   10                  15

<210> SEQ ID NO 220
<211> LENGTH: 15
<212> TYPE: PRT
<213> ORGANISM: Homo sapiens

<400> SEQUENCE: 220

Ala Gly Leu Pro Gly Glu Asp Trp Val Phe Val Ser Ser Lys Asp
1               5                   10                  15

<210> SEQ ID NO 221
<211> LENGTH: 15
<212> TYPE: PRT
<213> ORGANISM: Homo sapiens

<400> SEQUENCE: 221

Glu Asp Trp Val Phe Val Ser Ser Lys Asp Ala Asp Leu Thr Asp
1               5                   10                  15

<210> SEQ ID NO 222
<211> LENGTH: 15
<212> TYPE: PRT
<213> ORGANISM: Homo sapiens

<400> SEQUENCE: 222

Val Ser Ser Lys Asp Ala Asp Leu Thr Asp Thr Ala Gln Thr Arg
1               5                   10                  15

<210> SEQ ID NO 223
<211> LENGTH: 15
<212> TYPE: PRT
<213> ORGANISM: Homo sapiens

<400> SEQUENCE: 223

Ala Asp Leu Thr Asp Thr Ala Gln Thr Arg Ala Leu Phe Glu Lys
1               5                   10                  15

<210> SEQ ID NO 224
<211> LENGTH: 15
<212> TYPE: PRT
<213> ORGANISM: Homo sapiens

<400> SEQUENCE: 224

Ala Leu Phe Glu Lys Val Gln Pro Thr His Val Ile His Leu Ala
1               5                   10                  15

<210> SEQ ID NO 225
<211> LENGTH: 15
<212> TYPE: PRT
<213> ORGANISM: Homo sapiens

<400> SEQUENCE: 225

Val Gln Pro Thr His Val Ile His Leu Ala Ala Met Val Gly Gly
1               5                   10                  15

<210> SEQ ID NO 226
<211> LENGTH: 15
<212> TYPE: PRT
<213> ORGANISM: Homo sapiens
```

```
<400> SEQUENCE: 226

Val Ile His Leu Ala Ala Met Val Gly Gly Leu Phe Arg Asn Ile
1               5                   10                  15

<210> SEQ ID NO 227
<211> LENGTH: 15
<212> TYPE: PRT
<213> ORGANISM: Homo sapiens

<400> SEQUENCE: 227

Ala Met Val Gly Gly Leu Phe Arg Asn Ile Lys Tyr Asn Leu Asp
1               5                   10                  15

<210> SEQ ID NO 228
<211> LENGTH: 15
<212> TYPE: PRT
<213> ORGANISM: Homo sapiens

<400> SEQUENCE: 228

Lys Tyr Asn Leu Asp Phe Trp Arg Lys Asn Val His Met Asn Asp
1               5                   10                  15

<210> SEQ ID NO 229
<211> LENGTH: 15
<212> TYPE: PRT
<213> ORGANISM: Homo sapiens

<400> SEQUENCE: 229

Phe Trp Arg Lys Asn Val His Met Asn Asp Asn Val Leu His Ser
1               5                   10                  15

<210> SEQ ID NO 230
<211> LENGTH: 15
<212> TYPE: PRT
<213> ORGANISM: Homo sapiens

<400> SEQUENCE: 230

Asn Val Leu His Ser Ala Phe Glu Val Gly Ala Arg Lys Val Val
1               5                   10                  15

<210> SEQ ID NO 231
<211> LENGTH: 15
<212> TYPE: PRT
<213> ORGANISM: Homo sapiens

<400> SEQUENCE: 231

Ala Phe Glu Val Gly Ala Arg Lys Val Val Ser Cys Leu Ser Thr
1               5                   10                  15

<210> SEQ ID NO 232
<211> LENGTH: 15
<212> TYPE: PRT
<213> ORGANISM: Homo sapiens

<400> SEQUENCE: 232

Ala Arg Lys Val Val Ser Cys Leu Ser Thr Cys Ile Phe Pro Asp
1               5                   10                  15

<210> SEQ ID NO 233
<211> LENGTH: 15
<212> TYPE: PRT
<213> ORGANISM: Homo sapiens
```

```
<400> SEQUENCE: 233

Ser Cys Leu Ser Thr Cys Ile Phe Pro Asp Lys Thr Thr Tyr Pro
1               5                   10                  15

<210> SEQ ID NO 234
<211> LENGTH: 15
<212> TYPE: PRT
<213> ORGANISM: Homo sapiens

<400> SEQUENCE: 234

Cys Ile Phe Pro Asp Lys Thr Thr Tyr Pro Ile Asp Glu Thr Met
1               5                   10                  15

<210> SEQ ID NO 235
<211> LENGTH: 15
<212> TYPE: PRT
<213> ORGANISM: Homo sapiens

<400> SEQUENCE: 235

Ile Asp Glu Thr Met Ile His Asn Gly Pro Pro His Asn Ser Asn
1               5                   10                  15

<210> SEQ ID NO 236
<211> LENGTH: 15
<212> TYPE: PRT
<213> ORGANISM: Homo sapiens

<400> SEQUENCE: 236

Pro His Asn Ser Asn Phe Gly Tyr Ser Tyr Ala Lys Arg Met Ile
1               5                   10                  15

<210> SEQ ID NO 237
<211> LENGTH: 15
<212> TYPE: PRT
<213> ORGANISM: Homo sapiens

<400> SEQUENCE: 237

Phe Gly Tyr Ser Tyr Ala Lys Arg Met Ile Asp Val Gln Asn Arg
1               5                   10                  15

<210> SEQ ID NO 238
<211> LENGTH: 15
<212> TYPE: PRT
<213> ORGANISM: Homo sapiens

<400> SEQUENCE: 238

Ala Lys Arg Met Ile Asp Val Gln Asn Arg Ala Tyr Phe Gln Gln
1               5                   10                  15

<210> SEQ ID NO 239
<211> LENGTH: 15
<212> TYPE: PRT
<213> ORGANISM: Homo sapiens

<400> SEQUENCE: 239

Asp Val Gln Asn Arg Ala Tyr Phe Gln Gln Tyr Gly Cys Thr Phe
1               5                   10                  15

<210> SEQ ID NO 240
<211> LENGTH: 15
<212> TYPE: PRT
<213> ORGANISM: Homo sapiens
```

```
<400> SEQUENCE: 240

Thr Ala Val Ile Pro Thr Asn Val Phe Gly Pro His Asp Asn Phe
1               5                   10                  15

<210> SEQ ID NO 241
<211> LENGTH: 15
<212> TYPE: PRT
<213> ORGANISM: Homo sapiens

<400> SEQUENCE: 241

Thr Asn Val Phe Gly Pro His Asp Asn Phe Asn Ile Glu Asp Gly
1               5                   10                  15

<210> SEQ ID NO 242
<211> LENGTH: 15
<212> TYPE: PRT
<213> ORGANISM: Homo sapiens

<400> SEQUENCE: 242

Pro His Asp Asn Phe Asn Ile Glu Asp Gly His Val Leu Pro Gly
1               5                   10                  15

<210> SEQ ID NO 243
<211> LENGTH: 15
<212> TYPE: PRT
<213> ORGANISM: Homo sapiens

<400> SEQUENCE: 243

Asn Ile Glu Asp Gly His Val Leu Pro Gly Leu Ile His Lys Val
1               5                   10                  15

<210> SEQ ID NO 244
<211> LENGTH: 15
<212> TYPE: PRT
<213> ORGANISM: Homo sapiens

<400> SEQUENCE: 244

His Val Leu Pro Gly Leu Ile His Lys Val His Leu Ala Lys Ser
1               5                   10                  15

<210> SEQ ID NO 245
<211> LENGTH: 15
<212> TYPE: PRT
<213> ORGANISM: Homo sapiens

<400> SEQUENCE: 245

Leu Ile His Lys Val His Leu Ala Lys Ser Ser Gly Ser Ala Leu
1               5                   10                  15

<210> SEQ ID NO 246
<211> LENGTH: 15
<212> TYPE: PRT
<213> ORGANISM: Homo sapiens

<400> SEQUENCE: 246

His Leu Ala Lys Ser Ser Gly Ser Ala Leu Thr Val Trp Gly Thr
1               5                   10                  15

<210> SEQ ID NO 247
<211> LENGTH: 15
<212> TYPE: PRT
<213> ORGANISM: Homo sapiens
```

```
<400> SEQUENCE: 247

Ser Gly Ser Ala Leu Thr Val Trp Gly Thr Gly Asn Pro Arg Arg
1               5                   10                  15

<210> SEQ ID NO 248
<211> LENGTH: 15
<212> TYPE: PRT
<213> ORGANISM: Homo sapiens

<400> SEQUENCE: 248

Thr Val Trp Gly Thr Gly Asn Pro Arg Arg Gln Phe Ile Tyr Ser
1               5                   10                  15

<210> SEQ ID NO 249
<211> LENGTH: 15
<212> TYPE: PRT
<213> ORGANISM: Homo sapiens

<400> SEQUENCE: 249

Gly Asn Pro Arg Arg Gln Phe Ile Tyr Ser Leu Asp Leu Ala Gln
1               5                   10                  15

<210> SEQ ID NO 250
<211> LENGTH: 15
<212> TYPE: PRT
<213> ORGANISM: Homo sapiens

<400> SEQUENCE: 250

Gln Phe Ile Tyr Ser Leu Asp Leu Ala Gln Leu Phe Ile Trp Val
1               5                   10                  15

<210> SEQ ID NO 251
<211> LENGTH: 15
<212> TYPE: PRT
<213> ORGANISM: Homo sapiens

<400> SEQUENCE: 251

Leu Asp Leu Ala Gln Leu Phe Ile Trp Val Leu Arg Glu Tyr Asn
1               5                   10                  15

<210> SEQ ID NO 252
<211> LENGTH: 15
<212> TYPE: PRT
<213> ORGANISM: Homo sapiens

<400> SEQUENCE: 252

Leu Phe Ile Trp Val Leu Arg Glu Tyr Asn Glu Val Glu Pro Ile
1               5                   10                  15

<210> SEQ ID NO 253
<211> LENGTH: 15
<212> TYPE: PRT
<213> ORGANISM: Homo sapiens

<400> SEQUENCE: 253

Glu Ala Met Asp Phe His Gly Glu Val Thr Phe Asp Thr Thr Lys
1               5                   10                  15

<210> SEQ ID NO 254
<211> LENGTH: 15
<212> TYPE: PRT
<213> ORGANISM: Homo sapiens
```

```
<400> SEQUENCE: 254

His Gly Glu Val Thr Phe Asp Thr Thr Lys Ser Asp Gly Gln Phe
1               5                   10                  15

<210> SEQ ID NO 255
<211> LENGTH: 15
<212> TYPE: PRT
<213> ORGANISM: Homo sapiens

<400> SEQUENCE: 255

Ser Asp Gly Gln Phe Lys Lys Thr Ala Ser Asn Ser Lys Leu Arg
1               5                   10                  15

<210> SEQ ID NO 256
<211> LENGTH: 15
<212> TYPE: PRT
<213> ORGANISM: Homo sapiens

<400> SEQUENCE: 256

Lys Lys Thr Ala Ser Asn Ser Lys Leu Arg Thr Tyr Leu Pro Asp
1               5                   10                  15

<210> SEQ ID NO 257
<211> LENGTH: 15
<212> TYPE: PRT
<213> ORGANISM: Homo sapiens

<400> SEQUENCE: 257

Asn Ser Lys Leu Arg Thr Tyr Leu Pro Asp Phe Arg Phe Thr Pro
1               5                   10                  15

<210> SEQ ID NO 258
<211> LENGTH: 15
<212> TYPE: PRT
<213> ORGANISM: Homo sapiens

<400> SEQUENCE: 258

Thr Tyr Leu Pro Asp Phe Arg Phe Thr Pro Phe Lys Gln Ala Val
1               5                   10                  15

<210> SEQ ID NO 259
<211> LENGTH: 15
<212> TYPE: PRT
<213> ORGANISM: Homo sapiens

<400> SEQUENCE: 259

Phe Lys Gln Ala Val Lys Glu Thr Cys Ala Trp Phe Thr Asp Asn
1               5                   10                  15

<210> SEQ ID NO 260
<211> LENGTH: 16
<212> TYPE: PRT
<213> ORGANISM: Homo sapiens

<400> SEQUENCE: 260

Lys Glu Thr Cys Ala Trp Phe Thr Asp Asn Tyr Glu Gln Ala Arg Lys
1               5                   10                  15

<210> SEQ ID NO 261
<211> LENGTH: 20
<212> TYPE: PRT
<213> ORGANISM: Homo sapiens
```

```
<400> SEQUENCE: 261

Gly Gln Phe Arg Val Ile Gly Pro Arg His Pro Ile Arg Ala Leu Val
1               5                   10                  15

Gly Asp Glu Val
            20

<210> SEQ ID NO 262
<211> LENGTH: 21
<212> TYPE: PRT
<213> ORGANISM: Homo sapiens

<400> SEQUENCE: 262

Met Glu Val Gly Trp Tyr Arg Pro Pro Phe Ser Arg Val Val His Leu
1               5                   10                  15

Tyr Arg Asn Gly Lys
            20

<210> SEQ ID NO 263
<211> LENGTH: 20
<212> TYPE: PRT
<213> ORGANISM: Homo sapiens

<400> SEQUENCE: 263

Lys Tyr Leu Ala Thr Ala Ser Thr Met Asp His Ala Arg His Gly Phe
1               5                   10                  15

Leu Pro Arg His
            20

<210> SEQ ID NO 264
<211> LENGTH: 17
<212> TYPE: PRT
<213> ORGANISM: Homo sapiens

<400> SEQUENCE: 264

Glu Asn Pro Val Val His Phe Phe Lys Asn Ile Val Thr Pro Arg Thr
1               5                   10                  15

Pro

<210> SEQ ID NO 265
<211> LENGTH: 19
<212> TYPE: PRT
<213> ORGANISM: Homo sapiens

<400> SEQUENCE: 265

Leu Ser Arg Phe Ser Trp Gly Ala Glu Gly Gln Arg Pro Gly Phe Gly
1               5                   10                  15

Tyr Gly Gly

<210> SEQ ID NO 266
<211> LENGTH: 25
<212> TYPE: PRT
<213> ORGANISM: Homo sapiens

<400> SEQUENCE: 266

Ala Gln Gly Thr Leu Ser Lys Ile Phe Lys Leu Gly Gly Arg Asp Ser
1               5                   10                  15

Arg Ser Gly Ser Pro Met Ala Arg Arg
            20                  25

<210> SEQ ID NO 267
```

```
<211> LENGTH: 16
<212> TYPE: PRT
<213> ORGANISM: Homo sapiens

<400> SEQUENCE: 267

His Cys Leu Gly Lys Trp Leu Gly His Pro Asp Lys Phe Val Gly Ile
1               5                   10                  15

<210> SEQ ID NO 268
<211> LENGTH: 11
<212> TYPE: PRT
<213> ORGANISM: Influenza A virus

<400> SEQUENCE: 268

Phe Val Phe Thr Leu Thr Val Pro Ser Glu Arg
1               5                   10

<210> SEQ ID NO 269
<211> LENGTH: 15
<212> TYPE: PRT
<213> ORGANISM: Influenza A virus

<400> SEQUENCE: 269

Ser Gly Pro Leu Lys Ala Glu Ile Ala Gln Arg Leu Glu Asp Val
1               5                   10                  15

<210> SEQ ID NO 270
<211> LENGTH: 16
<212> TYPE: PRT
<213> ORGANISM: Influenza A virus

<400> SEQUENCE: 270

Tyr Asp Val Pro Asp Tyr Ala Ser Leu Arg Ser Leu Val Ala Ser Ser
1               5                   10                  15

<210> SEQ ID NO 271
<211> LENGTH: 13
<212> TYPE: PRT
<213> ORGANISM: Influenza B virus

<400> SEQUENCE: 271

Pro Tyr Tyr Thr Gly Glu His Ala Lys Ala Ile Gly Asn
1               5                   10

<210> SEQ ID NO 272
<211> LENGTH: 12
<212> TYPE: PRT
<213> ORGANISM: Clostridium tetani

<400> SEQUENCE: 272

Gly Gln Ile Gly Asn Asp Pro Asn Arg Asp Ile Leu
1               5                   10

<210> SEQ ID NO 273
<211> LENGTH: 12
<212> TYPE: PRT
<213> ORGANISM: Influenza A virus

<400> SEQUENCE: 273

Pro Lys Tyr Val Lys Gln Asn Thr Leu Lys Leu Ala
1               5                   10

<210> SEQ ID NO 274
<211> LENGTH: 13
<212> TYPE: PRT
```

<213> ORGANISM: Influenza A virus

<400> SEQUENCE: 274

Pro Lys Tyr Val Lys Gln Asn Thr Leu Lys Leu Ala Thr
1               5                   10

<210> SEQ ID NO 275
<211> LENGTH: 9
<212> TYPE: PRT
<213> ORGANISM: Influenza A virus

<400> SEQUENCE: 275

Asp Arg Leu Arg Arg Asp Gln Lys Ser
1               5

<210> SEQ ID NO 276
<211> LENGTH: 19
<212> TYPE: PRT
<213> ORGANISM: Human herpesvirus 4

<400> SEQUENCE: 276

Ala Gly Leu Thr Leu Ser Leu Leu Val Ile Cys Ser Tyr Leu Phe Ile
1               5                   10                  15

Ser Arg Gly

<210> SEQ ID NO 277
<211> LENGTH: 15
<212> TYPE: PRT
<213> ORGANISM: Clostridium tetani

<400> SEQUENCE: 277

Gln Tyr Ile Lys Ala Asn Ser Lys Phe Ile Gly Ile Thr Glu Leu
1               5                   10                  15

<210> SEQ ID NO 278
<211> LENGTH: 14
<212> TYPE: PRT
<213> ORGANISM: Clostridium tetani

<400> SEQUENCE: 278

Gln Tyr Ile Lys Ala Asn Ser Lys Phe Ile Gly Ile Thr Glu
1               5                   10

<210> SEQ ID NO 279
<211> LENGTH: 21
<212> TYPE: PRT
<213> ORGANISM: Clostridium tetani

<400> SEQUENCE: 279

Phe Asn Asn Phe Thr Val Ser Phe Trp Leu Arg Val Pro Lys Val Ser
1               5                   10                  15

Ala Ser His Leu Glu
            20

<210> SEQ ID NO 280
<211> LENGTH: 13
<212> TYPE: PRT
<213> ORGANISM: Human herpesvirus 4

<400> SEQUENCE: 280

Thr Ser Leu Tyr Asn Leu Arg Arg Gly Thr Ala Leu Ala
1               5                   10

```
<210> SEQ ID NO 281
<211> LENGTH: 16
<212> TYPE: PRT
<213> ORGANISM: Clostridium tetani

<400> SEQUENCE: 281

Lys Phe Ile Ile Lys Arg Tyr Thr Pro Asn Asn Glu Ile Asp Ser Phe
1               5                   10                  15

<210> SEQ ID NO 282
<211> LENGTH: 16
<212> TYPE: PRT
<213> ORGANISM: Clostridium tetani

<400> SEQUENCE: 282

Val Ser Ile Asp Lys Phe Arg Ile Phe Cys Lys Ala Leu Asn Pro Lys
1               5                   10                  15

<210> SEQ ID NO 283
<211> LENGTH: 18
<212> TYPE: PRT
<213> ORGANISM: Human herpesvirus 4

<400> SEQUENCE: 283

Val Pro Gly Leu Tyr Ser Pro Cys Arg Ala Phe Phe Asn Lys Glu Glu
1               5                   10                  15

Leu Leu

<210> SEQ ID NO 284
<211> LENGTH: 14
<212> TYPE: PRT
<213> ORGANISM: Human cytomegalovirus

<400> SEQUENCE: 284

Asp Lys Arg Glu Met Trp Met Ala Cys Ile Lys Glu Leu His
1               5                   10

<210> SEQ ID NO 285
<211> LENGTH: 15
<212> TYPE: PRT
<213> ORGANISM: Human herpesvirus 4

<400> SEQUENCE: 285

Thr Gly His Gly Ala Arg Thr Ser Thr Glu Pro Thr Thr Asp Tyr
1               5                   10                  15

<210> SEQ ID NO 286
<211> LENGTH: 13
<212> TYPE: PRT
<213> ORGANISM: Human herpesvirus 4

<400> SEQUENCE: 286

Lys Glu Leu Lys Arg Gln Tyr Glu Lys Lys Leu Arg Gln
1               5                   10

<210> SEQ ID NO 287
<211> LENGTH: 16
<212> TYPE: PRT
<213> ORGANISM: Influenza A virus

<400> SEQUENCE: 287

Arg Gly Tyr Phe Lys Met Arg Thr Gly Lys Ser Ser Ile Met Arg Ser
1               5                   10                  15
```

-continued

```
<210> SEQ ID NO 288
<211> LENGTH: 11
<212> TYPE: PRT
<213> ORGANISM: Human herpesvirus 4

<400> SEQUENCE: 288

Thr Val Phe Tyr Asn Ile Pro Pro Met Pro Leu
1               5                   10

<210> SEQ ID NO 289
<211> LENGTH: 15
<212> TYPE: PRT
<213> ORGANISM: Human herpesvirus 4

<400> SEQUENCE: 289

Ala Glu Gly Leu Arg Ala Leu Leu Ala Arg Ser His Val Glu Arg
1               5                   10                  15

<210> SEQ ID NO 290
<211> LENGTH: 20
<212> TYPE: PRT
<213> ORGANISM: Human herpesvirus 4

<400> SEQUENCE: 290

Pro Gly Pro Leu Arg Glu Ser Ile Val Cys Tyr Phe Met Val Phe Leu
1               5                   10                  15

Gln Thr His Ile
            20

<210> SEQ ID NO 291
<211> LENGTH: 26
<212> TYPE: PRT
<213> ORGANISM: Homo sapiens

<400> SEQUENCE: 291

Asp Leu Leu His Ala Pro Glu Glu Gly Pro Phe Thr Phe Pro Asn Gly
1               5                   10                  15

Glu Ala Val Glu His Gly Glu Glu Ser Lys
            20                  25

<210> SEQ ID NO 292
<211> LENGTH: 11
<212> TYPE: PRT
<213> ORGANISM: Homo sapiens

<400> SEQUENCE: 292

Ile Val Ile Ser Ser Ala Glu Leu Leu Gln Lys
1               5                   10

<210> SEQ ID NO 293
<211> LENGTH: 23
<212> TYPE: PRT
<213> ORGANISM: Homo sapiens

<400> SEQUENCE: 293

Val Ser Leu Leu Phe Asp His Leu Glu Pro Glu Glu Leu Ser Glu His
1               5                   10                  15

Leu Thr Tyr Leu Glu Phe Lys
            20

<210> SEQ ID NO 294
<211> LENGTH: 11
<212> TYPE: PRT
<213> ORGANISM: Homo sapiens
```

-continued

<400> SEQUENCE: 294

Ala Phe Ser Phe Ser Leu Pro Arg Pro Gly Arg
1               5                   10

<210> SEQ ID NO 295
<211> LENGTH: 8
<212> TYPE: PRT
<213> ORGANISM: Homo sapiens

<400> SEQUENCE: 295

Ala Leu Ile Leu Gly Ile Tyr Lys
1               5

<210> SEQ ID NO 296
<211> LENGTH: 10
<212> TYPE: PRT
<213> ORGANISM: Homo sapiens

<400> SEQUENCE: 296

Ala Leu Leu Asp Gln Glu Gly Asn Arg Arg
1               5                   10

<210> SEQ ID NO 297
<211> LENGTH: 13
<212> TYPE: PRT
<213> ORGANISM: Homo sapiens

<400> SEQUENCE: 297

Ala Leu Val Ile Thr His Phe Val His Val Ala Glu Lys
1               5                   10

<210> SEQ ID NO 298
<211> LENGTH: 17
<212> TYPE: PRT
<213> ORGANISM: Homo sapiens

<400> SEQUENCE: 298

Asp Leu Val Ala Leu Gln Leu Ala Leu Pro Asp Trp Leu Asp Pro Ala
1               5                   10                  15

Arg

<210> SEQ ID NO 299
<211> LENGTH: 9
<212> TYPE: PRT
<213> ORGANISM: Homo sapiens

<400> SEQUENCE: 299

Asp Asn Ser Asn Ser Leu Gln Val Lys
1               5

<210> SEQ ID NO 300
<211> LENGTH: 14
<212> TYPE: PRT
<213> ORGANISM: Homo sapiens

<400> SEQUENCE: 300

His Ser Ser Leu Ile Asp Ile Asp Ser Val Pro Thr Tyr Lys
1               5                   10

<210> SEQ ID NO 301
<211> LENGTH: 10
<212> TYPE: PRT
<213> ORGANISM: Homo sapiens

<400> SEQUENCE: 301

Lys Asp Asn Ser Asn Ser Leu Gln Val Lys
1               5                   10

<210> SEQ ID NO 302
<211> LENGTH: 12
<212> TYPE: PRT
<213> ORGANISM: Homo sapiens

<400> SEQUENCE: 302

Leu Asp Gln Ala Leu Val Val Glu His Ile Glu Lys
1               5                   10

<210> SEQ ID NO 303
<211> LENGTH: 9
<212> TYPE: PRT
<213> ORGANISM: Homo sapiens

<400> SEQUENCE: 303

Leu Leu His Ile Tyr Gln Gln Ser Arg
1               5

<210> SEQ ID NO 304
<211> LENGTH: 24
<212> TYPE: PRT
<213> ORGANISM: Homo sapiens

<400> SEQUENCE: 304

Leu Leu Gln Leu Gln Asn Phe Asn Thr Leu Met Ala Val Val Gly Gly
1               5                   10                  15

Leu Ser His Ser Ser Ile Ser Arg
            20

<210> SEQ ID NO 305
<211> LENGTH: 19
<212> TYPE: PRT
<213> ORGANISM: Homo sapiens

<400> SEQUENCE: 305

Leu Trp Glu Gly Leu Thr Glu Leu Val Thr Ala Thr Gly Asn Tyr Gly
1               5                   10                  15

Asn Tyr Arg

<210> SEQ ID NO 306
<211> LENGTH: 18
<212> TYPE: PRT
<213> ORGANISM: Homo sapiens

<400> SEQUENCE: 306

Met Phe Leu Met Met His Pro Trp Tyr Ile Pro Ser Ser Gln Leu Ala
1               5                   10                  15

Ala Lys

<210> SEQ ID NO 307
<211> LENGTH: 8
<212> TYPE: PRT
<213> ORGANISM: Homo sapiens

<400> SEQUENCE: 307

Val Arg Asp Pro Gln Leu Val Arg
1               5

```
<210> SEQ ID NO 308
<211> LENGTH: 21
<212> TYPE: PRT
<213> ORGANISM: Homo sapiens

<400> SEQUENCE: 308

Tyr Trp Ile Ser Ala Phe Pro Ala Glu Phe Asp Leu Asn Pro Glu Leu
1               5                   10                  15

Ala Glu Gln Ile Lys
            20

<210> SEQ ID NO 309
<211> LENGTH: 8
<212> TYPE: PRT
<213> ORGANISM: Homo sapiens

<400> SEQUENCE: 309

Leu Ser Leu Val Leu Glu Pro Arg
1               5
```